(12) United States Patent
Hotta et al.

(10) Patent No.: US 7,370,879 B2
(45) Date of Patent: May 13, 2008

(54) KNEE PROTECTING AIRBAG DEVICE

(75) Inventors: Naoki Hotta, Aichi (JP); Atsushi Nagata, Aichi (JP); Masahiro Takimoto, Aichi (JP); Masakazu Hashimoto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 348 days.

(21) Appl. No.: 11/016,882

(22) Filed: Dec. 21, 2004

(65) Prior Publication Data

US 2005/0140123 A1  Jun. 30, 2005

(30) Foreign Application Priority Data

Dec. 24, 2003  (JP)  ............................. P2003-427715
Mar. 22, 2004  (JP)  ............................. P2004-082546
Mar. 25, 2004  (JP)  ............................. P2004-089184

(51) Int. Cl.
*B60R 21/16* (2006.01)
*B60R 21/20* (2006.01)
*B60R 21/205* (2006.01)

(52) U.S. Cl. .............................. 280/728.2; 280/728.3; 280/730.1; 280/732

(58) Field of Classification Search ............ 280/728.2, 280/728.3, 730.1, 732
See application file for complete search history.

(56) References Cited

U.S. PATENT DOCUMENTS 4,004,827 A  1/1977  Kondo et al.
5,150,919 A * 9/1992  Sakakida et al. ........... 280/732
5,230,530 A * 7/1993  Iriyama et al. ............. 280/732
5,356,174 A * 10/1994 Rhein et al. ............. 280/728.2
5,364,124 A * 11/1994 Donegan et al. ......... 280/730.1
5,489,116 A * 2/1996  Boag ....................... 280/728.2
5,669,626 A * 9/1997  Bartos et al. ............ 280/728.2
5,755,459 A   5/1998  LaLonde
5,820,157 A * 10/1998 Matsumoto ............... 280/728.2
6,135,495 A * 10/2000 Redgrave et al. .......... 280/732
6,435,548 B2* 8/2002  Suzuki et al. ............. 280/732
2005/0116449 A1* 6/2005  Enders ................... 280/730.1

FOREIGN PATENT DOCUMENTS

| JP | A-2003-118528 | | 4/2003 |
| JP | A-2003-267178 | | 9/2003 |
| JP | 2005225427 A | * | 8/2005 |
| JP | 2005263153 A | * | 9/2005 |

* cited by examiner

*Primary Examiner*—Paul N. Dickson
*Assistant Examiner*—Joselynn Y. Sliteris
(74) *Attorney, Agent, or Firm*—Posz Law Group, PLC

(57) ABSTRACT

The knee protecting airbag device is assembled such that a retainer and an attachment bracket clamp the peripheral portion of a gas inlet opening of an airbag, bag holding wall parts of a case, and a gas providing inflator. This inflator is provided with a diffuser for covering the gas discharge port of a body. The retainer and the attachment bracket are connected by inserting bolts and connecting members through the airbag and the case, by retaining retaining portions on the retaining portions of the connecting members, and by inserting the bolts into through holes and fastening them with nuts. At this connecting time, guide portions of the retainer and the diffuser are fitted on each other to form a guide passage for guiding the gas into the airbag.

3 Claims, 34 Drawing Sheets

FIG. 7
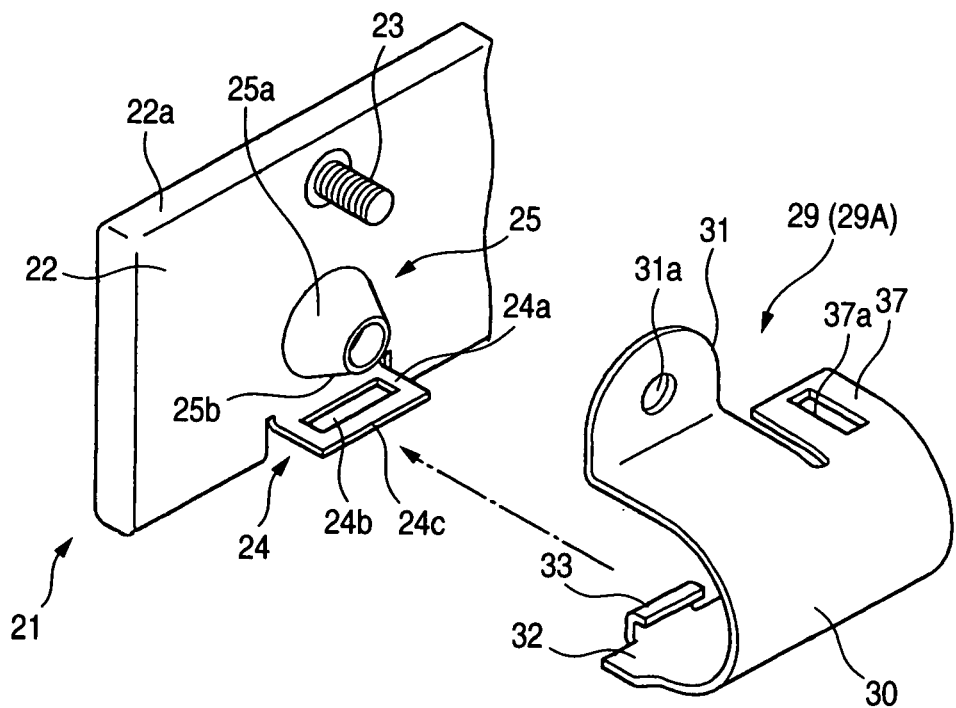
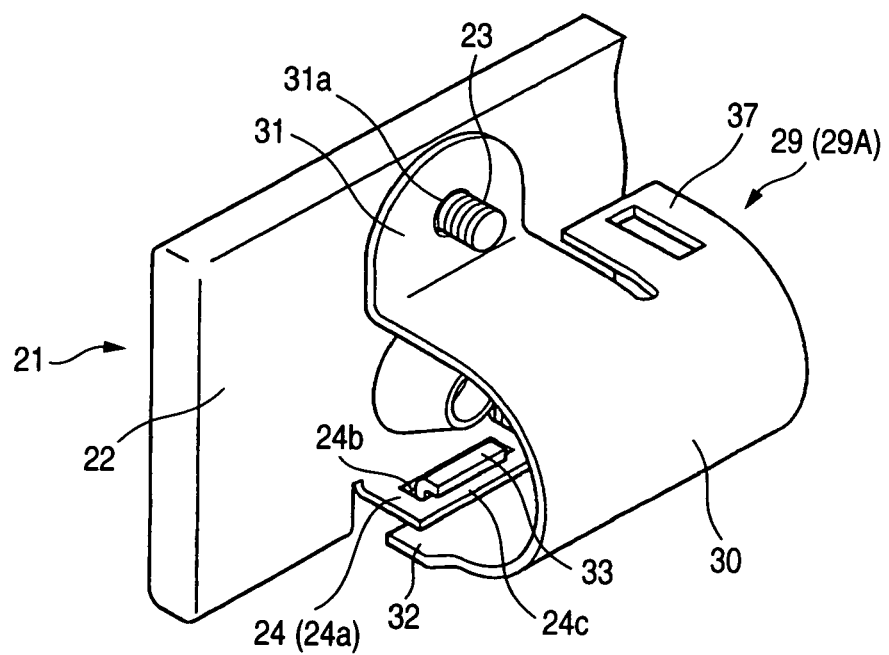

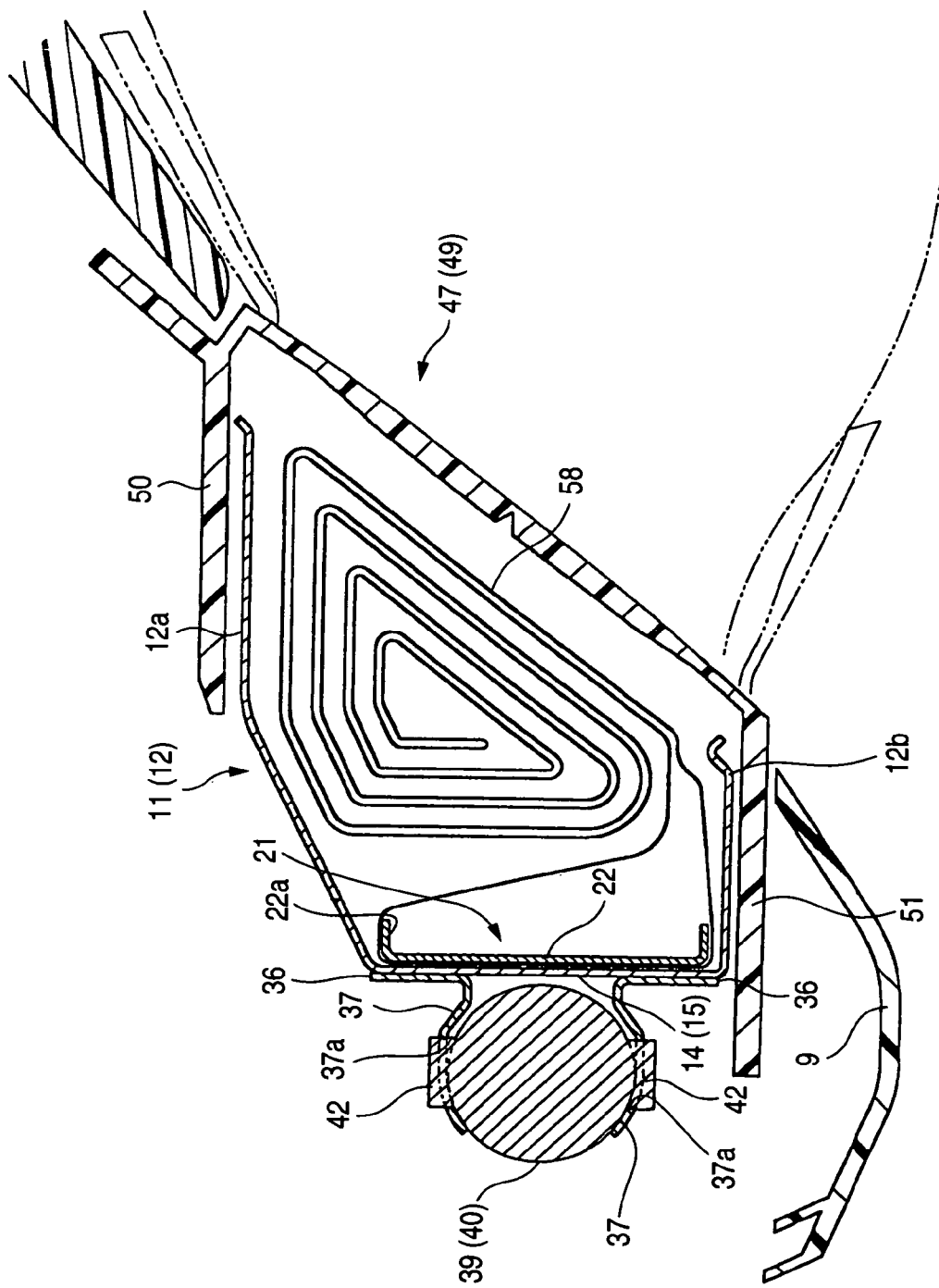

KNEE PROTECTING AIRBAG DEVICE

BACKGROUND OF THE INVENTION

1. Field of the Invention

The present invention relates to a knee protecting airbag device capable of protecting the knees of an occupant such as a driver or an occupant on an assistant seat with an airbag, which is expanded and inflated by introducing an inflating gas.

2. Description of Related Art

In the related art, a device for protecting the knees of an occupant such as a driver is constructed to include: an airbag folded so that it can be expanded and inflated toward the front side of the knees of the seated occupant; an inflator for providing the airbag with an inflating gas; and a case for accommodating and holding the folded airbag and the inflator (as referred to JP 2003-118528A, for example).

In the knee protecting airbag device of the related art, however, an inflator of a generally column-shaped cylinder type is arranged together with the airbag in the case. This arrangement makes it difficult to house the folded airbag without clearance in a space around the inflator. For example, the airbag is hard to enter the clearance in the case on the front side of the inflator. There is room for improvement in the point that the space in the case is effectively utilized.

If, in this case, the construction is modified such that only the airbag is accommodated in the case by arranging the inflator outside of the case, the flexible airbag can be accommodated so far as the corners of the case. Therefore, the space in the case can be effectively utilized to make the case compact.

In case, however, the inflator is arranged outside of the case, it is necessary to guide the inflating gas into the airbag without any gas leakage.

Further, in another knee protecting airbag device of the related art, a folded airbag and an inflator are accommodated in a case opened on the vehicular rear side, and airbag cover is arranged to cover the case opening on the vehicular rear side (as referred to JP-A-2003-267178, for example).

However, the knee protecting airbag device of the related art is so mounted on the vehicle that the case accommodating the folded airbag and the inflator is fixed at its predetermined portion on the vehicular body side while assembling an airbag cover integrally with the case. When the case is mounted and fixed on the body side, therefore, the mounting works have to be done at the portion, where the worker finds it hard to view, such as the back or the side of the case, so that the mounting workability is not excellent. Especially in the knee protecting airbag device of the related art, after an instrument panel as an interior component arranged around the airbag cover was attached to the body side, the integrated airbag device is fixed on the body side. This makes the working space small at the mounting work and makes it difficult to observe the mount portion of the case on the body side. Therefore, the knee protecting airbag device of the related art cannot have a satisfactory workability for the mounting operation.

SUMMARY OF THE INVENTION

The present invention contemplates to solve the aforementioned problems and has an object to provide a knee protecting airbag device capable of guiding an inflating gas into an airbag while preventing leakage with a simple construction even if an inflator is arranged outside of a case.

Another object of the invention is to provide a knee protecting airbag device capable of easily confirming the mount portions of an airbag assembly on a body side so that the workability of mounting the airbag device on the vehicular body side is excellent.

According to the invention, there is provided a knee protecting airbag device comprising:

an airbag folded and accommodated in a case arranged on the front side of an occupant, for being protruded from the case toward the vehicular rear side, when an inflating gas flows in, so that it is expanded and inflated to protect the knees of the occupant; and an inflator for providing the airbag with the inflating gas, wherein the airbag is constructed to include such an inlet opening for introducing the inflating gas, as is held in the case while being retained at its peripheral portion by a retainer, wherein the inflator includes a generally columnar body having a discharge port capable of discharging the inflating gas, and a diffuser fixed on the body for covering the gas discharge port, and is arranged on the outer side and along a bag holding wall part of the case for holding the peripheral portion of the inlet opening of the airbag, wherein the retainer and the diffuser include individual guide portions capable of forming a guide passage extending through the inlet opening of the airbag and the bag holding wall part of the case for guiding the inflating gas into the airbag, wherein the retainer and the inflator are connected to each other to clamp the peripheral portion of the inlet opening of the airbag and the bag holding wall part of the case so that they are assembled with the case, and wherein the guide portions of the retainer and the diffuser are fitted on each other to form the guide passage when the retainer and the inflator are assembled with the case.

In the knee protecting airbag device according to the invention, when the retainer for retaining the peripheral portion of the inlet opening of the airbag on the bag holding wall part of the case and the inflator arranged on the outer side of the bag holding wall part of the case for providing the airbag with the inflating gas are to be assembled with the case, they are connected to each other while clamping the peripheral portion of the inlet opening of the airbag and the bag holding wall part of the case. At this assembling time, moreover, the guide portions of the retainer and the diffuser are fitted on each other to form the guide passage for guiding the inflating gas into the airbag.

According to another aspect of the invention, there is provided a knee protecting airbag device comprising:

an airbag folded and accommodated in a case arranged on the front side of an occupant, for being protruded from the case toward the vehicular rear side, when an inflating gas flows in, so that it is expanded and inflated to protect the knees of the occupant; and an inflator for providing the airbag with the inflating gas, wherein the airbag is constructed to include such an inlet opening for introducing the inflating gas, as is held in the case while being retained at its peripheral portion by a retainer, wherein the inflator includes a generally columnar body having a discharge port capable of discharging the inflating gas, and a diffuser fixed on the body for covering the gas discharge port, and is arranged on the outer side and along a bag holding wall part of the case for holding the peripheral portion of the inlet opening of the airbag, wherein the retainer and the diffuser include individual guide portions capable of forming a guide passage extending through the inlet opening of the airbag and the bag holding wall part of the case for guiding the inflating gas into the airbag, wherein the retainer protrudes a bolt and a connecting member having a retaining portion through the peripheral portion of the inlet opening of the airbag and the bag holding wall part of the case so that the inlet opening peripheral portion and the bag holding wall part may be opposed to each other through the inflator in the direction perpendicular to the axis of the inflator, wherein the attachment bracket is arranged along the circumferential direction of the inflator and formed to have a generally U-shaped section capable of covering the side of the inflator on the side apart from the bag holding wall part of the case and to include such a through hole on one of the two edges along the circumferential direction of the inflator as to insert the bolt therethrough thereby to fasten the bolt with a nut, and such a retaining portion on the other as to be retained by the retaining portion of the connecting member, wherein the bolt and the connecting member of the retainer are so introduced through the inlet opening peripheral portion of the airbag and the bag holding wall part of the case that they may be opposed to each other through the inflator and so that the retaining portion of the attachment bracket is retained on the retaining portion of the connecting member, wherein the retainer and the attachment bracket are connected by inserting the bolt into the through hole and by fastening the bolt with the nut, and wherein the airbag, the retainer and the inflator are assembled with the case by clamping the inlet opening peripheral portion of the airbag, the bag holding wall part of the case, and the inflator, and wherein the guide portions of the retainer and the diffuser are fitted on each other, when the retainer and the attachment bracket are connected to each other, thereby to form the guide passage.

In the knee protecting airbag device according to the invention, the bolts and the connecting members of the retainer are brought along the peripheral portion of the inlet opening of the airbag and the bag holding wall part of the case, so as to be opposed to each other through the inflator. Next, the retaining portions of the attachment bracket are retained on the retaining portions of the connecting members, and the bolts pass through the through holes and are fastened in the nuts, so that the retainer and the attachment bracket are connected to each other thereby to assemble the airbag, the retainer and the inflator with the case. At the same time, the guide portions of the retainer and the diffuser are fitted on each other to form the guide passage for guiding the inflating gas into the airbag.

In the knee protecting airbag device according to the invention, more specifically, when the retainer and the inflator are to be assembled with the case, the guide passage for guiding the inflating gas into the airbag can be easily formed by fitting the predetermined guide portions on each other. In addition to this simple construction, the mutual fitting directions of the guide portions of the retainer and the diffuser of the inflator are set in the direction to assemble the retainer and the inflator with the case. Then, the sealing properties of the guide portions can be easily retained, and the alignment of the fitting direction and the assembling direction can be easily made with the convenient construction.

Of course, not the inflator but the flexible airbag is accommodated in the folded shape in the case. Therefore, the airbag can be accommodated so far as to the corners of the case so that the case can be made compact.

In the knee protecting airbag device according to the invention, therefore, even if the inflator is arranged outside of the case, the inflating gas can be guided without any leakage in the airbag by the simple constructions.

In the knee protecting airbag device of the embodiment, moreover, the inflator and the retainer to be arranged along the bag holding wall part of the case are connected to each other by making use of the attachment bracket, and assembled with the case, while clamping the peripheral portion of the inlet opening of the airbag and the bag holding wall part of the case. The inflator is assembled with the case in the direction normal to the base wall part. The inflator provided with the generally columnar body can be assembled with the case by moving it not in its axial direction (i.e., in the axial direction of the inflator body) but in the direction perpendicular to the axis so that the working space at the assembling time can be made compact. In this case the case bag holding wall part is located on the front face of the case in the state where the airbag device is mounted on the vehicle, and is arranged transversely and vertically. On the other hand, the inflator is arranged along the case bag holding wall part and in the direction having its axis along the transverse direction when the device is mounted on the vehicle. In this case, the inflator can be assembled with the bag holding wall part of the case in the direction perpendicular to its axis, where it is moved from the vehicular front side to the rear side. Therefore, the inflator need not be brought in the moving direction along the transverse direction or its axial direction to the bag holding wall part of the case. In case the inflator is brought in the direction along the transverse direction or its axial direction to the bag holding wall part of the case, more specifically, the working space needs at least the large length size along the axial direction of the inflator and the width size in the transverse direction of the case, so that it must be large in the transverse direction.

In the knee protecting airbag device of the invention, moreover, the attachment bracket the two circumferential edges of the inflator with the bolts and the nuts, but retains the predetermined retaining portions on one edge side, on the retaining portions of the connecting members of the retainer. By the arrangement of no nut on the side of the retaining portion on one edge side, therefore, the width size along the circumferential direction of the inflator can be reduced to reduce the mounting space at the bag holding wall part of the case.

At the inlet opening peripheral portion of the airbag, the bolts and the connecting members of the retainer can pass through the through holes to regulate the movement of the inlet opening peripheral portion. Therefore, the deviation of the peripheral portion of the inlet opening of the airbag at the inflating time can be prevented to keep the smooth introduction of the inflating gas into the airbag.

Moreover, it is desired that the guide portion of one of the retainer and the diffuser is formed into a tubular portion extending to the other side whereas the guide portion of the other has a fitting hole for fitting the tubular portion.

With this construction, the tubular portion can be easily inserted into the fitting hole so that the guide portions of the retainer and the diffuser can be easily positioned relative to each other thereby to smoothen the works to assemble the retainer and the inflator with the case. Moreover, the guide portions are fitted on each other by inserting the tubular portion into the fitting hole so that the contact between the outer circumference of the tubular portion and the inner circumference of the fitting hole can be easily retained to improve the sealing property easily.

For example, the tubular portion is tapered toward its leading end so that it can be fitted to make close contact with the inner circumference of the fitting hole. With this construction, the outer circumference of the tubular portion can be forced to contact with the inner circumference of the fitting hole thereby to improve the sealing property.

Moreover, the construction may employ an attachment bracket made of a sheet metal is used when the retainer and the inflator are assembled with the case. The retainer includes at least one pair of holding members arranged to extend through the airbag and the bag holding wall part of the case and opposed to each other through the inflator in the direction perpendicular to the axis of the inflator. The attachment bracket is constructed to include: a cover portion extending along the circumferential direction of the inflator for covering the side of the inflator apart from the bag holding wall part; retaining portions arranged near the two edges of the cover portion along the circumferential direction of the inflator for retaining the end portions of the opposed holding members; and caulking portions provided in the cover portions for pressing and caulking the inflator toward the bag holding wall side of the case.

In this construction, the retaining members of the retainer are protruded to the side of the inflator through the airbag and the bag holding wall part of the case, so that the holding member head portions are retained on the retaining portions of the attachment bracket arranged on the two edges of the cover portions covering the side apart from the bag holding wall part of the inflator. At the same time, the caulking portions are caulked to press the inflator toward the side of the bag holding wall part of the case. Then, the attachment bracket receives the reaction from the inflator so that it leaves the bag holding wall part thereby to fasten the holding members and the retaining members firmly. The attachment bracket and the retainer are assembled with the case such that they clamp the peripheral portion of the inlet opening of the airbag, the case base wall part as the bag holding wall part of the case, and the inflator. The airbag, the retainer, the inflator and the attachment bracket can be assembled with the case even if the assembly means such as the bolt is hardly used.

In this case, the body of the inflator may be constructed to arrange a gas discharge portion at its end portion whereas the diffuser is formed into a bottomed cylindrical shape for covering the gas discharge port and has the guide portion arranged in the circumferential wall part, and the attachment bracket may be fixed in advance on the base wall part closing the axial end portion of the diffuser before the retainer and the inflator are assembled with the case.

With this construction, the inflator is hardly deviated in the axial direction with respect to the attachment bracket. It is needless to additionally provide any means for regulating the deviation along the axial direction of the inflator.

According to another aspect of the invention, there is provided a knee protecting airbag device arranged in front of the knees of a seated occupant, comprising:

a folded airbag; an inflator for providing the airbag with an inflating gas; a case opened on a vehicular rear side for accommodating the airbag and the inflator; and an airbag cover made of a synthetic resin and arranged to cover the vehicular rear side of the case, wherein the airbag assembly is formed to accommodate the case with the folded airbag and the inflator and includes mount portions to be attached to the vehicular body side by using mount member for fastening to the body side, wherein the airbag cover includes: a door arranging cover portion having a door portion capable of covering the vehicular rear side of the case opening and protruding the airbag when the airbag is expanded and inflated; and a general portion having an opening for housing the door arranging cover portion and arranged around the door arranging cover portion, wherein the door arranging cover portion is enabled to open/close the opening of the general portion by connecting a portion to the peripheral portion to the side of the general portion to warp the connecting portions, wherein retaining portions capable of retaining the peripheral portion of the door arranging cover portion on the side of the general portion are arranged at the portions excepting the connecting portions at the peripheral portion of the door arranging cover portion and at the peripheral portion of the general portion, wherein the opening to be formed in the general portion by opening the door arranging cover portion has such an open area as can insert the airbag assembly from the rear side of the opening and as can mount the mount portions of the airbag assembly on the body side of the vehicle by making use of the opening, and wherein the mount portions of the airbag assembly are so arranged that the mount member can be fastened on the body side at the mounting time on the body side by viewing from the opening.

The knee protecting airbag device of the embodiment is constructed such that the airbag assembly is attached, when the device is mounted on the vehicle, to the side of the vehicular body by making use of the opening which is formed by opening the door arranging cover portion of the airbag cover mounted and fixed in advance on the side of the body. In the knee protecting airbag device of the embodiment, more specifically, the airbag assembly is inserted toward the vehicular front side from the opening formed by opening the door arranging cover portion of the airbag cover, and the mount member are fastened on the body side while viewing them from the opening. Then, the mount portions of the airbag assembly can be mounted on the body side so that the airbag assembly can be attached on the side of the body of the vehicle. At the time of mounting the airbag assembly on the side of the body, therefore, the mount member can be fastened with the visual confirmation so that the mounting works of the mount portions are improved, and the confirmation of the subsequent mounted state can be easily performed.

In the knee protecting airbag device of the invention, therefore, the mount portions, at which the airbag assembly is mounted on the body, can be easily confirmed to improve the mounting workability on the body of the vehicle.

Of course, in the knee protecting airbag device of the invention, too, the door arranging cover portion opened at the mounting time of the airbag assembly is closed after the mounting work, and is retained on the side of the general portion by making use of the retaining portions. In the state where the airbag assembly is mounted on the vehicle, the mount portions of the airbag assembly and the mount member are covered on the side of the vehicular inside with the door arranging cover portion so that it is not exposed to retain the design, as viewed from the vehicular inside.

In the knee protecting airbag device of the aforementioned construction, moreover, it is desired that the door portion of the door arranging cover portion is pressed, when the airbag is expanded and inflated, by the airbag being inflated, to release the retention of the retaining protrusions.

In the knee protecting airbag device thus constructed, the door arranging cover portion itself is opened when the airbag is expanded and inflated, so that the portions and so on to be broken for opening the door portion need not be additionally arranged.

In the knee protecting airbag device thus constructed, it is desired:

that the door arranging cover portion includes portions to be broken, around the door portion; and that the door portion is pressed and opened with the airbag inflated, by breaking the portions to be broken.

The knee protecting airbag device thus far described is constructed such that the portions to be broken are broken, when the airbag is expanded and inflated, to open the door portion. In the knee protecting airbag device thus constructed, more specifically, the retained state of the door arranging cover portion on the general portion need not be released when the airbag is expanded and released. Therefore, the door arranging cover portion can be firmly retained by the retaining protrusions so that the retaining protrusions can be prevented at the times other than the working time of the airbag from erroneously coming out thereby to prevent the door arranging cover portion from being opened with respect to the general portion.

BRIEF DESCRIPTION OF THE DRAWINGS

FIG. 7 presents perspective views for explaining the connected states between a retainer and an attachment bracket of the first embodiment.

FIG. 17 is a schematic longitudinal section of portion XVII-XVII of FIG. 15.

DETAILED DESCRIPTION OF THE PREFERRED EMBODIMENTS

First Embodiment

First embodiment of the invention will be described with reference to the accompanying drawings. A knee protecting airbag device S1 of the embodiment is so arranged below a steering column 2 on the vehicular front side of a driver M as an occupant as to protect the both left and right knees K of the driver M, as shown in FIG. 1.

Here, the vertical directions, the transverse directions and the longitudinal directions, as defined herein, correspond to the vertical directions, and the transverse directions and the longitudinal directions of the vehicle when the knee protecting airbag device S1 is mounted on the vehicle.

Figure 1:
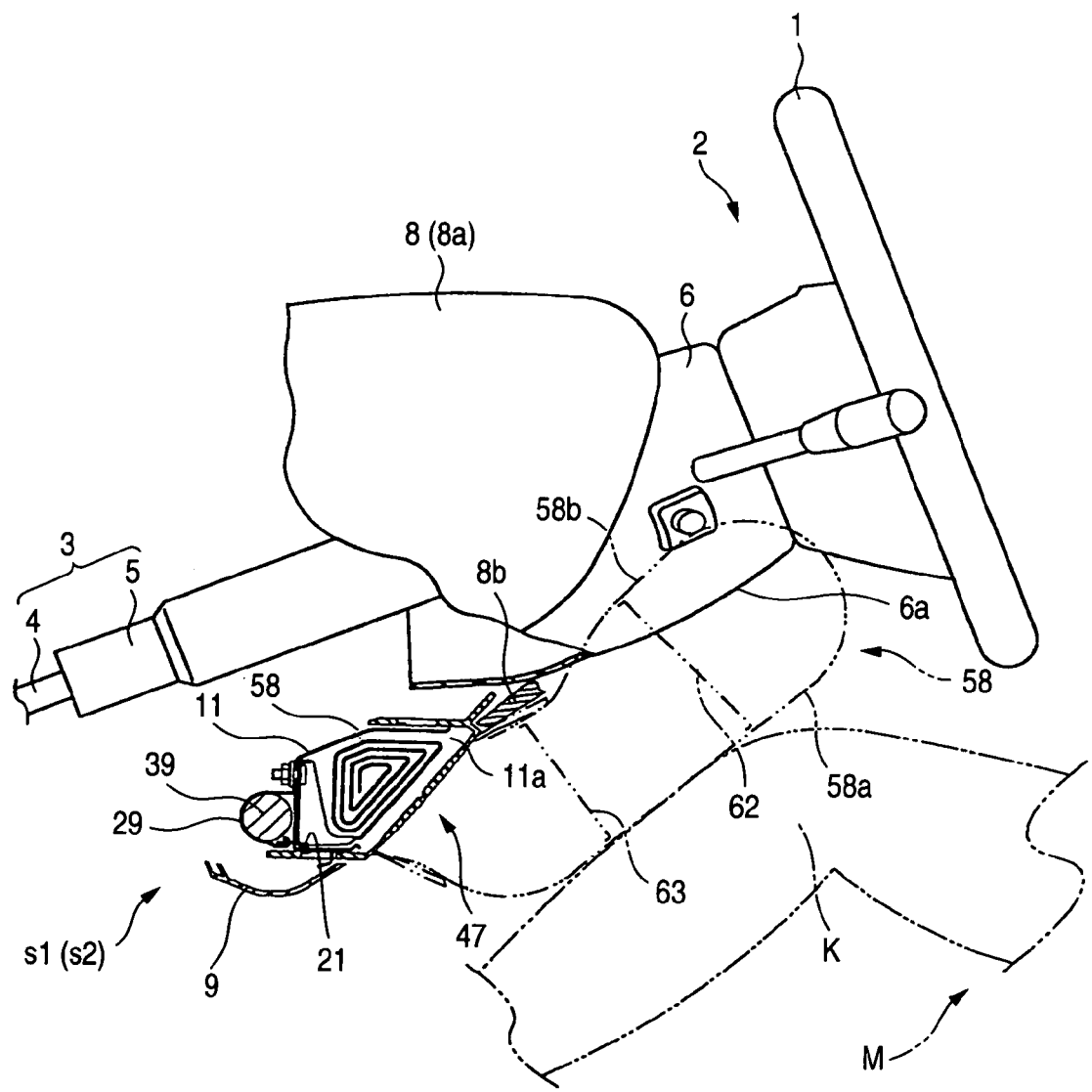
FIG. 1 is a schematic longitudinal section taken in the longitudinal direction of a vehicle and showing the used state of a knee protecting airbag device according to first embodiment or second embodiment of the invention.

The steering column 2 is constructed, as shown in FIG. 1, to include a column body 3 connected to a steering wheel 1, and a column cover 6 arranged to cover the column body 3 below the steering wheel 1. The column body 3 is constructed to include a main shaft 4 and a column tube 5 enclosing the main shaft 4.

The column cover 6 is made of a synthetic resin into a generally square tube shape and is so arranged along the axial direction of the column body 3 as to cover the column body 3. The rear face 6a of that portion in the column cover 6, which protrudes from an instrument panel 8, is formed into a generally rectangular plate shape and curved up backward in the vehicular longitudinal direction.

The knee protecting airbag device S1 is constructed to include: a folded airbag 58; an inflator 39 for providing the airbag 58 with an inflating gas; a case 11 accommodating the folded airbag 58 and opened on the vehicular rear side; a retainer 21 for attaching the airbag 58 to the case 11; airbag cover 47 for covering the vehicular rear side of such an opening 11a in the case 11 for protruding the airbag 58; and an attachment bracket 29 to be used for assembling the retainer 21 and the inflator 39 with the case 11.

The case 11 is made of a sheet metal and arranged on the lower side of the steering column 2, as shown in FIGS. 1 to 5 and FIG. 8. The case 11 is formed into a bottomed box shape and is constructed to include a base wall part 15 of a generally rectangular sheet shape arranged on the front end side of the case 11, and a peripheral wall part 12 extending in a generally rectangular tube shape to the rear side from the outer peripheral portion of the bottomed wall part 15 and opened on the rear end to have the protrusion opening 11a for the airbag 58. In the case of the embodiment, the base wall part 15 uses the retainer 21 to act as a bag holding wall part 14 to attach the airbag 58.

From the outer surface sides of vertically opposed wall parts 12a and 12b of the peripheral wall part 12, there are protruded a plurality of retaining pawl portions 13 for assembling the airbag cover 47 with the case 11. In the case of the embodiment, the retaining pawl portions 13 are arranged in plurality (four in the embodiment) individually on the upper wall part 12a and the lower wall part 12b and are bent at their leading ends 13a toward the vehicular front side so that their leading ends 13a can be retained on the peripheral portions of retaining holes 50a and 51a formed the later-described upper and lower wall parts 50 and 51 of the airbag cover 47. In the case of the embodiment, the individual retaining pawl portions 13 are formed integrally with the upper and lower wall parts 12a and 12b (as referred to FIGS. 2, 5, 8 and 9) by forming cuts of a predetermined shape in the upper and lower wall parts 12a and 12b and by raising them from the upper and lower wall parts 12a and 12b.

Figure 3:
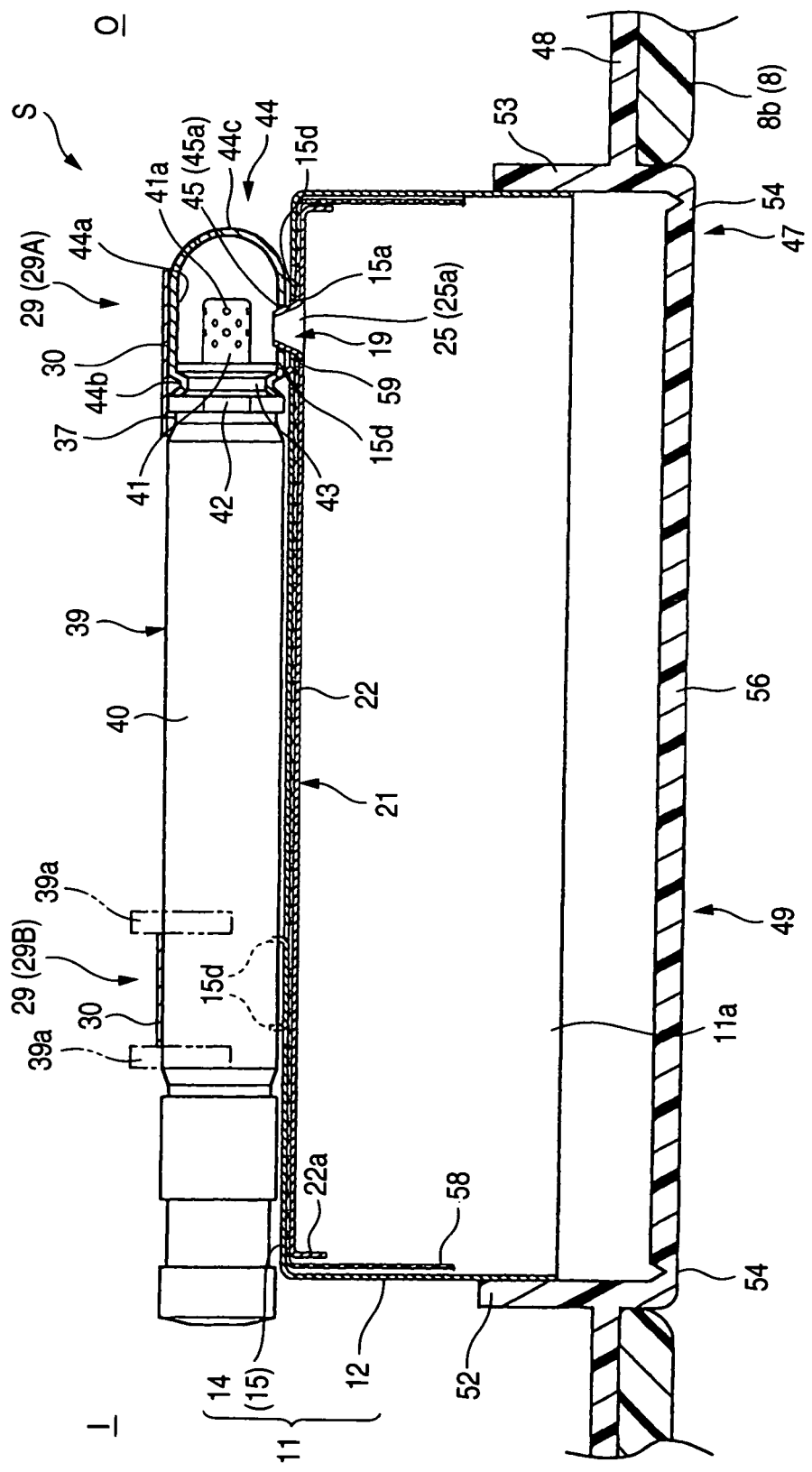
FIG. 3 is a schematic transverse section of portion III-III of FIG. 2.
Figure 5:
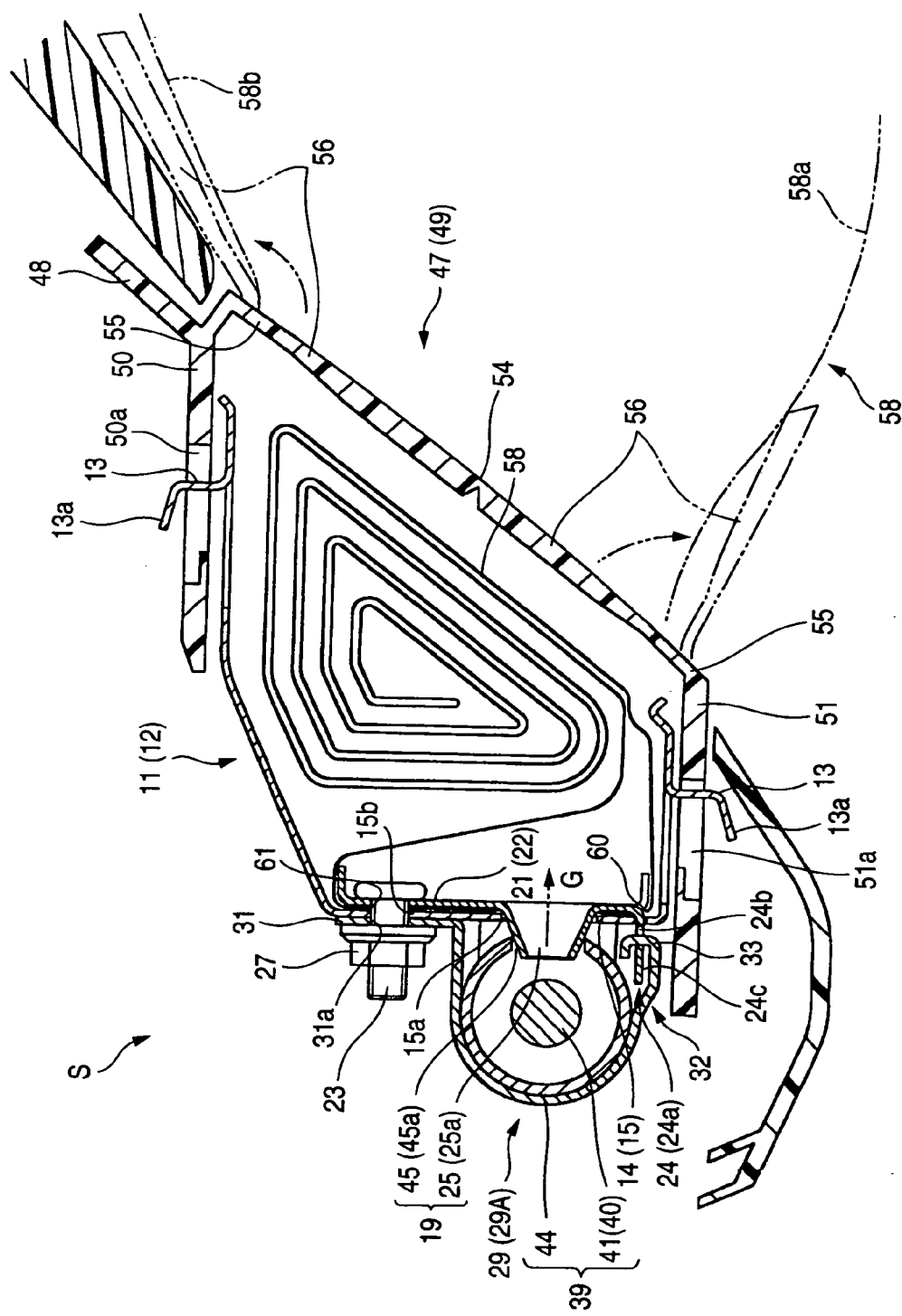
FIG. 5 is a schematic longitudinal section of portion V-V of FIG. 8.
Figure 9:
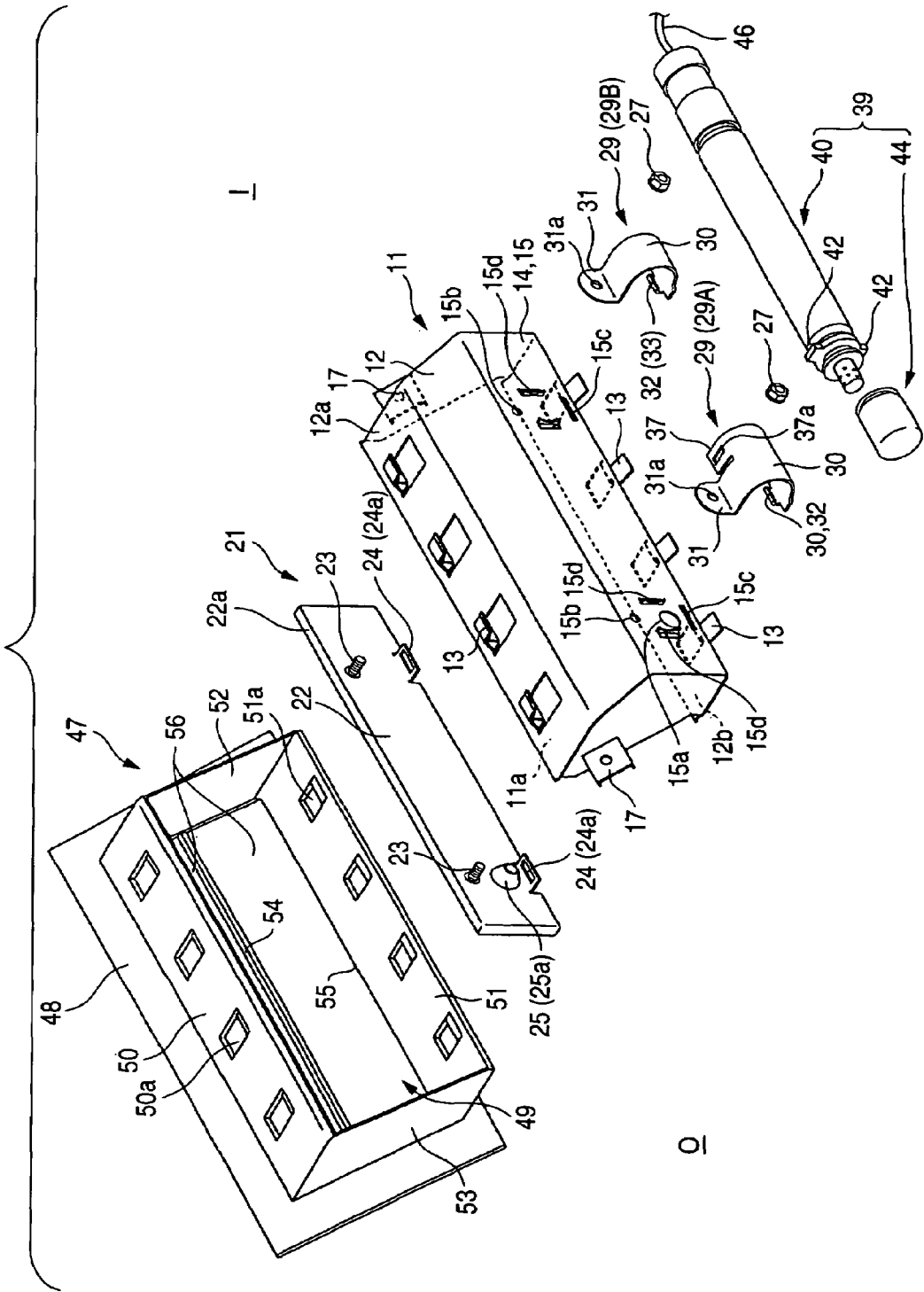
FIG. 9 is an exploded schematic perspective view taken from the front side of the vehicle and showing an airbag cover, a case, a retainer, an attachment bracket and an inflator to be used in the knee protecting airbag device of the first embodiment.

On the end side, i.e., on the right edge side of the vehicular outside O (on the side of a head portion 41 in the inflator 39, as referred to FIG. 3) in the base wall part 15, there is arranged an insertion hole 15a which extends in a circular shape in the longitudinal direction for inserting a guide passage 19 formed by mutual guide portions 25 and 45 of the retainer 21 and a diffuser 44 of the inflator 39. On upper side of the insertion hole 15a, as shown in FIGS. 5 and 9, there is formed a through hole 15b which opened in a circular shape for inserting bolts 23 of the retainer 21. On the lower side of the insertion hole 15a, on the other hand, there is formed a through hole 15c, which transversely extends and is opened.

Moreover, the through holes 15b and 15c are arranged (as referred to FIGS. 2 and 9) in upper and lower portions of the left edge side of the base wall part 15 on the side of a vehicular inside I while keeping vertical spacing from the insertion hole 15a.

On the base wall part 15 near and between the upper and lower through holes 15b and 15c, there are transversely juxtaposed support members 15d, which are formed in a sheet shape along the vertical direction and recessed in such a semicircular shape as can support the outer circumference of the inflator 39. Here, the individual through holes 15c are arranged between the support members 15b adjoining each other and transversely opposed to each other and have a transverse width size slightly smaller than the distance between the opposed support members 15d and 15d.

Figure 8:
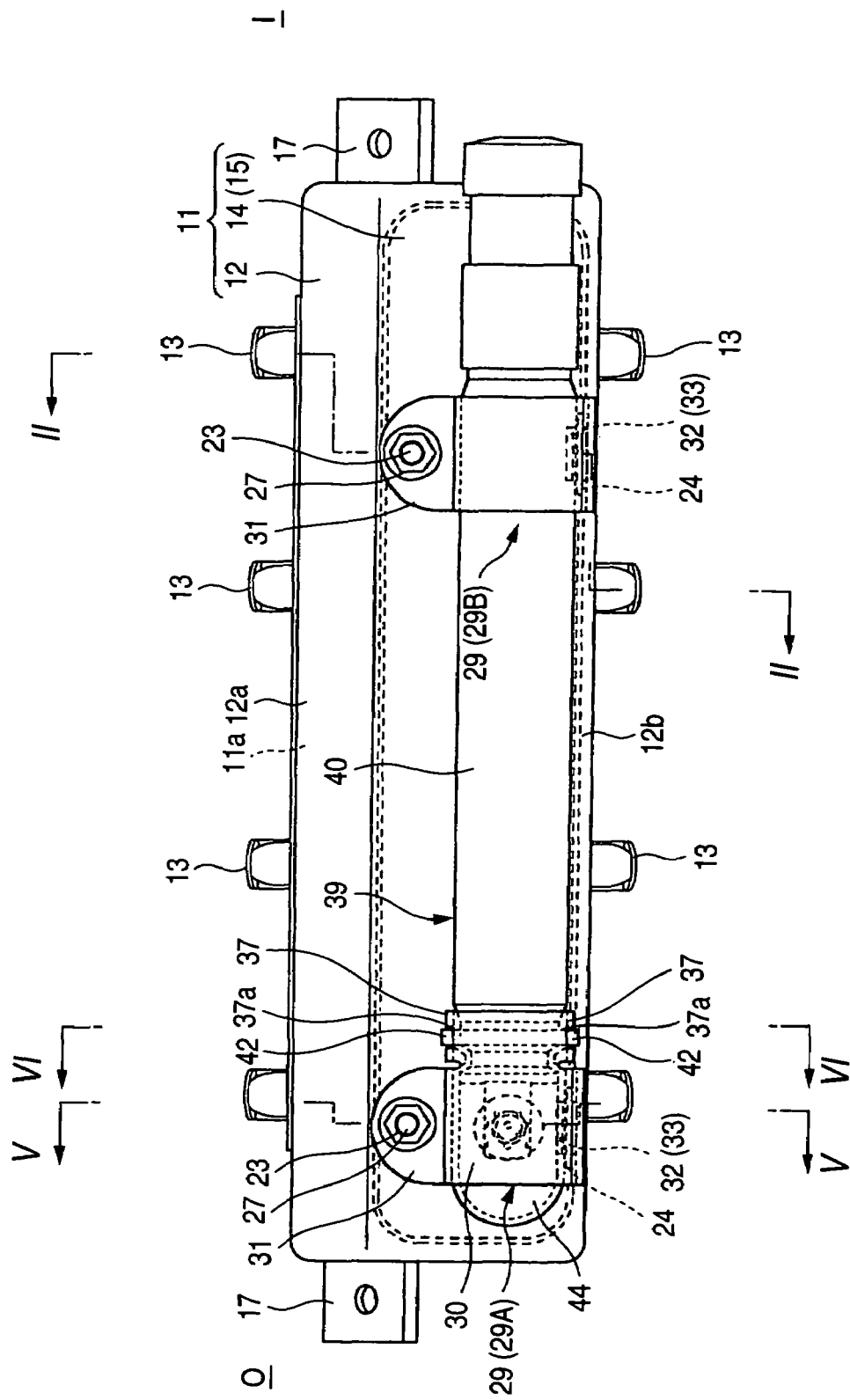
FIG. 8 is a front view taken from the front side of a vehicle and showing the state in which the inflator of the first embodiment is attached to a case base wall part.

At the portions of the case peripheral portion of the opening 11a in the case peripheral wall part 12, as shown in FIGS. 8 and 9, there are arranged mounting brackets 17 for mounting and fixing the case 11 on the body side of the vehicle. In the case of the embodiment, the mounting brackets 17 are arranged at three portions: at positions near the upper end of the two left and right edge sides of the opening 11a and at the position (although not shown) near the transverse center on the lower edge side of the opening 11a. These mounting brackets 17 are mounted and fixed on the not-shown instrument panel reinforcements or the like arranged on the body side of the vehicle.

Figure 4:
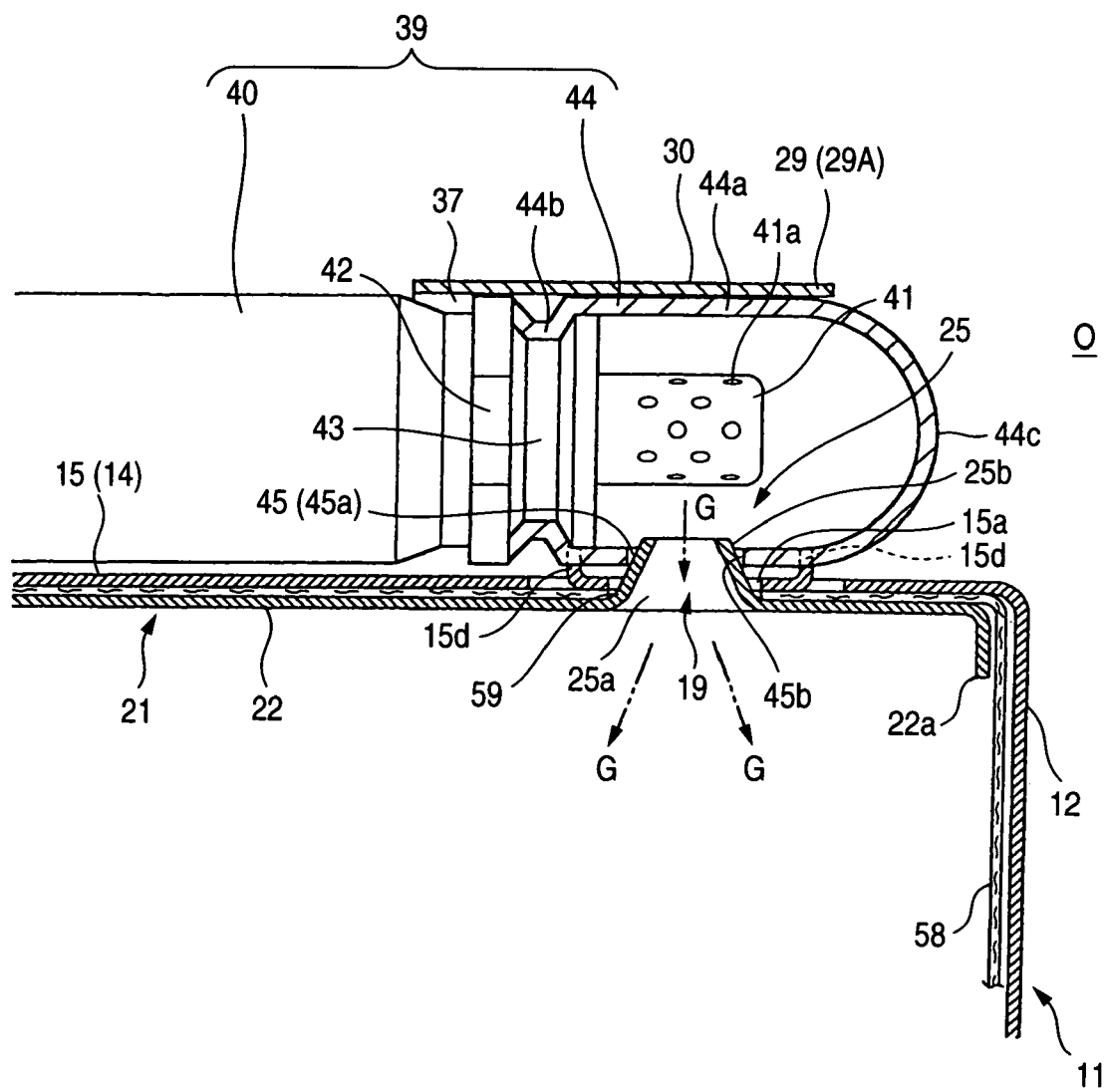
FIG. 4 is an enlarged view of the vicinity of a guide portion of FIG. 3.

The retainer 21 is made of a sheet metal and is provided, as shown in FIGS. 2 to 6 and FIG. 9, with a rectangular, sheet-shaped base portion 22 slightly smaller than the external shape of the base wall part 15 of the case 11. This base portion 22 is provided with a reinforcing rib 22a on its outer peripheral portion. From the end portion side of the base portion 22 on the side of the vehicular outside O to the vehicular front side, as shown in FIGS. 4, 5 and 7, there is protruded a tubular portion 25a which is converged as the tapered guide portion 25 toward the vehicular front side.

Above the tubular portion 25a, as shown in FIGS. 5, 7, and 9, the aforementioned bolts 23 are protruded toward the vehicular front side. Below the tubular portion 25a, on the other hand, connecting members 24 are protruded toward the vehicular front side. These bolts 23 and connecting members 24 are arranged at upper and lower portions of the left edge side of the base portion 22 on the side of the vehicular inside I while keeping the vertical spacing of the tubular portion 25a. The bolts 23 and 23 and the connecting members 24 and 24 are formed at such portions and with such sizes as can be inserted through the corresponding through holes 15b and 15c of the case base wall part 15.

At the individual connecting members 24, moreover, there are arranged retaining portions 24a, which are provided with retaining holes 24*b* having a transversely extending rectangular shape and vertically extending.

Here, the individual bolts 23, the tubular portion 25*a* and the individual connecting members 24 are constructed to extend toward the front side through not only the base wall part 15 (and the bag holding wall part 14) of the case 11 but also the airbag 58.

The inflator 39 is formed into a cylinder type and is arranged, as shown in FIGS. 2 to 6 and FIGS. 8 and 9, transversely its axial direction on the front outer side of the base wall part 15 acting as the bag holding wall part 14 of the case 11. The inflator 39 is constructed to include a generally columnar body 40 and the diffuser 44 made of a sheet metal. The body 40 is provided with the head portion 41, in which a plurality of gas discharge ports 41*a* for discharging an inflating gas G are arranged on the end of the vehicular outside O or on one transverse end side. In the vicinity of the head portion 41, moreover, there are arranged regulating protrusions 42 of a rectangular sheet shape extending on the two sides of the diametrical direction. In the body 40 between the regulating protrusions 42 and the head portion 41, on the other hand, a groove 43 is formed in the entire circumference for caulking and fixing the diffuser 44.

This diffuser 44 is provided with a generally cylindrical circumferential wall part 44*a*, which has its end portion closed with a semispherical base wall part 44*c*. In the circumferential wall part 44*a*, there is formed (as referred to FIG. 4) the guide portion for fitting the guide portion 25 of the retainer 21. The guide portion 45 is provided with a fitting hole 45*a*, which can insert and fit the tapered tubular portion 25*a* of the guide portion 25. This diffuser 44 can be fixed on the inflator body 40 to form the inflator 39, when an open circumferential edge 44*b* of the circumferential wall part 44*a* apart from the base wall part 44*c* is arranged so far as the portion of the groove 43 of the body 40 while covering the head portion 41 of the inflator body 40, and when the open circumferential edge 44 is caulked to a smaller diameter all over the circumference and is fitted in the groove 43.

Here, the inflator 39 of the embodiment is given a slightly smaller length size than the transverse width size of the case base wall part 15 and is arranged such that the head portion 41 is offset toward one transverse end portion side (i.e., toward the right edge side or the vehicular outside O in the embodiment) of the base wall part 15.

As shown in FIGS. 2, 3, 5 and 9, the airbag cover 47 is formed of a thermoplastic elastomer such an olefin group and is so assembled with the case 11 as can cover the vehicular rear side of the case 11. Moreover, the airbag cover 47 is arranged on the side of a lower panel 8*b* of the instrument panel 8, which is composed of an upper panel 8*a* (as referred to FIG. 1) and the lower panel 8*b* (as referred to FIGS. 2 and 3) in the vertical arrangement. The airbag cover 47 is provided with a door arranging portion 49 arranged near the protrusion opening 11*a* of the case 11, and a general portion 48 arranged around the door arranging portion 49.

The lower panel 8*b* is arranged around the door arranging portion 49 and adjacent to the door arranging portion 49. In the case of the embodiment, the door arranging portion 49 and the lower panel 8*b* are arranged generally flush with the face on the vehicular rear side (as referred to FIG. 3). Moreover, the door arranging portion 49 is constructed to include a door portion 56, and upper, lower, left and right side wall parts 50, 51, 52 and 53 arranged at the portions near the peripheral portion of the door portion 56.

The door portion 56 is formed into such a generally rectangular sheet shape slightly larger than the opening 11*a* of the case 11 as to cover the opening 11*a*. In the embodiment, the door portion 56 is composed of two door portions to be vertically opened. Moreover, these individual door portions 56 are provided at the upper end and at the lower end with hinged portions 55 acting as the center of opening motions. The door portions 56 are further provided therearound with thinned portions 54 to be broken, at the portions which take a generally H-shape, as viewed from the vehicular rear side.

The upper side wall part 50, the lower side wall part 51, the left side wall part 52 and the right side wall part 53 are so individually arranged adjacent to the outer peripheral side of the peripheral wall part 12 in the case 11 as to protrude toward the vehicular front side. Moreover, the upper side wall part 50 arranged near the upper wall part 12*a* and the lower side wall part 51 arranged near the lower wall part 12*b* are used as assembly members for assembling the airbag cover 47 with the case 11. In the upper side and lower side wall parts 50 and 51, respectively, there are arranged the retaining holes 50*a* and 51*a*, which are opened in the generally rectangular shape to retain the retaining pawl portions 13 formed on the case peripheral wall part 12, on the peripheral portion.

Figure 2:
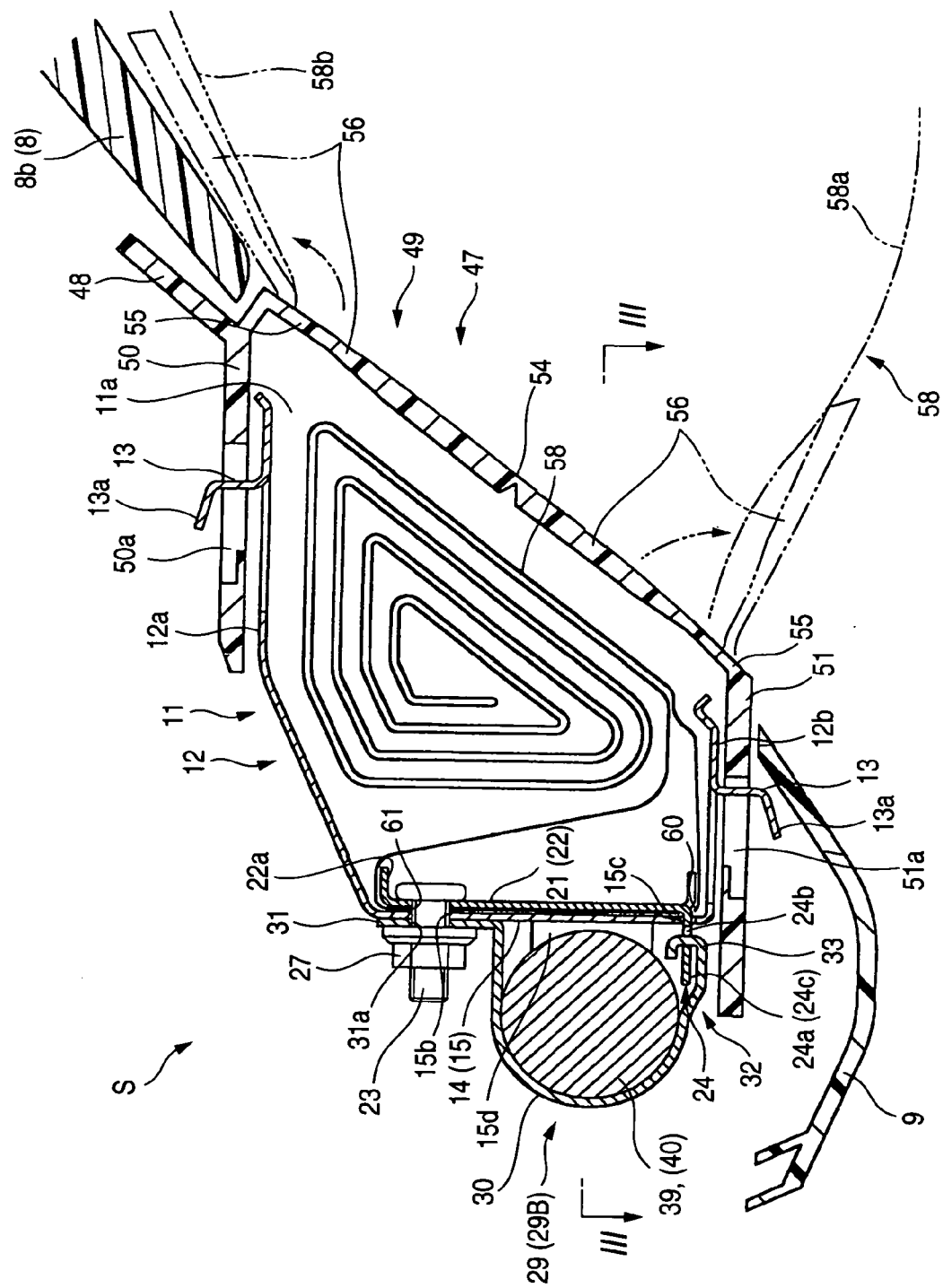
FIG. 2 is an enlarged schematic longitudinal section taken in the vehicular longitudinal direction of the knee protecting airbag device of the first embodiment and showing portion II-II of FIG. 8.

As shown in FIGS. 2 and 3, the general portion 48 is recessed by the thickness of the lower panel 8*b* from the door arranging portion 49 toward the vehicular front side as to make no interference with the lower panel 8*b* arranged around the door arranging portion 49.

The airbag 58 is formed of woven fabric of polyester or polyamide yarns having a flexibility into a generally rectangular sheet shape having a transverse width size capable of protecting the two left and right knees of the driver M as the occupant, as viewed from the vehicular rear side at the expansion/inflation completion time. Moreover, an inlet opening 59 and insertion holes 60 and 61 are formed at the portions on the lower end side of the airbag 58 at the expansion completion time (as referred to FIGS. 2 to 5). The inlet opening 59 is formed in a circular shape at a position corresponding to the guide passage 19 thereby to guide the inflating gas G discharged from the gas discharged ports 41*a* of the inflator 39, into the airbag 58. As shown in FIGS. 2 and 5, the insertion holes 60 insert the two connecting members 24 of the retainer 21 and are disposed at two predetermined portions, and the insertion holes 61 insert the two bolts 23 of the retainer 21 and are disposed at two predetermined portions. Moreover, the airbag 58 is attached to the case 11 by protruding the connecting members 24 of the retainer 21 from the insertion holes 60 and by protruding the bolts 23 of the retainer 21 from the insertion holes 61, so that the peripheral portion of the opening 59 is clamped between the base wall part 15 as the bag holding wall part 14 of the case 11 and the base portion 22 of the retainer 21.

As shown by double-dotted lines in FIG. 1, moreover, the airbag 58 is provided with two upper and lower steps of tethers 62 and 63 for connecting an occupant side wall part 58*a* and a body side wall part 58*b* so that it can keep the plate shape when it completes the expansion and inflation. The individual tethers 62 and 63 are arranged in the transverse direction such that spaces for passing the inflating gas G are formed on the two left and right end sides between themselves and the wall parts 58*a* and 58*b*.

As the attachment bracket 29, there are employed an attachment bracket 29A, which is arranged at the position of the diffuser 44 on the right end side of the inflator 39, and an attachment bracket 29B which is arranged on the left end side of the inflator 39. Each of the attachment brackets 29A and 29B is formed of a sheet metal into a U-shaped section, and is constructed, as shown in FIGS. 2 to 9, to include: a cover portion arranged in the circumferential direction of the inflator 39 for covering the front side of the inflator 39 apart from the base wall part 15 of the case 11; and a fixing portion 31 and a retaining portion 32 arranged on the two upper and lower edges of the cover portion 30 along the circumferential direction of the inflator 39. As shown in FIGS. 2, 5 and 7, the fixing portion 31 is formed by bending the rear end of the upper end side of the cover portion 30 upward, and has a through hole 31a arranged to insert the bolt 23 to fasten a nut 27. The retaining portion 32 is constructed to have a hooked hook member 33 by turning back the rear end of the lower edge side of the cover portion 30 partially toward the vehicular front side. The hook member 33 is inserted into the retaining hole 24b formed in the retaining portion 24 of the retainer 21, thereby to retain a front edge 24c. Here, FIG. 7 shows the vicinity of the guide portion 25 of the retainer 21 and the attachment bracket 29A. At the connecting time of the two, the inlet opening 59 of the airbag 58 and the base wall part 15 of the case 11 intervene as a matter of fact.

Moreover, the length size of the attachment bracket 29A in the longitudinal direction of the vehicle, that is, the length side of the upper and lower edges of the cover portion 30 in the vehicular longitudinal direction is determined such that the attachment bracket 29A acts like the "lever" to force the guide portion 25 to contact with the guide portion 45 when the attachment bracket 29A is connected to the retainer 21. Specifically, the retainer 21 holding the peripheral portion of the inlet opening 59 of the airbag 58 insert the guide portion 25, the bolts 23 above and below the guide portion 25, and the connecting member 24 through the peripheral portion of the inlet opening 59 of the airbag 58 and the case base wall part 15. In this state, the hook member 33 of the retaining portion 32 is retained on the front edge 24c of the connecting portion 24. Then, the bolts 23 are inserted into the through holes 31 while applying the cover portion 30 to the front face side of the inflator 39 supported in abutment against the support members 15d, thereby to bring the fixing portion 31 on the front face of the base wall part 15 at the peripheral portions of the through holes 15b. The nuts 27 are fastened on the bolts 23 to fix the fixing portion on the base wall part 15. Then, the attachment bracket 29A presses like the lever the inflator 39 toward the case base wall part 15 around the retaining portion front edge 24c of the retainer 21, but receives a reaction from the inflator 39 to pull the bolts 23 and the connecting member 24 of the retainer 21 toward the inflator 39 so that the guide portion 25 is forced to contact with the guide portion 45 of the diffuser 44.

Although the attachment bracket 29B is not disposed at a part of the guide portions 25 and 45, a length in the longitudinal direction of the vehicle, namely the length of the upper and lower edges of the cover portion 30 in the longitudinal direction of the vehicle is predetermined similarly to the attachment bracket 29A.

Figure 6:
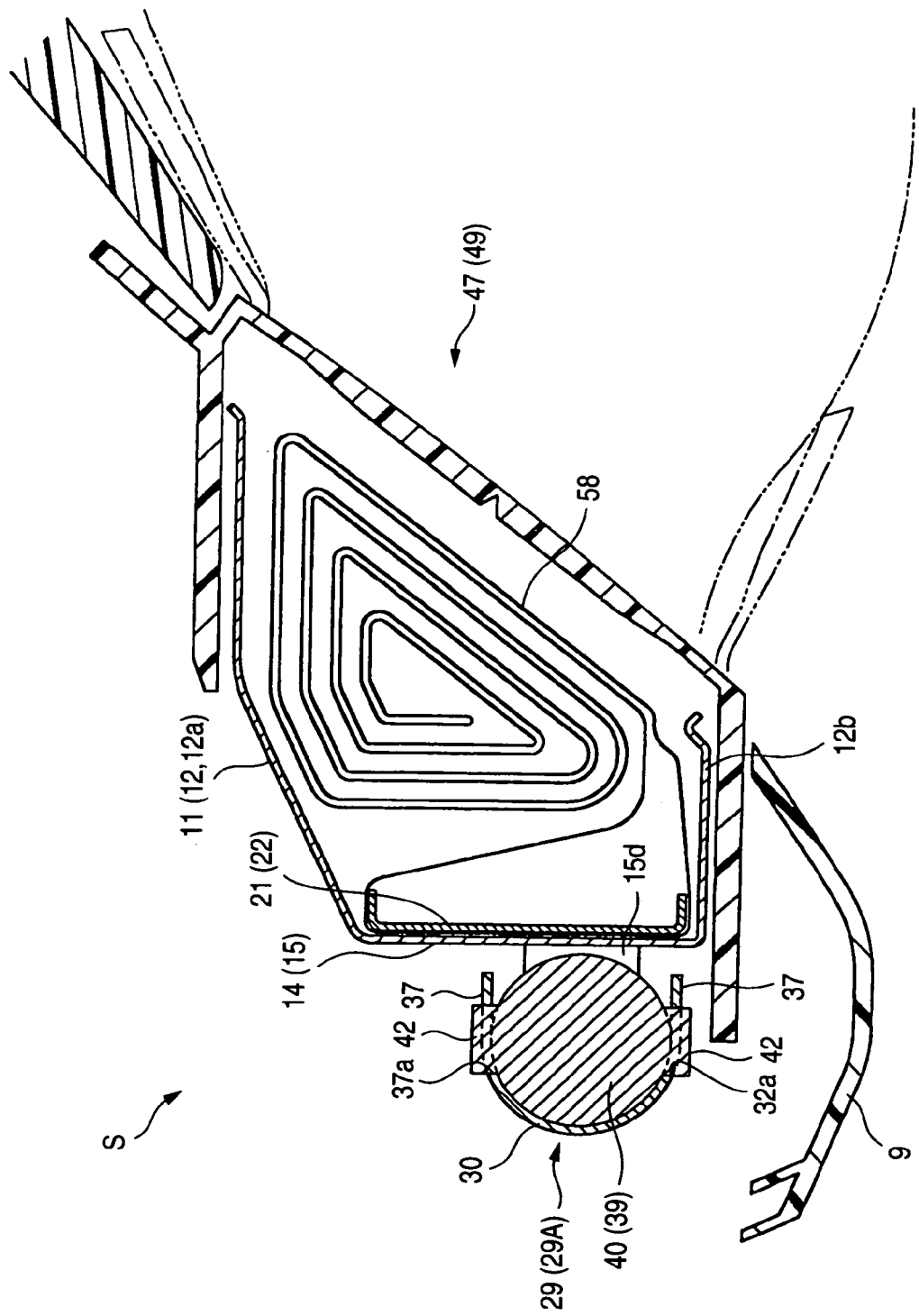
FIG. 6 is a schematic longitudinal section of portion VI-VI of FIG. 8.

From the attachment bracket 29A, as shown in FIGS. 6 and 8, there are protruded a pair of regulating member portions 37 and 37, which extend from the edges of the cover portion 30 on the side of the vehicular inside I and which are opposed to each other. In those regulating member portions 37 and 37, there are individually formed retaining holes 37a, which can insert the regulating protrusions 42 of the inflator body 40. These paired regulating member portions 37 are arranged to prevent the deviation along the axial direction (i.e., along the transverse direction in the case of the embodiment) of the inflator 39.

Here will be described the mounting operation of the knee protecting airbag device S1 of the embodiment on the vehicle. First of all, the tubular portion 25a is protruded from the inlet opening 59, and the individual connecting members 24 are protruded from the corresponding insertion holes 60. Moreover, the retainer 21 is housed in the airbag 58 such that the bolts 23 are protruded from the insertion holes 61, and the airbag 58 is folded up. Next, the airbag 58 is wrapped with the not-shown breakable wrapping film for preventing the folding collapse. At this time, the tubular portion 25a, the connecting members 24 and the bolt 23 of the retainer 21, which are protruded from the opening 59 and the insertion holes 60 and 61, are protruded from the wrapping film.

Next, the folded airbag 58 is accommodated together with the retainer 21 in the case 11 such that the tubular portion 25a, the bolt 23 and the connecting members 24 of the retainer 21 are individually protruded from the insertion hole 15a and the through holes 15b and 15c formed in the case base wall part 15.

Then, the inflator 39 is arranged, while abutting against the individual support members 15b, on the front side of the case base wall part 15, and the hook members 33 of the retaining portions 32 of the individual attachment brackets 29A and 29B are inserted into the retaining holes 24b of the retaining portions 24a of the individual connecting members 24 so that they are retained on the front edge 24c. While the regulating protrusions 42 are being inserted into the retaining holes 37a of the regulating member portions 37 and 37, the bolts 23 are inserted into the through holes 31a of the fixing portions 31 of the individual brackets 29A and 29B, and the nuts 27 are fastened on the bolts 23 protruding from the individual through holes 31a.

Then, the attachment bracket 29 (29A or 29B) is caused, by the reaction from the inflator 39 at the time when the inflator 39 is pressed onto the case base wall part 15 acting as the bag holding wall part 14, to pull the bolts 23 and the connecting members 24 of the retainer 21 toward the front side to the inflator 39, so that the retainer 21 and the attachment bracket 29 are firmly connected through the peripheral portion of the inlet opening 59 of the airbag 58, the case base wall part 15 and the inflator 39. Thus, the airbag 58 and the inflator 39 can be firmly held in the case 11.

At this time, the guide portions are fitted on each other such that the outer circumference 25b of the tubular portion 25a of the guide portion 25 is pressed to contact with the inner circumference 45b of the fitting hole 45a of the guide portion 45.

After this, the airbag cover 47 is assembled with the case 11 such that the leading ends 13a of the individual retaining pawl portions 13 are retained on the peripheral portions of the individual retaining holes 50a and 51a. The mounting brackets 17 of the case 11 are attached and fixed on the not-shown instrument panel reinforcements or the like on the body side, and a lead wire (as referred to FIG. 9) to be connected with the airbag activation circuit is connected to the body 40 of the inflator 39. Moreover, the instrument panel 8 and an under cover 9 (as referred to FIGS. 1 and 2) are attached. Thus, the knee protecting airbag device S1 can be mounted on the vehicle.

If an activation signal is inputted to the body 40 of the inflator 39 via the lead wire 46 after the airbag device S1 was mounted on the vehicle, the inflating gas G is discharged into the diffuser 44 from the gas discharge ports 41a formed in the head portion 41 so that it flows from the diffuser 44 into the airbag 58 via the guide passage 19 positioned on the inner circumference side of the inlet opening 59 of the airbag 58. Then, the airbag 58 is inflated by the inflating gas G and breaks the not-shown wrapping member and presses the door portion 56 of the airbag cover 47. The inflating gas G then breaks the portions 54 to be broken, and opens the door portions 56 vertically while turning on the hinged portions 55. As a result, the airbag 58 is expanded and inflated till its inflation is completed, as indicated by the double-dotted lines in FIG. 1.

In the knee protecting airbag device S1 of the embodiment, moreover, the bolts 23 and the connecting members 24 of the retainer 21 are brought along the peripheral portion of the inlet opening of the airbag 58 and the base wall part 15 as the bag holding wall part 14 of the case 11 and are opposed to each other through the inflator 39. Next, the retaining portions 32 of the attachment bracket 29 are retained on the retaining portions 24a of the connecting members 24, and the bolts 23 pass through the through holes 31a of the fixing portions 31 and are fastened in the nuts 27, so that the retainer 21 and the attachment bracket 29 are connected to each other thereby to assemble the airbag 58, the retainer 21 and the inflator 39 with the case 11. At the same time, the guide portions 25 and 45 of the retainer 21 and the diffuser 44 are fitted on each other to form the guide passage 19 for guiding the inflating gas G into the airbag 58.

In the knee protecting airbag device S1 of the embodiment, more specifically, when the retainer 21 and the inflator 39 are to be assembled with the case 11, the guide passage 19 for guiding the inflating gas G into the airbag 58 can be easily formed by fitting the predetermined guide portions 25 and 45 on each other. In addition to this simple construction, the mutual fitting directions of the guide portions 25 and 45 of the retainer 21 and the diffuser 44 of the inflator 39 are set along the longitudinal direction of the vehicle, i.e., in the direction to assemble the retainer 21 and the inflator 39 with the case 11. The sealing properties of the guide portions 25 and 45 can be easily retained merely by those simple constructions.

Of course, not the inflator 39 but the flexible airbag 58 is accommodated in the folded shape in the case 11. Therefore, the airbag 58 can be accommodated so far as to the corners of the case 11 so that the case 11 can be made compact.

In the knee protecting airbag device S1 of the embodiment, therefore, even if the inflator 39 is arranged outside of the case 11, the inflating gas G can be guided without any leakage in the airbag 58 by the simple constructions.

In the embodiment, moreover, the airbag 58 can be folded up without housing the inflator 39 requiring handling cares, so that its folding step can be easily automated.

In the knee protecting airbag device S1 of the embodiment, moreover, the inflator 39 and the retainer 21 to be arranged along the base wall part 15 as the bag holding wall part 14 of the case 11 are connected to each other and assembled with the case 11, while clamping the peripheral portion of the inlet opening 59 of the airbag 58 and the base wall part 15 of the case 11, by making use of the mounting bracket 29. The inflator 39 is assembled with the case 11 in the direction normal to the case base wall part 15. The inflator 39 provided with the generally columnar body 40 can be assembled with the case 11 by moving it not in its axial direction but in the direction perpendicular to the axis so that the working space at the assembling time can be made compact. In other words, in the case of the embodiment, the bag holding wall part 14 of the case 11 is the base wall part 15 located on the front face of the case 11 in the state where the airbag device S1 is mounted on the vehicle, and the base wall part 15 is arranged transversely and vertically. On the other hand, the inflator 39 is arranged along the case bag holding wall part 14 and in the direction having its axis (i.e., in the axial direction of the inflator body 40) along the transverse direction when the device S1 is mounted on the vehicle. In this case, the inflator 39 can be assembled with the bag holding wall part 14 of the case 11 in the direction perpendicular to its axis, where it is moved from the vehicular front side to the rear side. Therefore, the inflator 39 need not be brought in the moving direction along the transverse direction or its axial direction to the bag holding wall part 14 of the case 11. In case the inflator 39 is brought in the direction along the transverse direction or its axial direction to the bag holding wall part 14 of the case 11, more specifically, the working space needs at least the large length size along the axial direction of the inflator 39 and the width size in the transverse direction of the case 11, so that it must be large in the transverse direction.

In the embodiment, moreover, the attachment bracket 29 the two circumferential edges of the inflator 39 with the bolts 23 and the nuts 27, but retains the hook members 33 of the retaining portions 32 on one edge side, on the front edge 24c of the peripheral portions of the retaining holes 24b in the retaining portions 24a of the connecting members 24 of the retainer 21. By the arrangement of no nut on the side of the retaining portion on one edge side, therefore, the width size along the circumferential direction of the inflator 39 can be reduced to reduce the mounting space at the base wall part 15 as the bag holding wall part 14 of the case 11. On the other hand, the vertical width size of the base wall part 15 itself can be made compact.

In the embodiment, still moreover, at the peripheral portion of the inlet opening 59 of the airbag 58, the bolts 23 and the connecting members 24 of the retainer 21 can pass through the through holes 61 and 60 to regulate the movement of the peripheral portion of the inlet opening 59. Therefore, the deviation of the peripheral portion of the inlet opening 59 of the airbag 58 at the inflating time can be prevented to keep the smooth introduction of the inflating gas G into the airbag 58.

In the embodiment, moreover, the guide portion 25 of one of the retainer 21 and the diffuser 44 is formed into the tubular portion 25a extending to the other side, and the guide portion 45 on the other side is formed to have the fitting hole for fitting the tubular portion 25a. In this construction, therefore, the tubular portion 25a can be easily inserted into the fitting hole 45a. As a result, the positioning between the guide portions 25 and 45 of the retainer 21 and the diffuser 44 can be made easy to smoothen the works to assemble the retainer 21 and the inflator 39 with the case 11. Moreover, the guide portions 25 and 45 are fitted on each other by inserting the tubular portion into the fitting hole 45a, so that the contact between the outer circumference of the tubular portion 25a and the inner circumference 45b of the fitting hole 45a can be easily retained to improve the sealing property easily. Especially in the embodiment, the tubular portion is tapered toward its leading end, and can be so fitted as to bring the tubular portion outer circumference into close contact with the inner circumference 45b of the fitting hole 45a. As a result, the tubular portion outer circumference 25b can be forced to contact with the fitting hole inner circumference 45b thereby to improve the sealing property.

In the case of the embodiment, moreover, at the time of connecting the retainer 21 and the attachment bracket 29, the attachment bracket 29 is caused, by the reaction coming from the inflator 39 at the time the inflator 39 is pressed onto the case base wall part 15 acting as the bag holding wall part 14, to pull the bolts 23 of the retainer 21 and the connecting members 24 toward the front side and toward the inflator 39.

At the portion of the attachment bracket 29A, therefore, the guide portion 25 is pulled toward the diffuser 44 thereby to improve the sealing property better at the time of fitting the guide portions 25 and 45.

Figure 10:
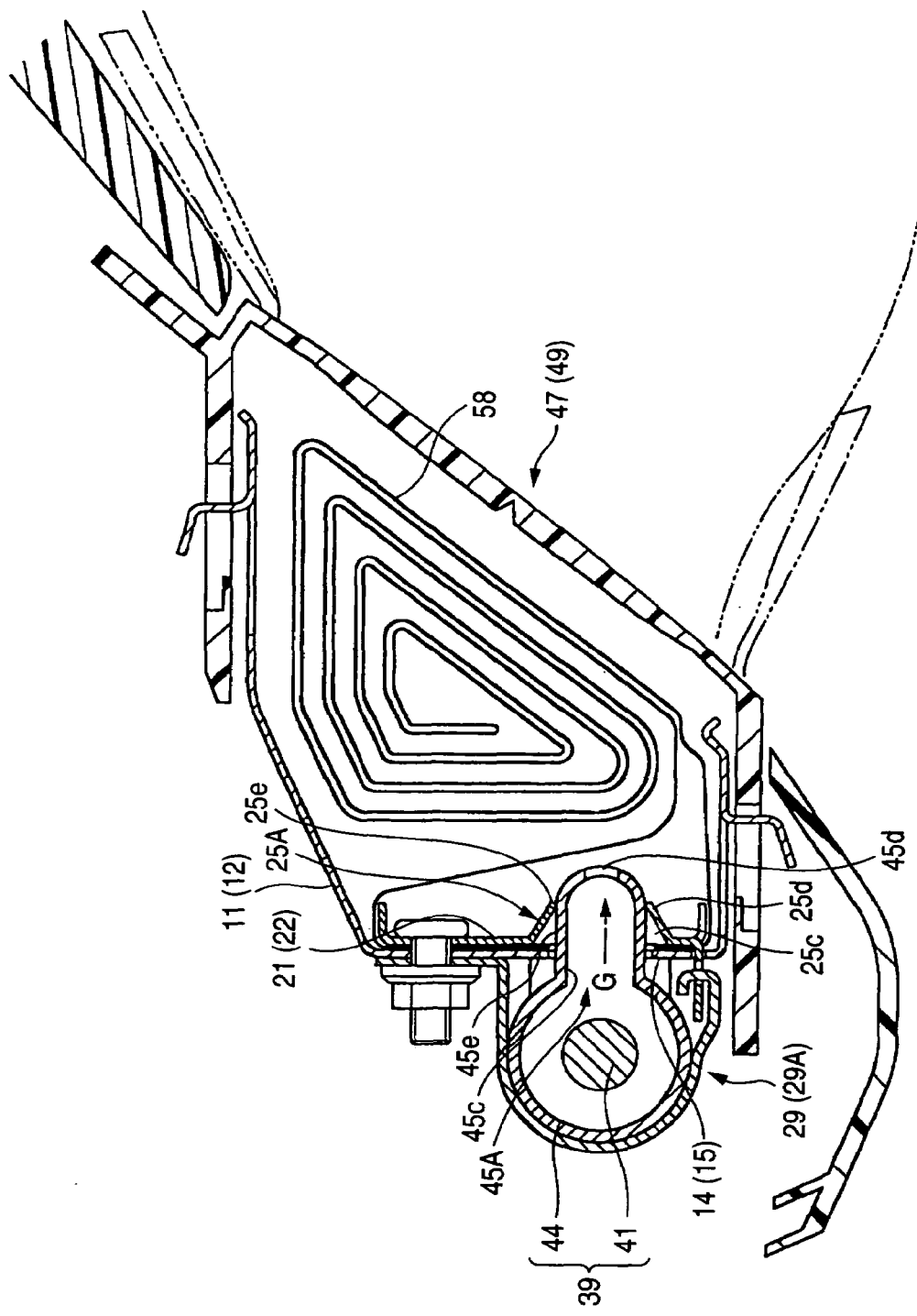
FIG. 10 is an enlarged schematic longitudinal section showing a modification of the knee protecting airbag device of the first embodiment.

Here, the embodiment has been exemplified, in connection with the retainer 21 and the diffuser 44 for forming the guide passage 19, by the constructions, in which the guide portion is formed of the tubular portion 25a and in which the guide portion 45 has the fitting hole 45a for inserting the tubular portion 25a. These constructions may be modified, as shown in FIG. 10. In the diffuser 44 shown in FIG. 10, a guide portion 45A is formed of a column-shaped tubular portion 45c having its leading end side rounded in a semicircle to have an opening 45d, and a guide portion 25A of the retainer 21 has a fitting hole 25c opened in a circular shape having an inner circumference 25e forced to contact with the outer circumference 45d of the tubular portion. Incidentally, the fitting hole 25c has its circumferential edge 25d tapered into a tapered tubular shape toward the vehicular rear side so that it can be easily warped to contact with the outer circumference 45e when the tubular portion 45c is inserted. Thus, a satisfactory sealing property is retained at the time when the guide portions 25A and 45A are fitted on each other.

Moreover, the knee protecting airbag device S1 of the embodiment employs the two attachment brackets 29 (29A and 29B), but may employ one or three or more attachment bracket.

Figure 11:
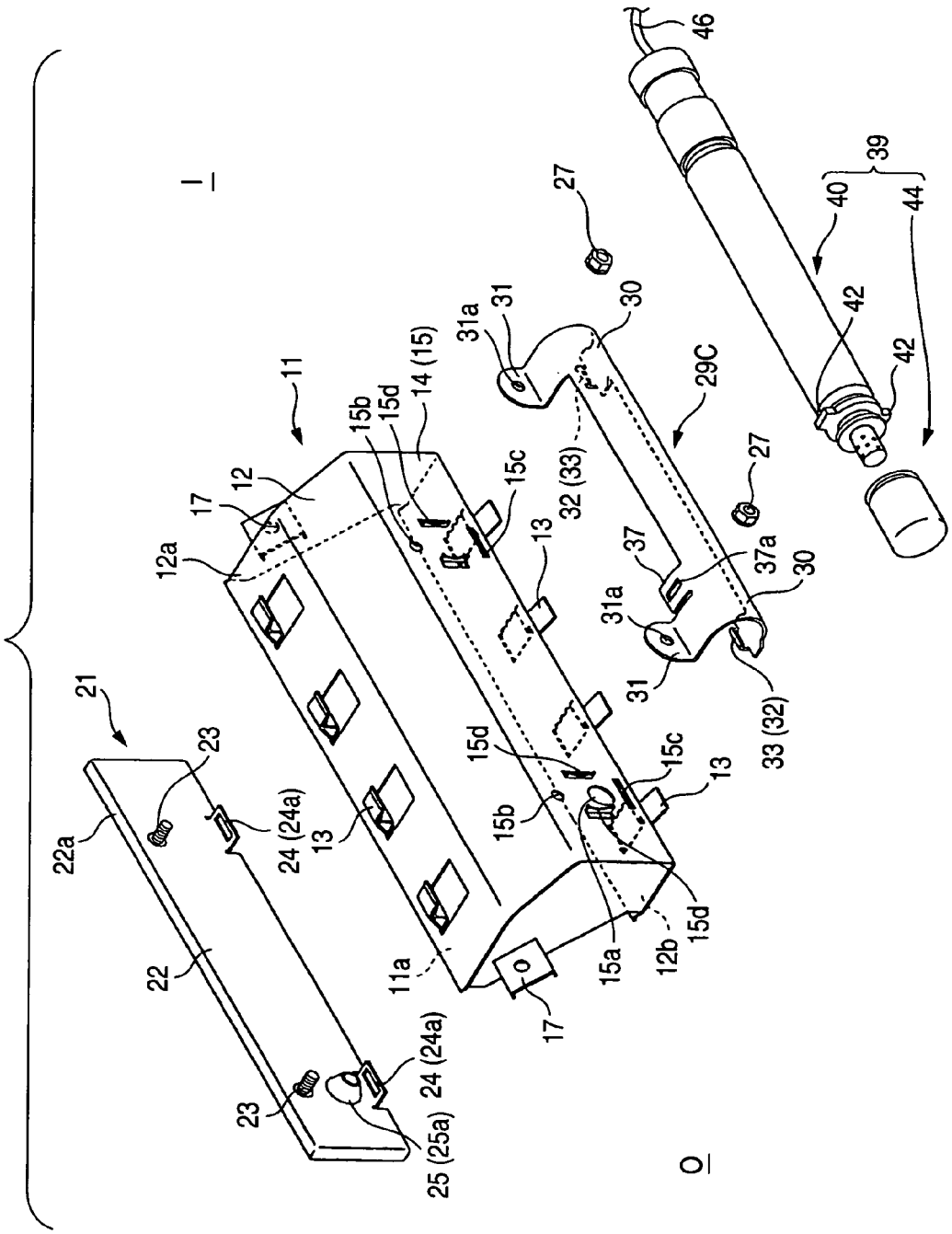
FIG. 11 is an exploded schematic perspective view showing a modification of the attachment bracket to be used in the first embodiment and showing a case, a retainer, an attachment bracket and an inflator, as taken from the front side of the vehicle.

Here, in case one attachment bracket is employed, like an attachment bracket 29C shown in FIG. 11, the attachment brackets 29A and 29B of the embodiment may be connected to each other by the cover portions 30, and the single attachment bracket 29C is provided with a plurality of fixing portions 31 and a plurality of retaining portions 32 thereby to improve the works to connect them to the retainer 21.

Figure 12:
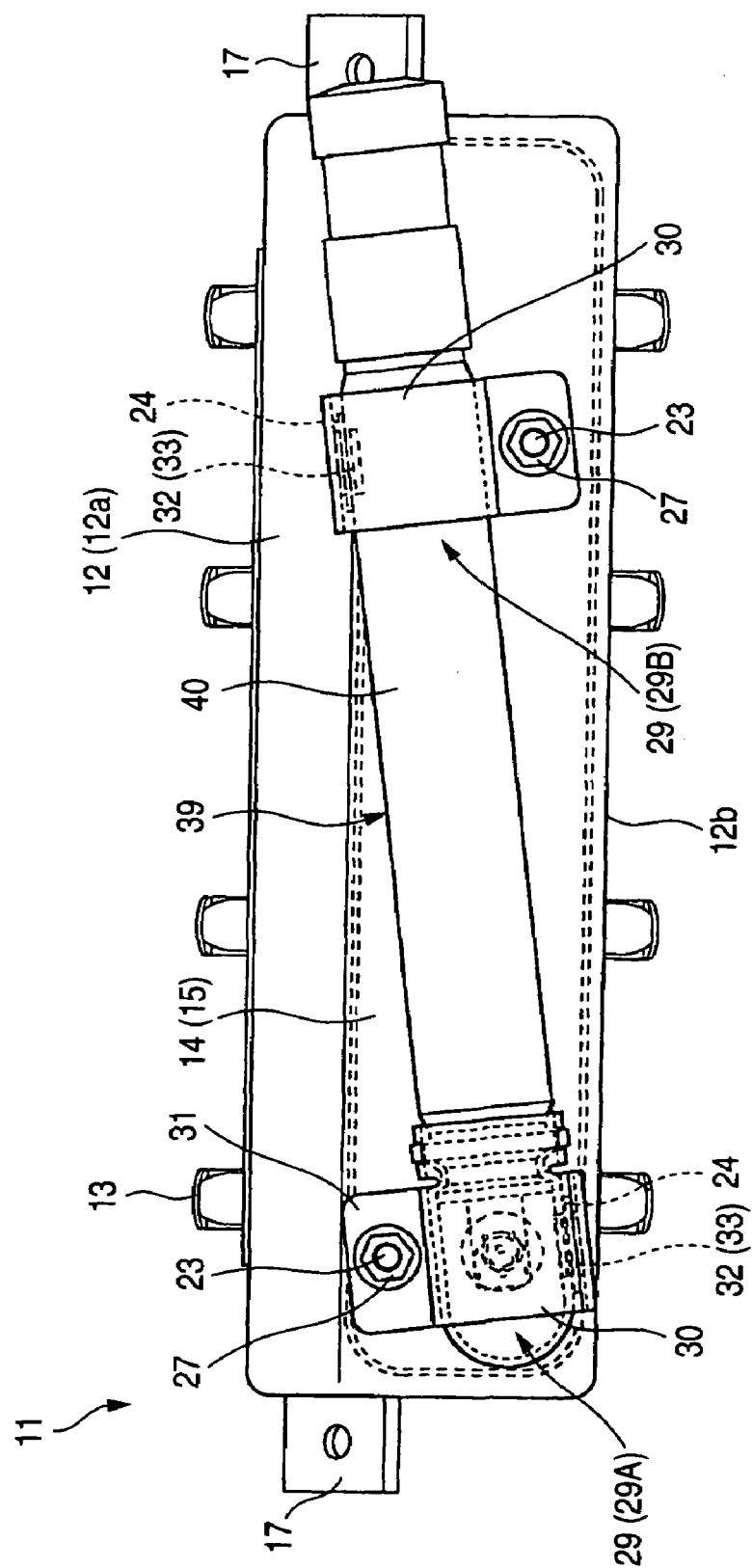
FIG. 12 is a front elevation taken from the vehicular front side and showing the case of the state, in which an inflator of a modification of the knee protecting airbag device of the first embodiment is attached to the base wall part.

In case a plurality of attachment brackets 29 are employed, still moreover, unlike the embodiment, all the fixing portions 31 need not be arranged on the upper side in connection with the arrangements of the fixing portions 31 and the retaining portions 32, but these arrangement may be suitably changed. As shown in FIG. 12, for example, the attachment brackets 29A and 29B may be arranged such that the axial direction of the inflator 39 is vertically inclined.

Figure 13A:
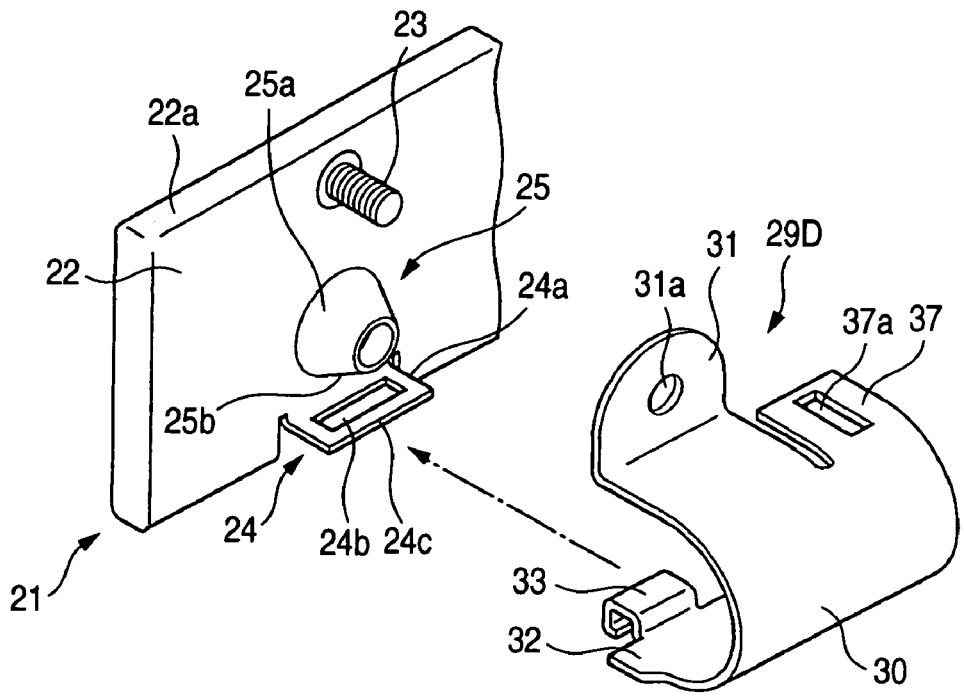
FIGS. 13A and 13B presents perspective views for explaining the connected state of the attachment bracket and the retainer of a modification of the first embodiment.
Figure 13B:
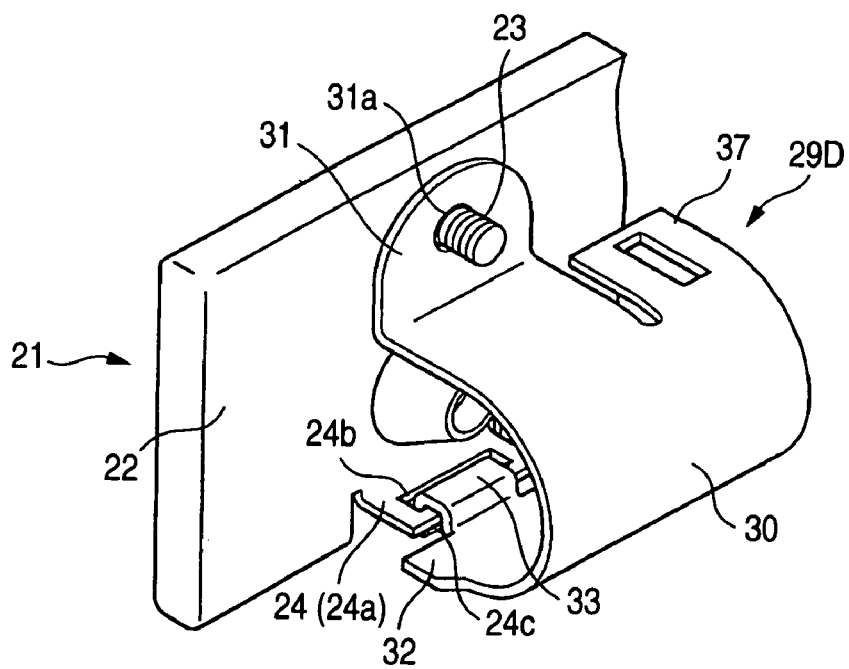
Figure 14:
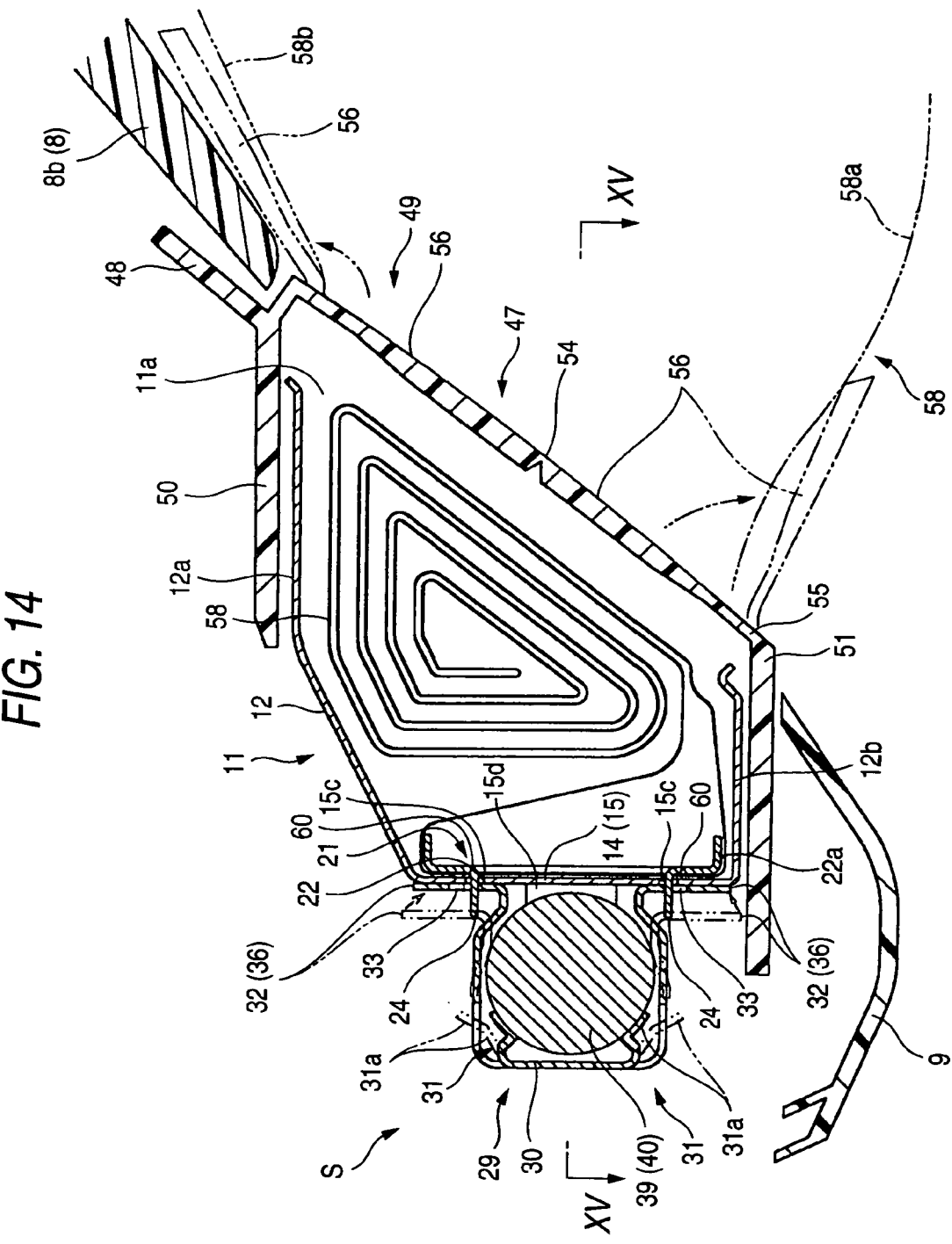
FIG. 14 is an enlarged schematic longitudinal section taken in the vehicular longitudinal direction of the knee protecting airbag device of the second embodiment and showing portion XIV-XIV of FIG. 15.
Figure 15:
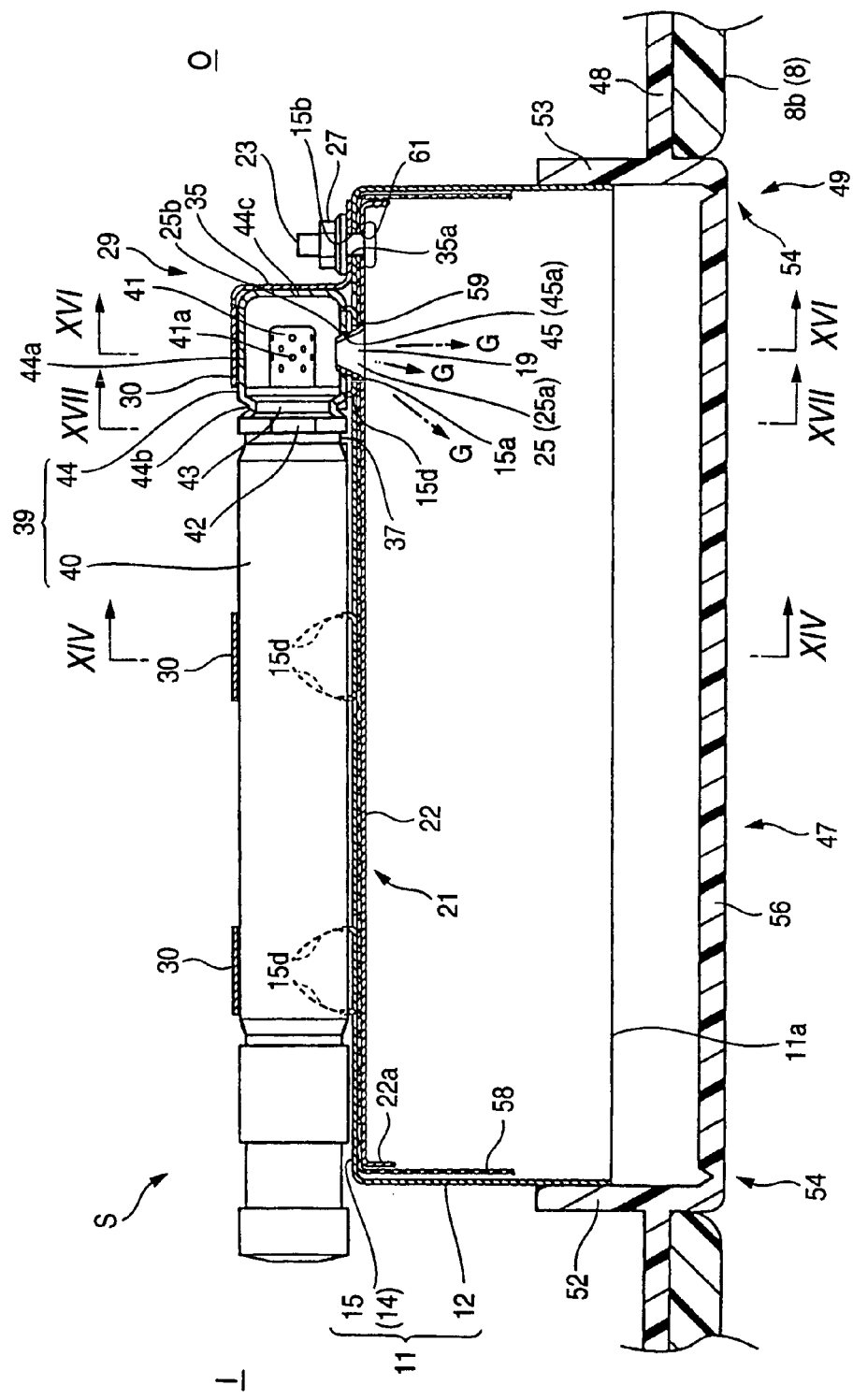
FIG. 15 is a schematic transverse section of portion XV-XV of FIG. 14.
Figure 16:
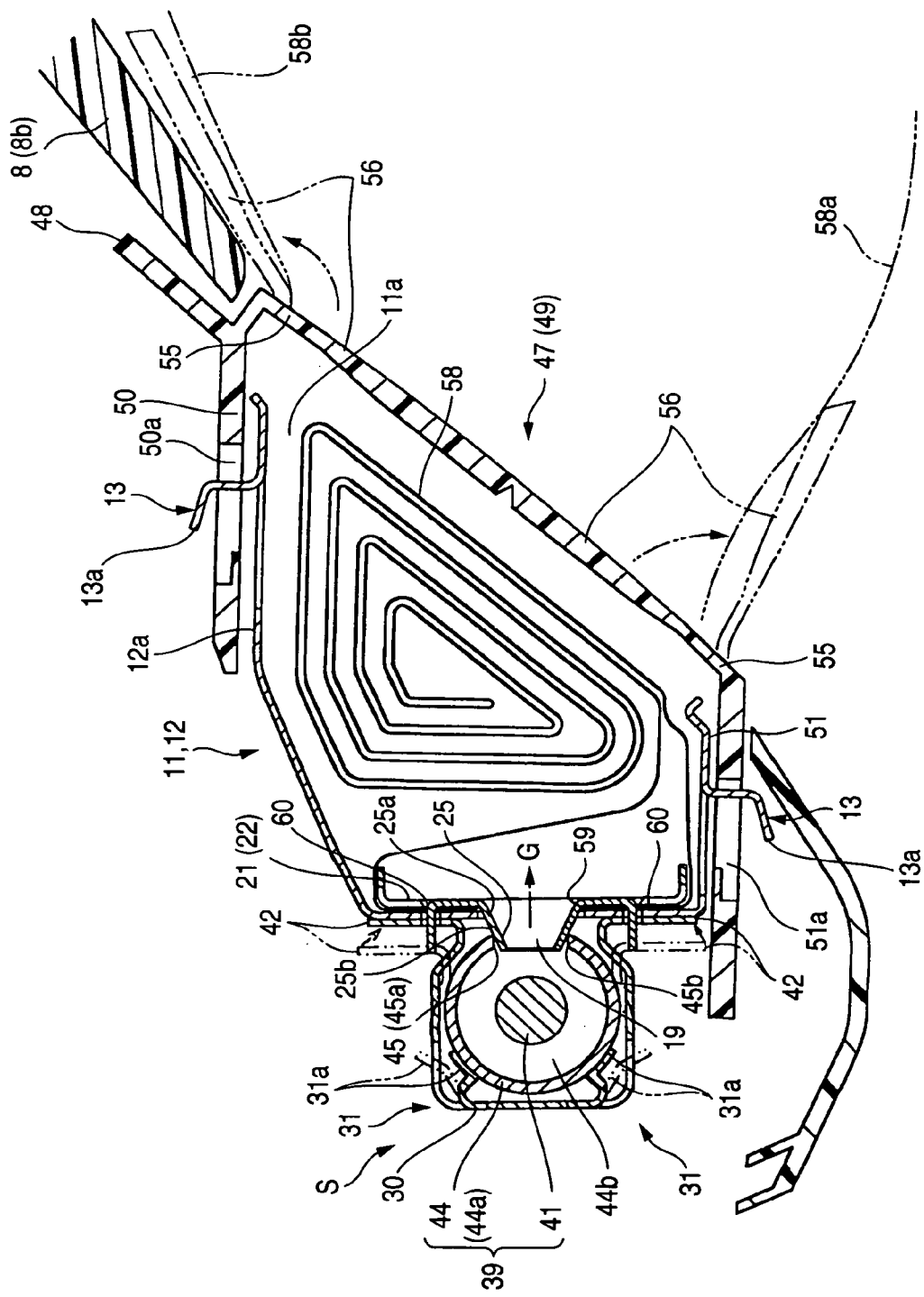
FIG. 16 is a schematic longitudinal section of portion XVI-XVI of FIG. 15.

Moreover, the retaining portions to be disposed on the attachment bracket may be retained not in the direction apart from the bag holding wall part with respect to the connecting members of the retainer. Therefore, the retaining portions on the side of the connecting members may be provided with the hook members, and the retaining portions on the side of the attachment bracket may be provided with the retaining holes. Like an attachment bracket 29D shown in FIG. 13, moreover, the hook members 33 may be directed to be inserted into the retaining holes 24b from the inner side on the side of the guide portions 25 of the connecting members 24 to the outer side so that they may be retained on the edge 24c.

If the inflator 39 is so assembled with the case 11 as to regulate the deviation along the axial direction of the inflator 39, the regulating member portions 37 can be omitted. If the inflator 39 itself is provided with protrusions 39a, as indicated by double-dotted lines in FIG. 3, so that the protrusions 39a can abut against the left and right edges of the cover portions 30 of the attachment bracket 29B, the regulating member portions 37 can be dispensed with, and the airbag 58 and the inflator 39 can be assembled with the case 11 by only the attachment bracket 29B.

The knee protecting airbag device S1 of the embodiment is constructed such that the airbag 58 is held on the base wall part of the case 11. The construction may be modified such that the airbag 58 is held on the upper wall part 12a or the lower wall part 12b of the peripheral wall part 12 near the base wall part 15 of the case 11. In this modification, the wall part of the portion to be held may become the bag holding wall part 14, to which the retainer 21, the attachment bracket 29 and the inflator 39 may be formed to correspond.

In the embodiment, moreover, the diffuser 44 is arranged on one end portion of the body 40 of the inflator 39. However, there may be employed an inflator, which has gas discharge ports arranged near the center of the axial direction. In this case, a cylindrical diffuser may be arranged to cover the gas discharge ports, and the corresponding guide portions may be provided for the diffuser and the retainer.

Still moreover, the embodiment has been described on the knee protecting airbag device S1 for the driver M. However, the knee protecting airbag device of the invention may also be mounted on the front side of the passenger seat.

Second Embodiment

Second embodiment of the invention will be described with reference to the accompanying drawings. Basic structure of the air bag device S2 of the second embodiment is similar to the first embodiment. Reference numerals for describing the following embodiment correspond to those of the first embodiment.

In the second embodiment, on the end side, i.e., on the right edge side of the vehicular outside O (on the side of a head portion 41 in the inflator 39) in the base wall part 15, there is arranged an insertion hole 15a which extends in a circular shape in the longitudinal direction for inserting a guide passage 19 formed by mutual guide portions 25 and 45 of the retainer 21 and a diffuser 44 of the inflator 39. At the portion closer to the vehicular outside O than the insertion hole 15a, moreover, there is formed a through hole 15b which opened in a circular shape for inserting a bolt 23 of the retainer 21. In the base wall part 15 near the upper and lower transversely extending edges, individually, there are formed through holes 15c which extend in the transverse direction. The through holes 15c formed on the end portion side of the vehicular outside O are arranged above and below the insertion hole 15a. On the base wall part 15 near and between the upper and lower through holes 15c, there are transversely juxtaposed support members 15d, which are formed in a sheet shape along the vertical direction and recessed in such a semicircular shape as can support the outer circumference of the inflator 39.

Moreover, the paired, vertically opposed through holes 15c are arranged to adjoin each other and transversely between the support members 15d and 15d, and their transverse width size is made slightly shorter than the distance between the opposed support members 15d and 15d.

Figure 21:
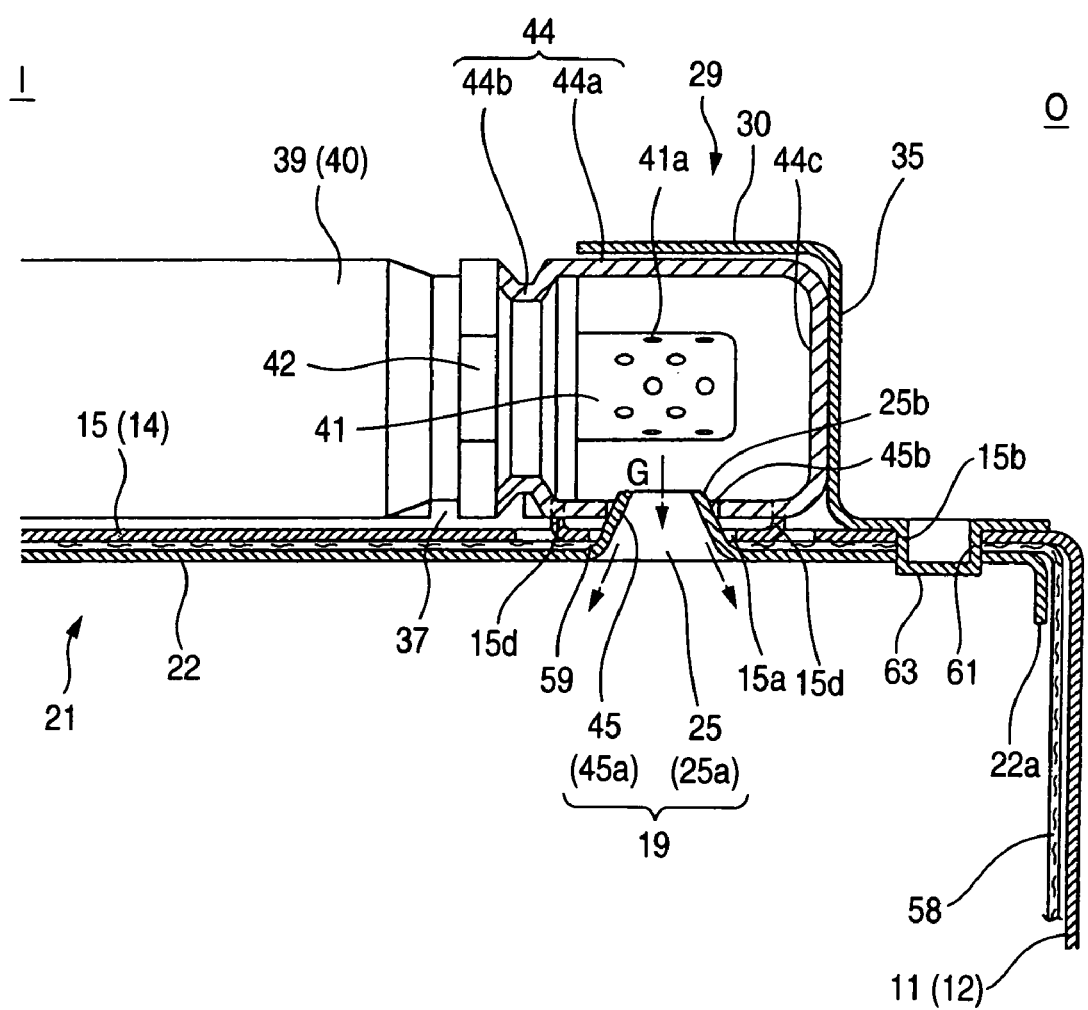
FIG. 21 is a partially enlarged transverse section showing a modification of the knee protecting airbag device.

The retainer 21 is made of a sheet metal and is provided, as shown in FIGS. 14 to 18 and FIG. 20, with a rectangular, sheet-shaped base portion 22 slightly smaller than the external shape of the base wall part 15 of the case 11. This base portion 22 is provided with a reinforcing rib 22a on its outer peripheral portion. From the end portion side of the base portion 22 on the side of the vehicular outside O to the vehicular front side, there is protruded a tubular portion 25a which is converged as the tapered guide portion 25 toward the vehicular front side (as shown in FIG. 21, in which the construction is similar to that of the embodiment excepting that the later-described protrusion 65 is formed in place of the bolt 23 of the embodiment). The aforementioned bolt 23 is protruded toward the vehicular front side from the side of the vehicular outside O of the tubular portion 25a. Three holding members 24 are protruded individually from the upper and lower edges of the base portion 22 toward the vehicular front side. Each holding member 24 is provided with a head portion 24a having a width size enlarged in the transverse direction and arranged on the leading end of the vehicular front side, and a neck portion 24b having a width size made smaller in the transverse direction than the head portion 24a and connecting the head portion 24a and the base portion 22. The head portion 24a of each holding member 24 is so widthwise sized as to extend through the through hole 15c of the case base wall part 15. The paired holding members 24 and 24 vertically opposed to each other are so arranged that they extend through the individual through holes 15c, when the airbag device S2 is assembled, to confront each other across the inflator 39 in the direction perpendicular to the axis of the inflator 39.

Here, the tubular portion 25a and each holding member 24 are constructed to extend toward the front side through not only the base wall part 15 (and the bag holding wall part 14) of the case 11 but also the airbag 58.

The attachment bracket 29 is made of a sheet metal and is constructed, as shown in FIGS. 14 to 19B and FIG. 20, to include: a cover portion 30 for covering the front side of the inflator 39 apart from the bag holding wall part 14 along the circumference of the inflator 39; retaining portions 32 and 32 arranged near the two edges of the cover portions 30 along the circumference of the inflator 39 for individually retaining the mutual end portions of the holding members 24 and 24 opposed vertically to each other; and caulking portions 31 arranged on the individual cover portions 30 for caulking the inflator 39 on the side of the bag holding wall part 14 (or the base wall part 15) of the case 11. In the case of the embodiment, totally three cover portions 30 are arranged at the arranging portions of the holding members 24 and 24 of the retainer 21 opposed vertically to each other, and are formed into a generally C-shaped section in the vertical direction together with the retaining portions 32.

The retaining portions 32, which are arranged at the upper and lower edge portions of the positions of the individual cover portions 30, are constructed to have retaining holes 33 for retaining the head portions 24a of the individual holding members 24 of the retainer 21. Each retaining hole 33 is constructed to have a wider portion 33a capable of inserting the head portion 24a of the holding member 24, and a narrower portion 33b communicating with the wider portion 33a and capable of inserting the head portion 24b of the holding member 24 but not the head portion 24a. In the case of the embodiment, the retaining holes 33, which are arranged in pairs to confront each other vertically, are arranged to have the wider portions 33a on the vertical center side of the cover portions 30. Moreover, the retaining portions 32 are arranged on upper and lower connecting plate portions 36 and 36, which extend transversely from the positions of the upper edge side and the lower edge side of the three cover portions 30 and which connect the three cover portions 30.

Figure 18A:
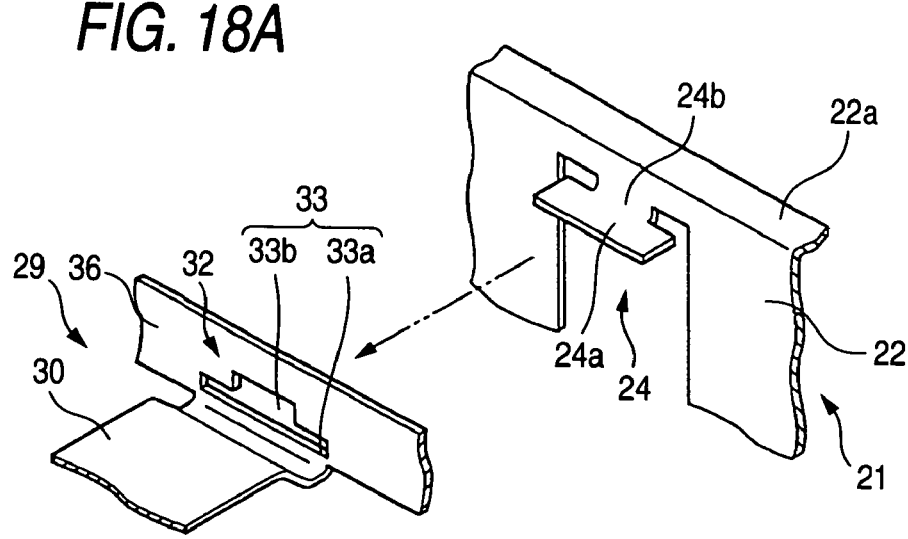
FIGS. 18A, 18B and 18C present perspective views for explaining the connected states between a holding member of a retainer and a retaining portion of an attachment bracket of the second embodiment.
Figure 18B:
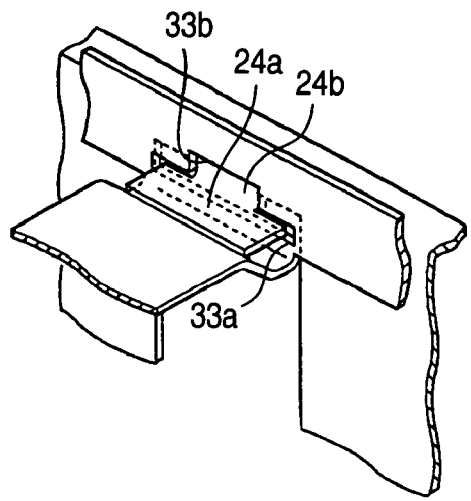
Figure 18C:
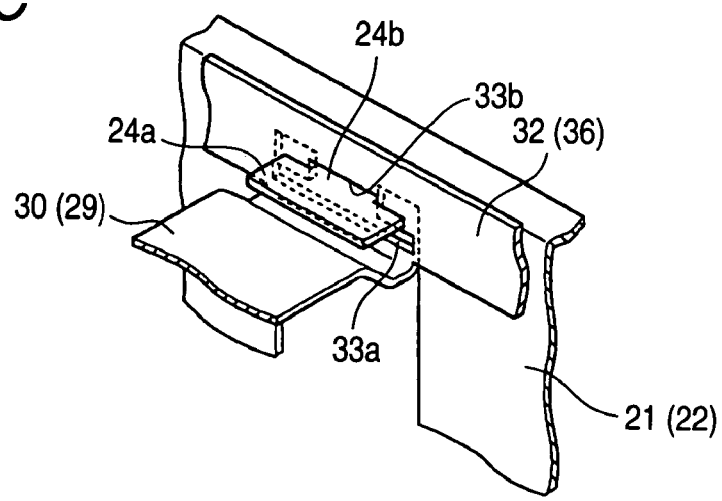

In the works to retain the holding members 24 in the individual retaining portions 32, as shown in FIGS. 18A, 18B and 18C, the head portions 24a of the individual holding members are inserted into the wider portions 33a of the retaining holes 33 through the through holes 15c of the not-shown base wall part 15, and the upper and lower edges (i.e., the connecting plate portions 36 and 36) of the cover portions 30 are bent and plastically deformed to come closer to each other. When the neck portions 24b are moved to the narrower portions 33b, the retaining works can be complete.

On the other hand, the caulking portions 31 are constructed to arrange press members 31a, which are cut out therearound and curved, near the upper and lower edges of the front sides of the individual cover portions 30. The caulking portions 31 caulk (as referred to the double-dotted lines in FIGS. 14 and 16) the front face sides of the outer circumference of the inflator 39, at the time when it is mounted on the vehicle, toward the rear side of the vehicle thereby to bend and deform the press members 31 plastically.

At the end portion of the attachment bracket 29 on the side of the vehicular outside O, moreover, an auxiliary member portion 35 having a through hole 35a for inserting the bolt 23 of the retainer 21 therethrough is arranged in an L-shaped section between the upper and lower connecting plate portions 36 and 36 from the right edge of the cover portion 30 on the end side of the attachment bracket 29 of the vehicular outside O.

Figure 19A:
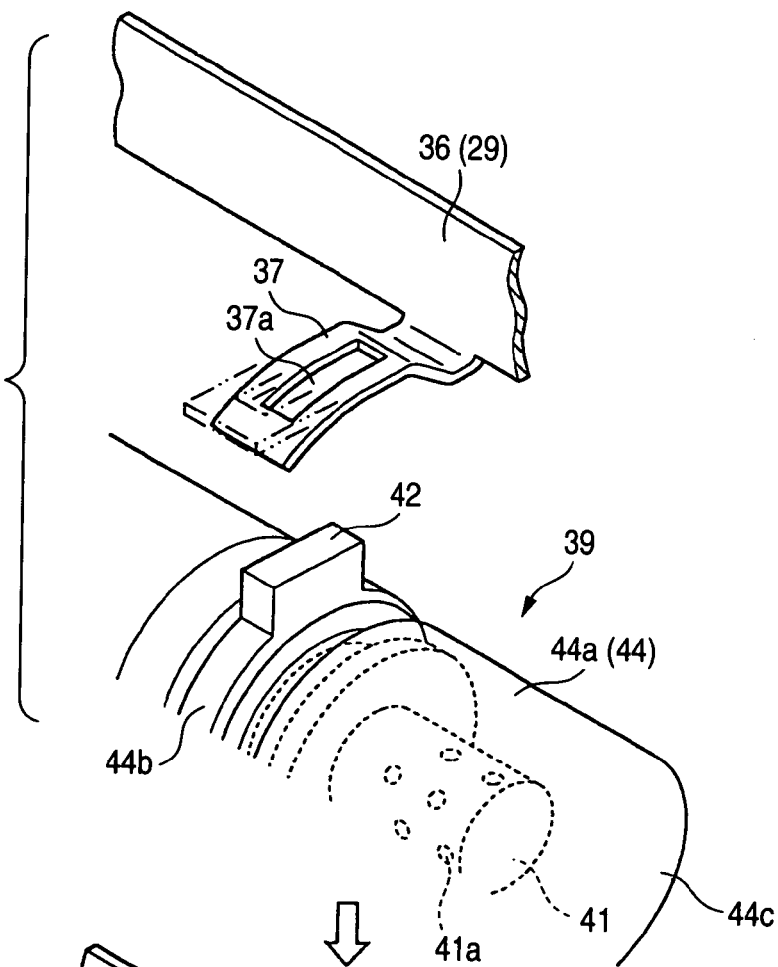
FIGS. 19A and 19B present perspective views for explaining a deviation preventing structure between the attachment bracket and an inflator of the second embodiment.
Figure 19B:
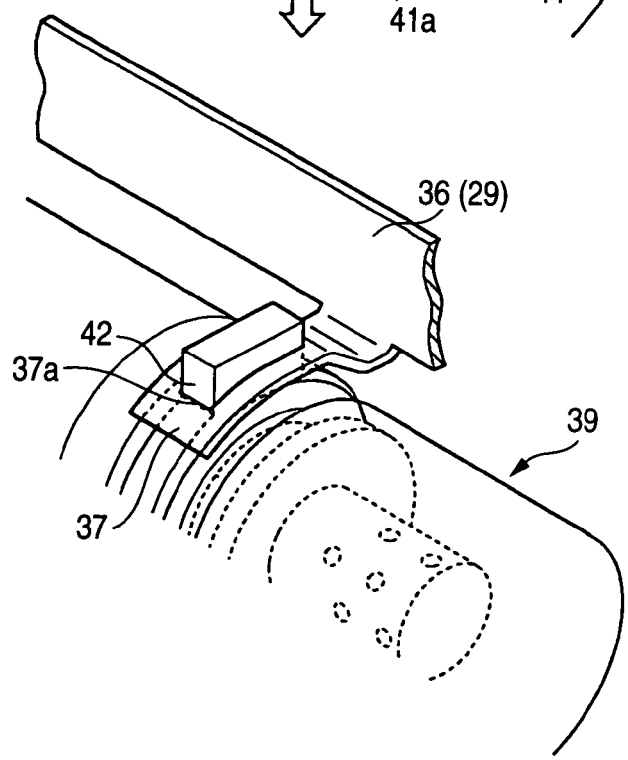
Figure 20:
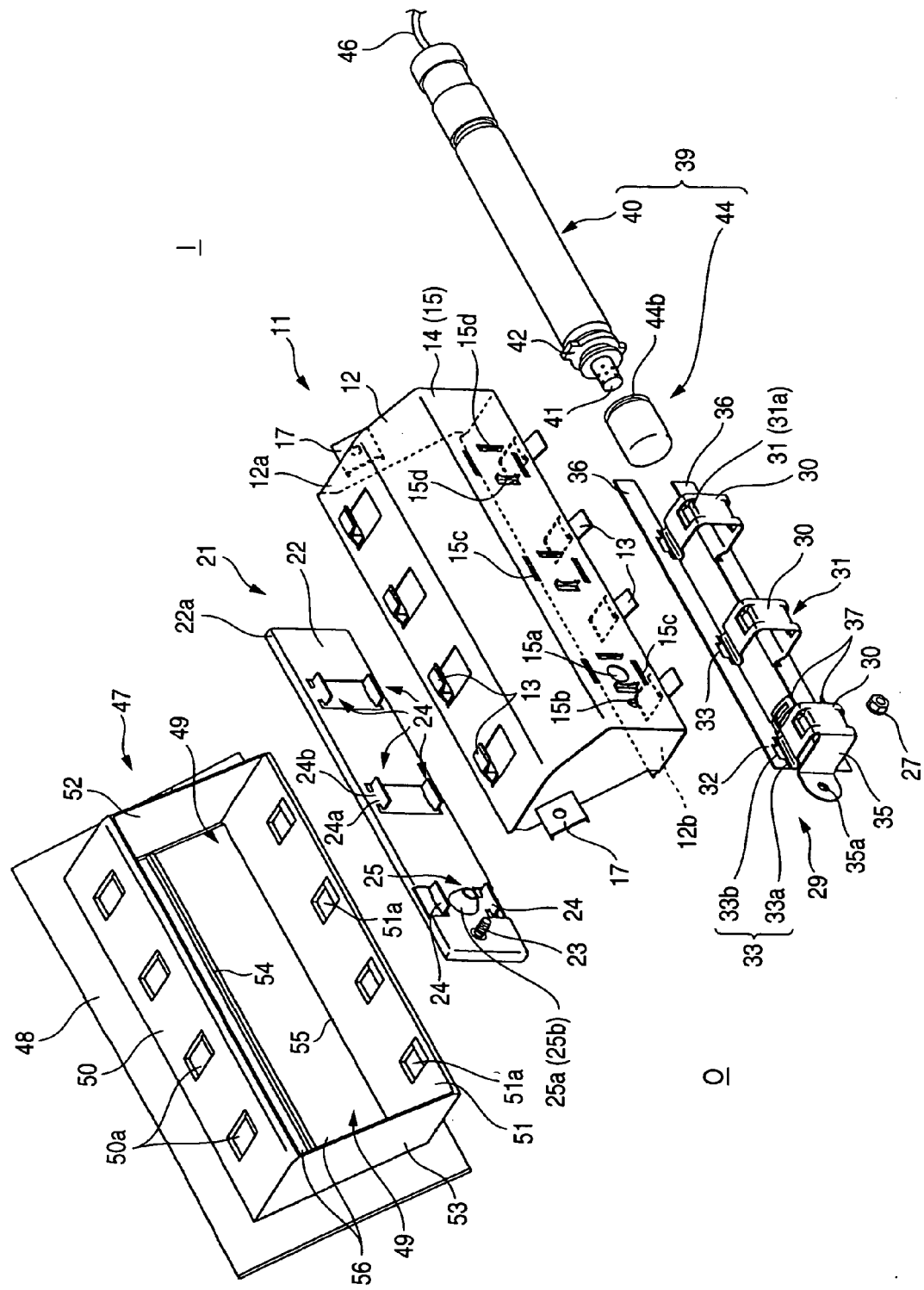
FIG. 20 is an exploded schematic perspective view taken from the front side of the vehicle and showing an airbag cover, a case, a retainer, an attachment bracket and an inflator to be used in the knee protecting airbag device of the second embodiment.

Near the left edges of the cover portions 30 of the attachment bracket 29 on the end side of the vehicular outside O, a pair of regulating member portions 37 and 37 are protruded from the vicinities of the mutually adjoining edges of the upper and lower connecting plate portions 36 and 36 toward the vehicular rear side. In these regulating member portions 37, there are formed retaining holes 37a capable of individually inserting the regulating projections 42 of the inflator body 40. The regulating protrusions 42 are inserted into the individual retaining holes 37a by bending and deforming the regulating member portions 37 plastically, as shown in FIGS. 19A and 19B.

Here will be described the mounting operation of the knee protecting airbag device S2 of the embodiment on the vehicle. First of all, the tubular portion 25a is protruded from the inlet opening 59, and the individual holding members 24 are protruded from the corresponding insertion holes 60. Moreover, the retainer 21 is housed in the airbag 58 such that the bolt 23 is protruded from the insertion hole 61, and the airbag 58 is folded up. Next, the airbag 58 is wrapped with the not-shown breakable wrapping film for preventing the folding collapse. At this time, the tubular portion 25a, the holding members 24 and the bolt 23 of the retainer 21, which are protruded from the opening 59 and the insertion holes 60 and 61, are protruded from the wrapping film.

On the other hand, the inflator 39, which has already been formed by fixing the diffuser 44 on the body 40, inserted from between the connecting plate portions 36 and 36 of the attachment bracket 29 into the individual cover portions 30 having the C-shaped section, and the attachment bracket 29 and the inflator 39 are temporarily assembled such that the paired upper and lower retaining portions 32 slightly abut against each other at the portions on the rear side when the inflator 39 is mounted on the vehicle.

Then, the folded airbag 58 is accommodated together with the retainer 21 in the case 11 such that the tubular portion 25a, the bolt 23 and the holding members 24 of the retainer 21 are individually protruded from the insertion hole 15a and the through holes 15b and 15c formed in the case base wall part 15.

Next, the head portions 24a of the holding members 24 of the retainer 21 are inserted into the wider portions 33a in the retaining holes 33 of the individual retaining portions 32, and the bolt 23 of the retainer 21 is inserted into the through hole 35a of the holding member portion 35. Moreover, the attachment bracket 29 having the inflator 39 temporarily assembled is brought into abutment against the front face side of the case base wall part 15 while the tubular portion 25*a* of the guide portion 25 of the retainer 21 is inserted into the fitting hole 45*a* of the guide portion 45 of the inflator 39. At this time, the inflator 39 is supported in abutment by the individual support members 15*d* of the case base wall part 15.

As shown in FIGS. 18A, 18B and 18C, the connecting plate portions 36 and 36 are plastically deformed to approach each other, so that the neck portions 24*b* of the individual holding members 24 are moved to the narrower portions 33*b* of the individual retaining portions 32 thereby to retain the head portions 24*a* of the retaining members 24 on the peripheral portions of the narrower portions 32 of the individual retaining portions 32 in an escape preventing manner. At the same time, a nut 27 is fastened on the bolt 23, and the press members 31*a* of the individual caulking portions 31 are bent and plastically deformed so that the front face side of the outer circumference of the inflator 39 when mounted on the vehicle is caulked toward the vehicular rear side. Then, the attachment bracket 29 receives the reaction from the inflator 39 so that it leaves the case base wall part 15 as the bag holding wall part 14 thereby to fasten the holding members 24 and the retaining members 32 firmly. The retainer 21 and the attachment bracket 29 are firmly connected through the peripheral portion of the inlet opening 59 of the airbag 58, the case base wall part 15 and the inflator 39. Specifically, the retainer 21 and the inflator 39 are so connected to each other as to clamp the peripheral portion of the inlet opening 59 of the airbag 58 and the bag holding wall part 14 of the case 11. As a result, the airbag 58 and the inflator 39 can be firmly held with respect to the case 11.

At this time, the guide portions are fitted on each other such that the outer circumference 25*b* of the tubular portion 25*a* of the guide portion 25 is pressed to contact with the inner circumference 45*b* of the fitting hole 45*a* of the guide portion 45. After the caulking portion 31 was caulked, moreover, the regulating protrusions 42 of the inflator 39 are inserted into the individual retaining holes 37*a*, as shown in FIGS. 19A and 19B, while the paired regulating member portions are being bent and plastically deformed to come close to each other.

After this, the airbag cover 47 is assembled with the case 11 such that the leading ends 13*a* of the individual retaining pawl portions 13 are retained on the peripheral portions of the individual retaining holes 50*a* and 51*a*. The mounting brackets 17 of the case 11 are attached and fixed on the not-shown instrument panel reinforcements or the like on the body side, and a lead wire (as referred to FIG. 20) to be connected with the airbag activation circuit is connected to the body 40 of the inflator 39. Moreover, the instrument panel 8 and an under cover (as referred to FIGS. 1 and 14) are attached. Thus, the knee protecting airbag device S2 can be mounted on the vehicle.

In the knee protecting airbag device S2 of the embodiment, moreover, when the retainer 21 for retaining the peripheral portion of the inlet opening 59 of the airbag 58 on the bag holding wall part 14 (or the base wall part 15) of the case 11 and the inflator 39 arranged on the outer side of the bag holding wall part 14 of the case 11 for providing the airbag 58 with the inflating gas G are to be assembled with the case 11, they are connected to each other by using the attachment bracket 29 while clamping the peripheral portion of the inlet opening 59 of the airbag 58 and the bag holding wall part 14 of the case 11. At this assembling time, moreover, the guide portions 25 and 45 of the retainer 21 and the diffuser 44 are fitted on each other to form the guide passage 19 for guiding the inflating gas G into the airbag 58.

In the knee protecting airbag device S2 of the embodiment, more specifically, when the retainer 21 and the inflator 39 are to be assembled with the case 11, the guide passage 19 for guiding the inflating gas G into the airbag 58 can be easily formed by fitting the predetermined guide portions 25 and 45 on each other. In addition to this simple construction, the mutual fitting directions of the guide portions 25 and 45 of the retainer 21 and the diffuser 44 are set along the longitudinal direction of the vehicle, i.e., in the direction to assemble the retainer 21 and the inflator 39 with the case 11. The sealing properties of the guide portions 25 and 45 can be easily retained merely by those simple constructions.

In the knee protecting airbag device S2 of the embodiment, moreover, the inflator 39 and the retainer 21 to be arranged along the base wall part 15 as the bag holding wall part 14 of the case 11 are connected to each other and assembled with the case 11, while clamping the peripheral portion of the inlet opening 59 of the airbag 58 and the base wall part 15 of the case 11, by making use of the mounting bracket 29 assembled with the inflator 39. The inflator 39 is assembled with the case 11 in the direction normal to the base wall part 15. The inflator 39 provided with the generally columnar body 40 can be assembled with the case 11 by moving it not in its axial direction but in the direction perpendicular to the axis so that the working space at the assembling time can be made compact.

In the knee protecting airbag device S2 of the embodiment, moreover, the attachment bracket 29 made of a sheet metal is employed when the retainer 21 and the inflator 39 are to be assembled with the case 11. On the retainer 21, there are arranged three pairs of holding members 24, which are arranged through the airbag 58 and the base wall part 15 of the case 11 and opposed through the inflator 39 in the direction perpendicular to the axis of the inflator 39. Moreover, the attachment bracket 29 is constructed to include: the cover portion 30 for covering the front side of the inflator 39 apart from the bag holding wall part 14 along the circumference of the inflator 39; the retaining portions 32 arranged near the two edges of the cover portions 30 along the circumference of the inflator 39 for individually retaining the mutual end portions 24*a* of the opposed holding members 24; and the caulking portions 31 arranged on the cover portions 30 for caulking the inflator 39 on the side of the base wall part 15 of the case 11. In this construction, therefore, the retaining members 24 of the retainer 21 are protruded to the side of the inflator 39 through the airbag 58 and the base wall part 15 of the case 11, so that the holding member head portions 24*a* are retained on the peripheral portions 33*b* of the retaining holes 33 in the retaining portions 32 of the attachment bracket 29 covering the inflator 39 with the cover portions 30. At the same time, the press members 31*a* of the caulking portions 31 are caulked to press the inflator 39 toward the side of the base wall part 15 of the case 11. Then, the attachment bracket 29 receives the reaction from the inflator 39 so that it leaves the case base wall part 15 thereby to fasten the holding members 24 and the retaining members 32 firmly. The attachment bracket 29 and the retainer 21 are assembled with the case 11 such that they clamp the peripheral portion of the inlet opening 59 of the airbag 58, the case base wall part 15 as the bag holding wall part 14 of the case 11, and the inflator 39. The airbag 58, the retainer 21, the inflator 39 and the attachment bracket 29 can be assembled with the case 11 even if the assembly means such as the bolt 23 is hardly used.

Especially in the case of the embodiment, the attachment bracket 29 is provided with the cover portions 30 at the positions where the guide portions 25 and 45 are arranged, and the individually paired holding members 24 and retaining portions 32 to be fastened to each other, above and below the guide portions 25 and 45. If those paired holding members 24 and retaining portions 32 are fastened to each other, the diffuser 44 of the inflator 39 are so supported by the support members 15d and 15d of the case base wall part 15 that they hardly move. Therefore, the vicinities of the guide portions 25 are plastically deformed to pull the tubular portion 25a of the guide portion 25 to the guide portion 45 on the side of the diffuser 44. Thus, the sealing property when the guide portions 25 and 45 are fitted on each other is improved.

Here in the embodiment, the retainer 21 is provided with the bolt 23, which is extended through the insertion hole 61 formed in the peripheral portion of the inlet opening 59 of the airbag 58 and which is fastened with the nut 27. By the bolt 23, the deviation of the peripheral portion of the inlet opening 59 is prevented when the airbag 58 is expanded and inflated, and the fastening strength of the attachment bracket 29 in the case 11 is improved.

If, however, the fastened strength between the holding members 24 and the retaining portions including the caulking portions 31 at the retainer 21 and the attachment bracket 29 is sufficient, the bolt 23 of the retainer 21 may be replaced by the protrusion 65, which protrudes from the retainer 21 or the attachment bracket 29 through either the insertion hole 61 in the peripheral portion of the inlet opening 59 of the airbag 58 or the through hole 15b in the of the case base wall part 15, and further through the bracket 29 or the retainer 21.

Moreover, the attachment bracket 29 of the embodiment may also be constructed into an attachment bracket 29A or an attachment bracket 29B, as shown in FIGS. 22, 23, 24 and 25, by omitting the regulating member portions 37.

Figure 22:
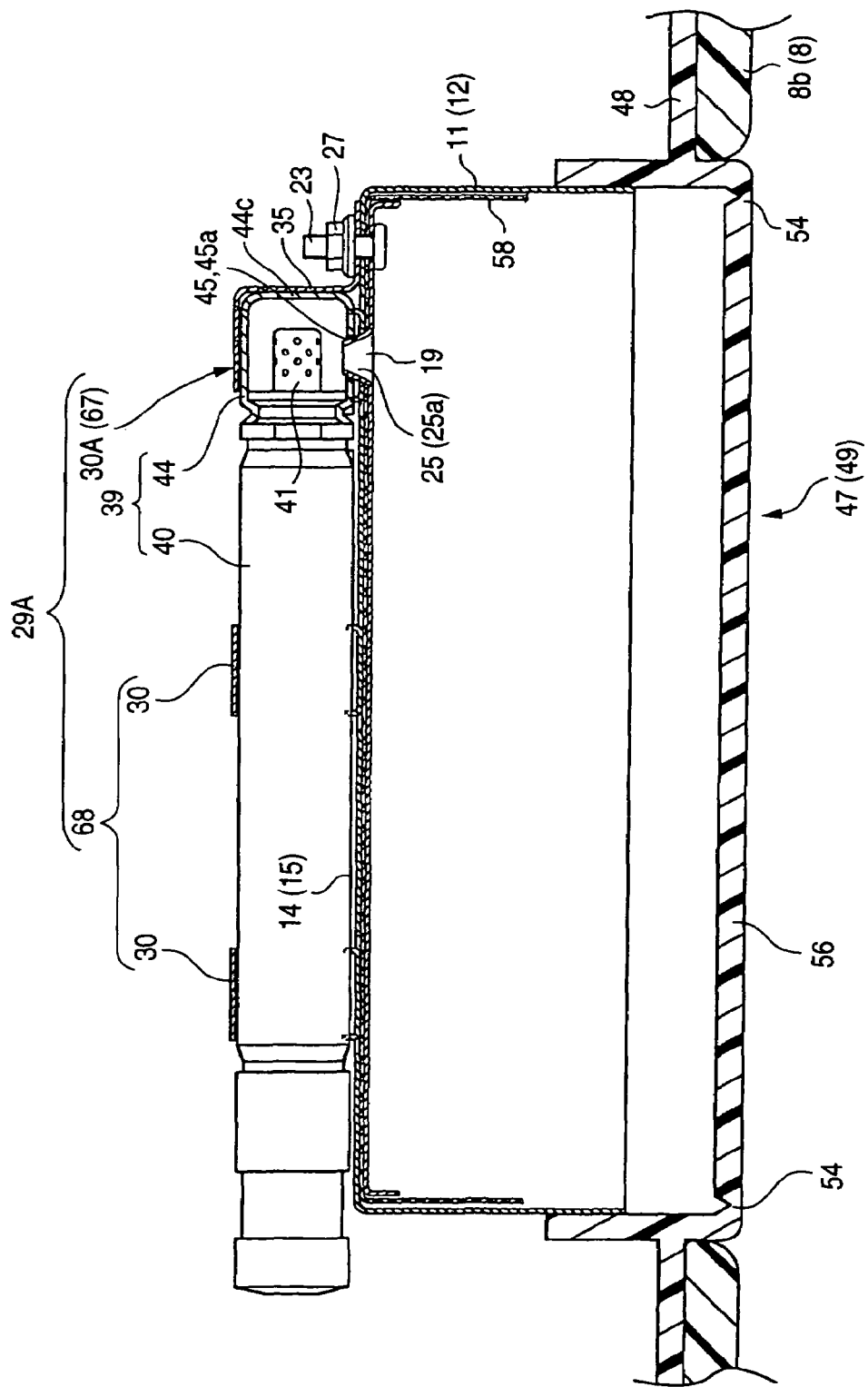
FIG. 22 is a schematic transverse section showing another modification of the knee protecting airbag device.
Figure 23:
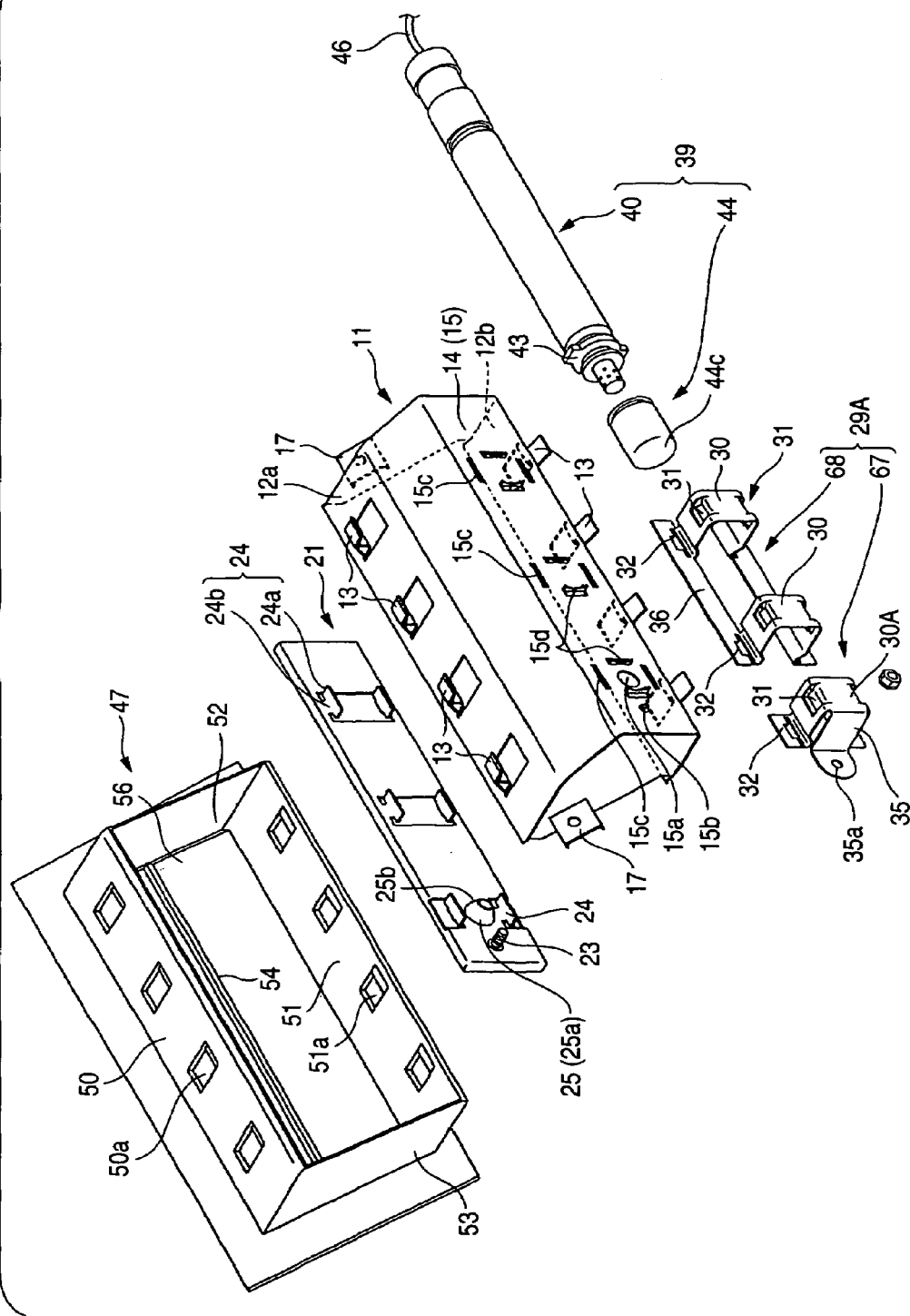
FIG. 23 is an exploded schematic perspective view taken from the front side of the vehicle and showing an airbag cover, a case, a retainer, an attachment bracket and an inflator to be used in the knee protecting airbag device shown in FIG. 22.

The attachment bracket 29A, as shown in FIGS. 22 and 23, is constructed to include a split member 67 forming the portion of a cover portion 30A for covering the diffuser 44, and a split member 68 forming the portion of the two cover portions 30. The auxiliary member portion 35 of the split member 67 and the base wall part 44c of the diffuser 44 are welded to connect the split member 67 of the attachment bracket 29A and the diffuser 44. Then, the diffuser 44 is caulked at the portion of the groove 43 and fixed to the body 40 so that the split member 67 of the attachment bracket 29A is fixed in advance on the inflator 39.

Figure 24:
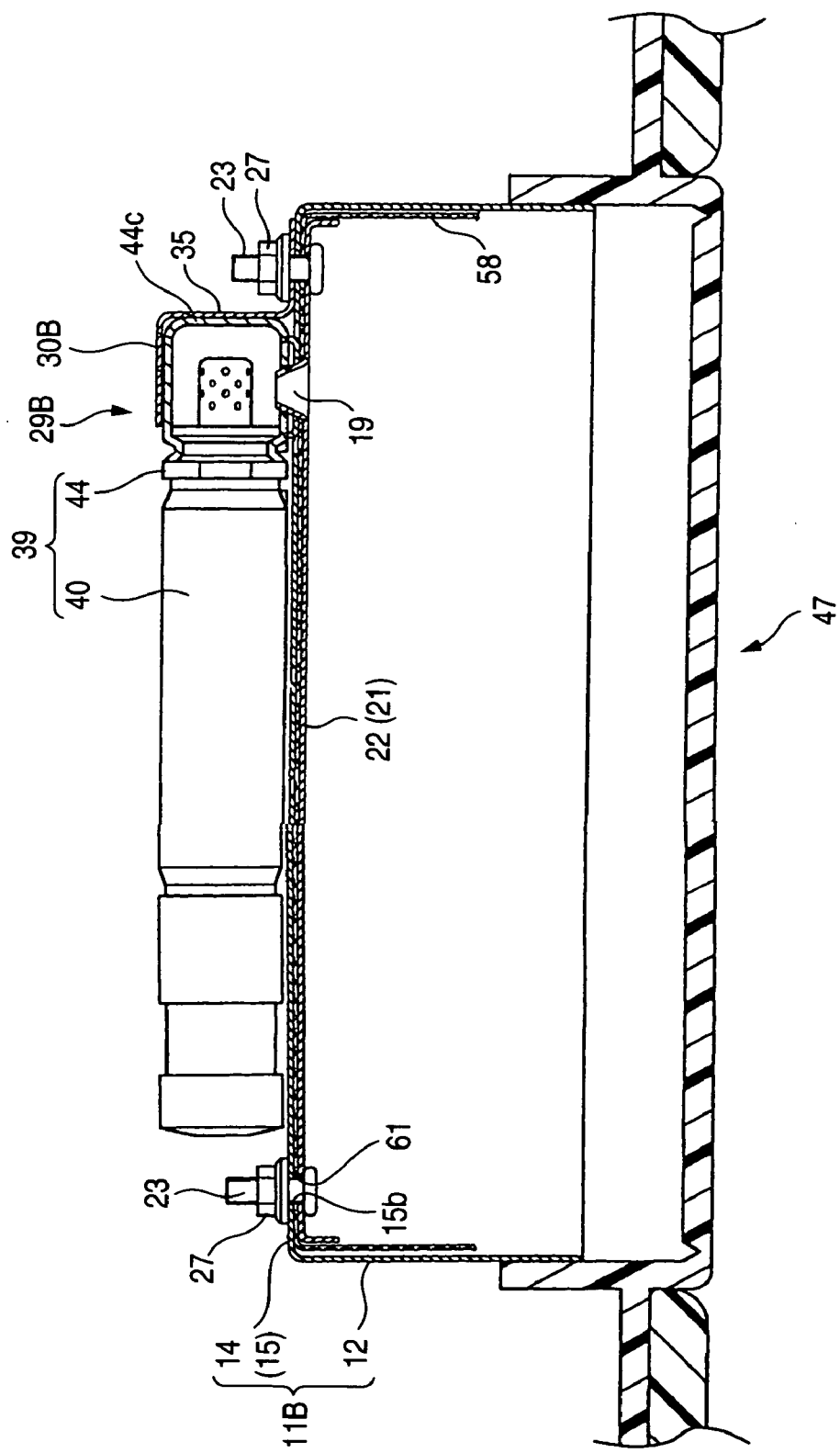
FIG. 24 is a schematic transverse section showing another modification of the knee protecting airbag device.
Figure 25:
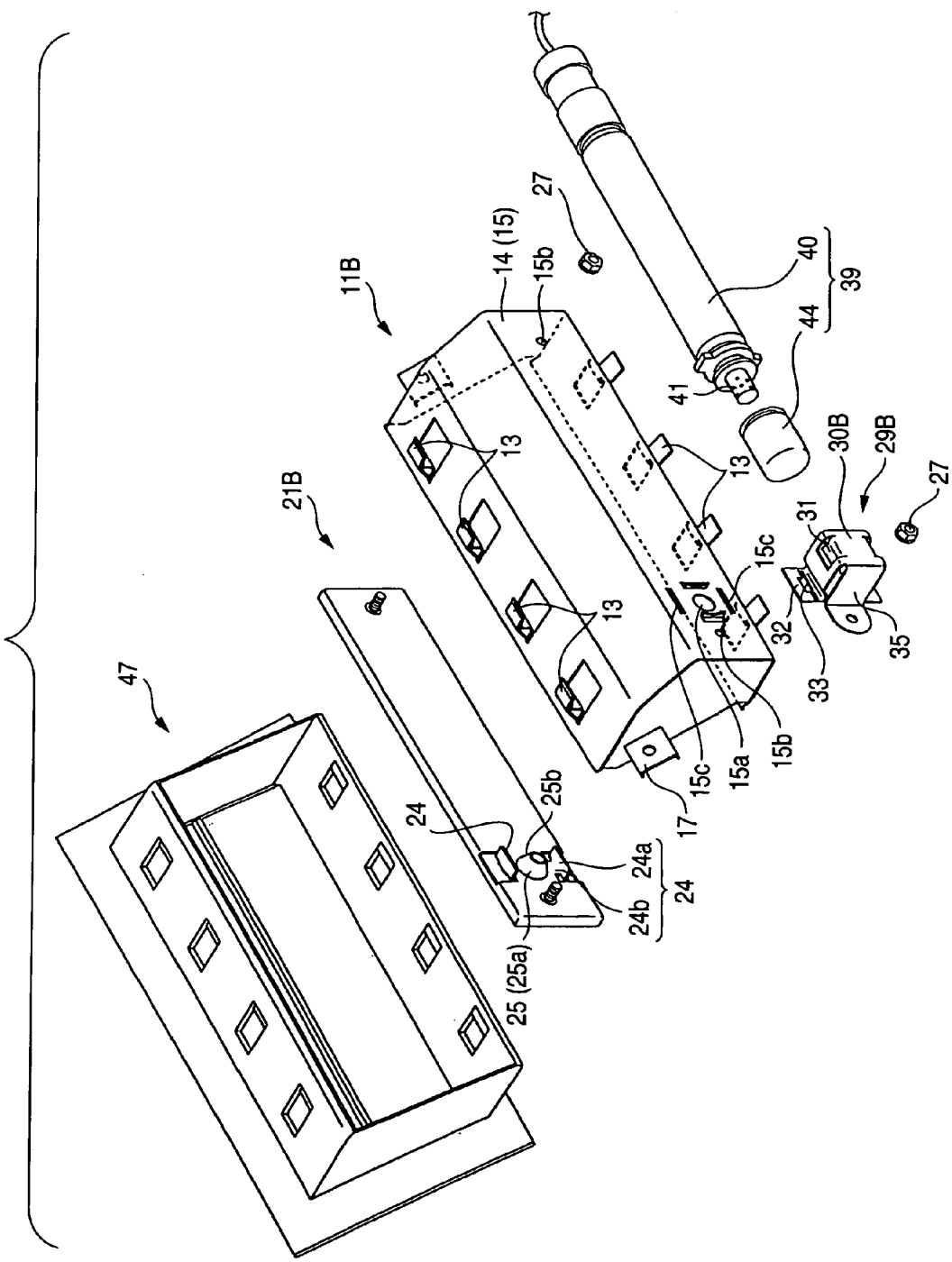
FIG. 25 is an exploded schematic perspective view taken from the front side of the vehicle and showing an airbag cover, a case, a retainer, an attachment bracket and an inflator to be used in the knee protecting airbag device shown in FIG. 24.

On the other hand, the attachment bracket 29B, as shown in FIGS. 24 and 25, is constructed to include only the portion of a cover portion 30B for covering the diffuser 44. The auxiliary member portion 35 of the mounting bracket 29B and the base wall part 44c of the diffuser 44 are welded to connect the attachment bracket 29B and the diffuser 44. Then, the diffuser 44 is caulked at the portion of the groove 43 and fixed to the body 40 so that the attachment bracket 29B is fixed in advance on the inflator 39.

In these attachment brackets 29A and 29B, before the retainer 21 and the inflator 39 are assembled with the case 11, the base wall part 44c having its end portion closed in the axial direction of the diffuser 44 and the split-member 67 or the attachment bracket 29A or the attachment bracket 29B are fixed. Therefore, the inflator 39 is hardly deviated in the axial direction with respect to the attachment bracket 29A or 29B. Unlike the embodiment, therefore, there can be omitted the regulating protrusions 42 as the means for regulating the deviation along the axial direction of the inflator 39, or the regulating member portion 37 having the retaining holes 37a for inserting the regulating protrusions 42.

In case the attachment bracket 29B is employed, the retaining portions 32 are arranged only near the portion of the diffuser 44, as shown in FIGS. 24 and 25, but the retaining portions 32 to be connected to the retainer 21 are not arranged at the end portion side of the retainer 21 apart from the head portion 41 of the inflator 39. In order that the retainer 21 may be stably fixed on the base wall part 15 of the case 11, therefore, the bolt 23 to be fastened with the nut 27 may be disposed through the airbag 58 and the base wall part 15 at portions of the retainer 21 apart from the head portion 41.

Figure 26:
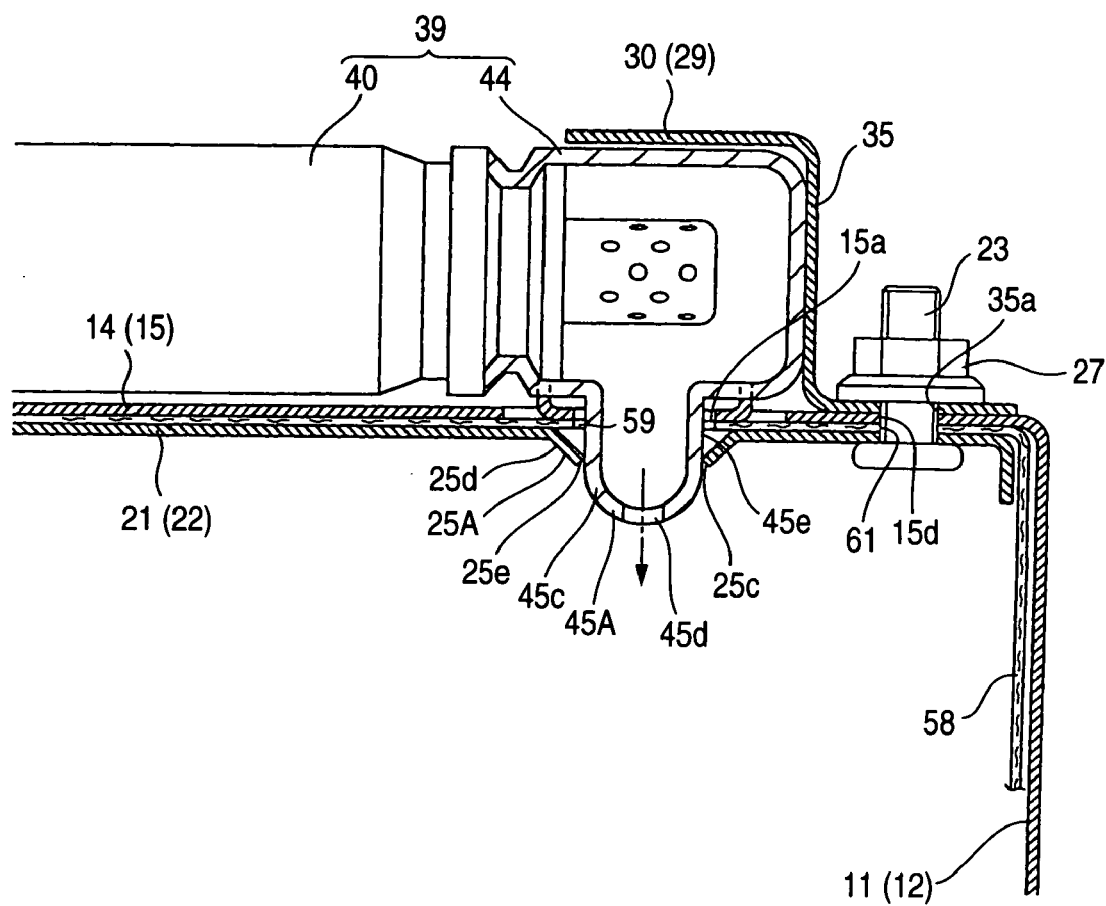
FIG. 26 is an enlarged partial transverse section showing another modification of the knee protecting airbag device.

Moreover, the embodiment has been exemplified, in connection with the retainer 21 and the diffuser 44 for forming the guide passage 19, by the constructions, in which the guide portion is formed of the tubular portion 25a and in which the guide portion 45 has the fitting hole 45a for inserting the tubular portion 25a. These constructions may be modified, as shown in FIG. 26. In the diffuser 44 shown in FIG. 26, a guide portion 45A is formed of a column-shaped tubular portion 45c having its leading end side rounded in a semicircle to have an opening 45d, and a guide portion 25A of the retainer 21 has a fitting hole 25c opened in a circular shape having an inner circumference 25e forced to contact with the outer circumference 45d of the tubular portion. Incidentally, the fitting hole 25c has its circumferential edge 25d tapered into a tapered tubular shape toward the vehicular rear side so that it can be easily warped to contact with the outer circumference 45e when the tubular portion 45c is inserted. Thus, a satisfactory sealing property is retained at the time when the guide portions 25A and 45A are fitted on each other.

Third Embodiment

Third embodiment of the invention will be described with reference to the accompanying drawings. A knee protecting airbag device S3 is so arranged below a steering column 109 on the vehicular front side of a driver M as to protect the knees K (KL and KR) of the driver M, as shown in FIGS. 27 and 32.

Here, the vertical directions, the transverse directions and the longitudinal directions, as defined herein, correspond to the vertical directions, and the transverse directions and the longitudinal directions of the vehicle when the knee protecting airbag device S3 is mounted on the vehicle.

Figure 27:
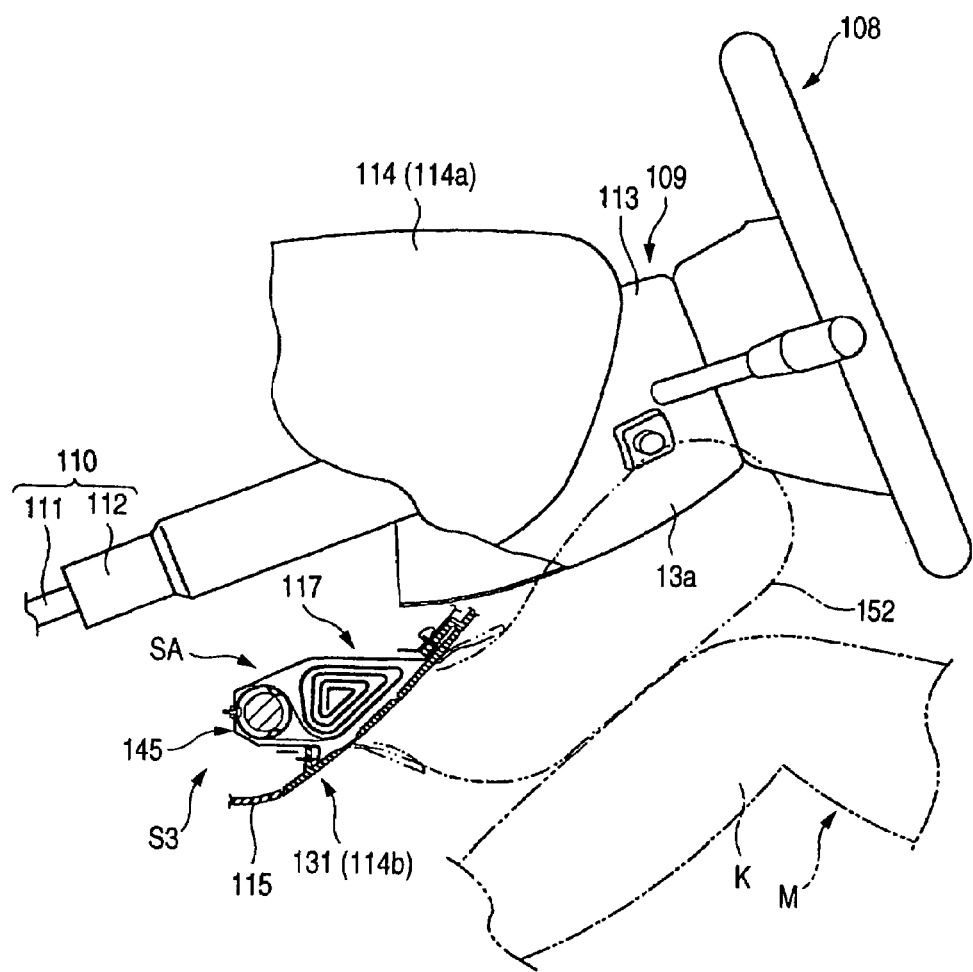
FIG. 27 is a schematic longitudinal section showing the used state of a knee protecting airbag device according to a third embodiment of the invention and taken in the longitudinal direction of a vehicle.
Figure 32:
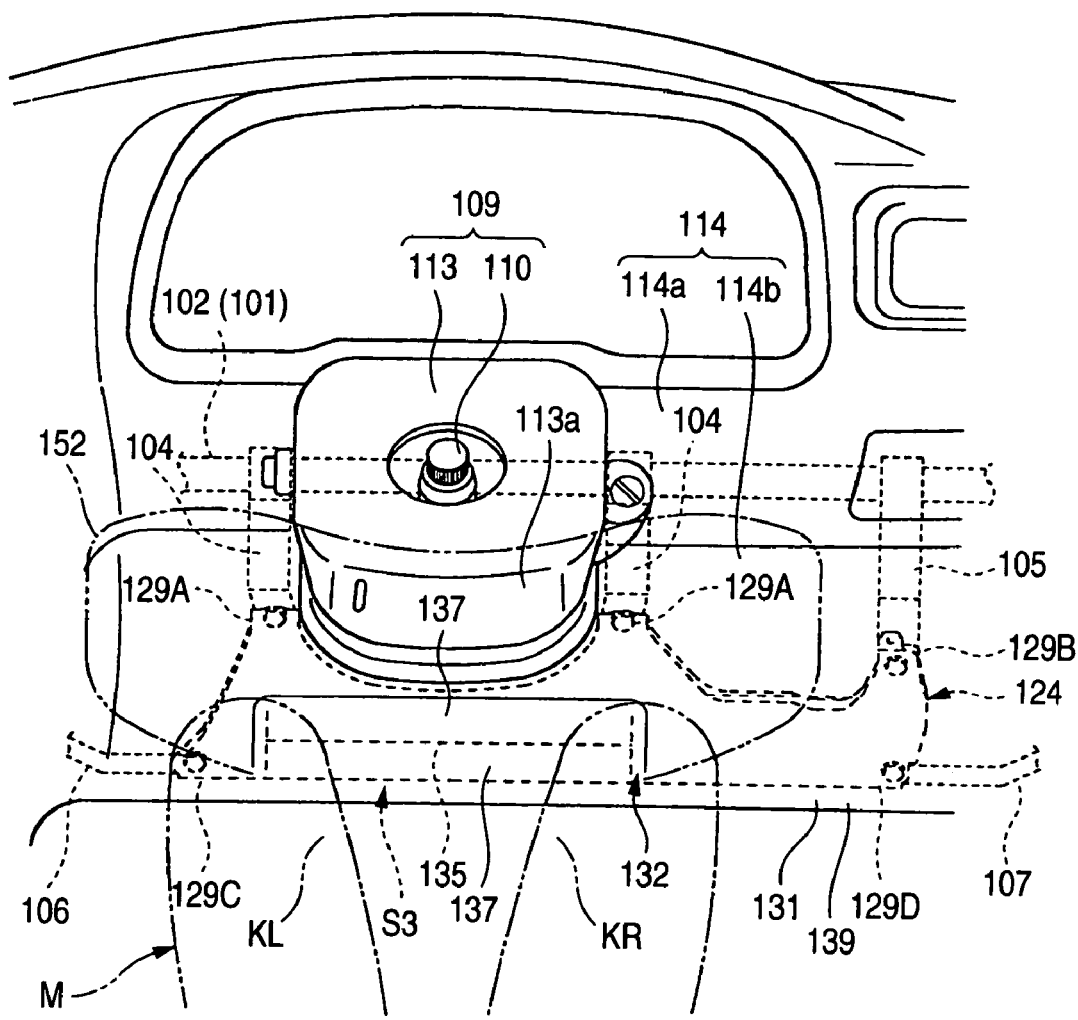
FIG. 32 is a schematic front elevation showing the used state of the knee protecting airbag device and taken from the vehicular rear side.

The steering column 109 is constructed, as shown in FIGS. 27 and 32, to include a column body 110 connected to a steering wheel 108, and a column cover 113 arranged to cover the column body 110 below the steering wheel 108. The column body 110 is constructed to include a main shaft 111 and a column tube 112 enclosing the main shaft 111.

The column cover 113 is made of a synthetic resin into a generally square tube shape and is so arranged along the axial direction of the column body 110 as to cover the column body 110. The rear face 113a of that portion in the column cover 113, which protrudes from an instrument panel 114, is formed into a generally rectangular plate shape and curved up backward in the vehicular longitudinal direction. In the case of the embodiment, the instrument panel 114 is composed of an upper panel 114a and a lower panel 114b.

The knee protecting airbag device S3 is constructed to include: a folded airbag 152; an inflator 145 for providing the airbag 152 with an inflating gas; a case 117 accommodating the folded airbag 152 and the inflator 145 and opened on the vehicular rear side; an airbag cover 131 for covering the vehicular rear side of such an opening 117a in the case 117. In the case of the embodiment, the airbag cover 131 is composed of the lower panel 114b of the instrument panel 114. In the knee protecting airbag device S3 of the embodiment, moreover, the case 117 is mounted and fixed on the side of a vehicular body 101 through a knee panel 124 arranged on the vehicular front side of the airbag cover 131.

Figure 28:
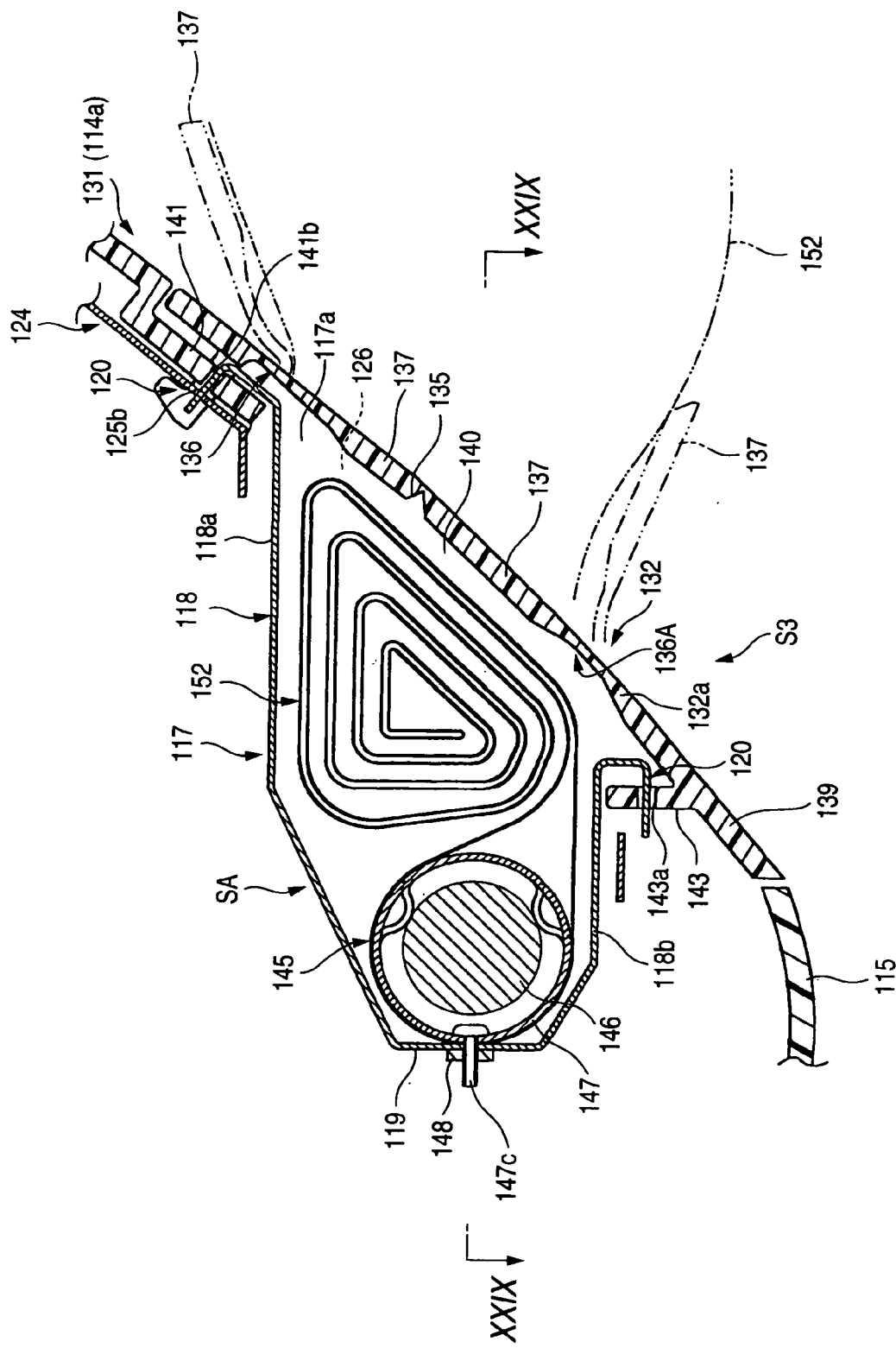
FIG. 28 is an enlarged schematic longitudinal section of the knee protecting airbag device in the vehicular longitudinal direction.
Figure 29:
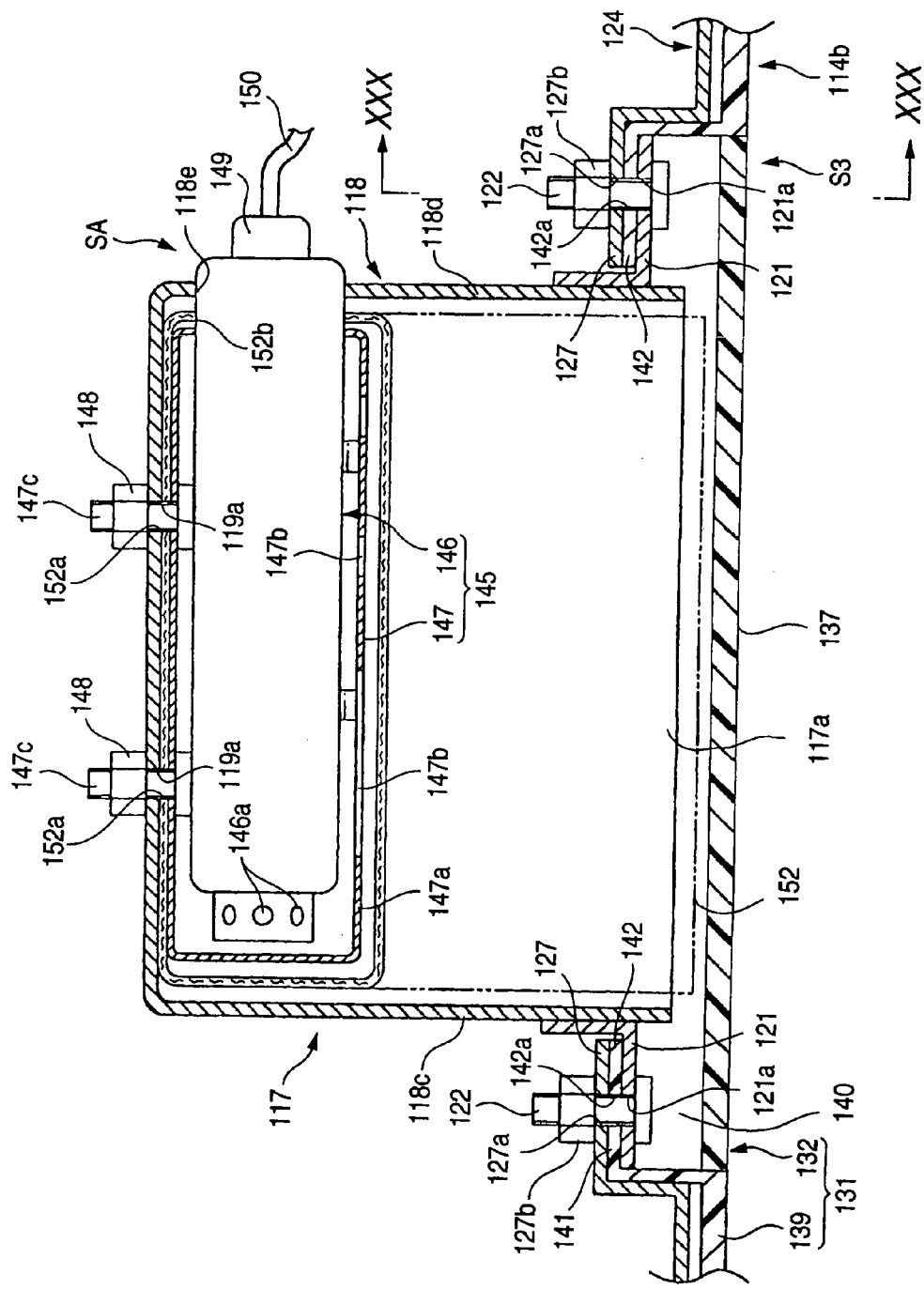
FIG. 29 is a schematic section of portion XXIX-XXIX of FIG. 28.

The case 117 is made of a sheet metal, as shown in FIGS. 27 to 29, and is arranged on the lower side of the steering column 109. The case 117 is formed into a bottomed case shape and is constructed to include: a peripheral wall part 118 having a generally square cylinder shape arranged to have an axis generally along the longitudinal direction; a base wall part 119 for closing the vehicular front side of the peripheral wall part 118; and the opening 117a of a generally rectangular shape on the vehicular rear side. In the case of the embodiment, the open face of the case 117 is arranged with such an inclination that its lower side may be positioned on the front according to the inclination of the airbag cover 131. Near the rear end of the peripheral wall part 118 acting as the peripheral edge of the opening 117a, there are formed a plurality of retaining pawl portions 120 for retaining the case 117 near the peripheral edge of the later-described opening 140 of the airbag cover 131. In the case of embodiment, four retaining pawl portions 120 are arranged individually at an upper wall part 118a and at a lower wall part 118b of the peripheral wall part 118 (as referred to FIG. 31). Each retaining pawl portion 120 is so bent at its leading end side toward the vehicular front side that its leading end side can be inserted into an insertion hole 141b or 143a, which is arranged in an edge portion 141 or a protruding wall part 143 arranged at the peripheral edge of the opening 140 of the airbag cover 131. On the other hand, the retaining pawl portion 120 formed on the side of the upper wall part 118a can be inserted at its leading end side through the insertion hole 141b into an insertion hole 125b arranged in the knee panel 124.

On the peripheral wall part 118 of the case 117, there are arranged mount portions 121 for mounting and fixing the case 117 on the knee panel 124 on the side of the body 101. In the case of the embodiment, the mount portions 121 are arranged one by one on the left wall part 118c and the right wall part 118d of the peripheral wall part 118. Each mount portion 121 is arranged to protrude leftward or rightward from the position near the opening 117a of the case 117, and is provided with a mounting hole 121a for inserting a bolt 122 as mount member. Moreover, each mount portion 121 is arranged generally vertically to arrange the insertion direction of the bolt 122 generally in the longitudinal direction. In the case of the embodiment, moreover, each mount portion 121 is mounted and fixed (as referred to FIGS. 29 and 30) by means of the bolt 122 to a mount portion 127 formed on the knee panel 124, through the later-described mounting member 142 which is arranged on the peripheral edge of the opening 140 of the airbag cover 131.

In the right wall part 118d of the case 117, on the other hand, there is formed an insertion hole 118e, which can insert the later-described body 146 of the inflator 145 (as referred to FIG. 29). In the base wall part 119, moreover, there are formed two insertion holes 119a for inserting the later-described bolts 147c of the inflator 145.

Figure 31:
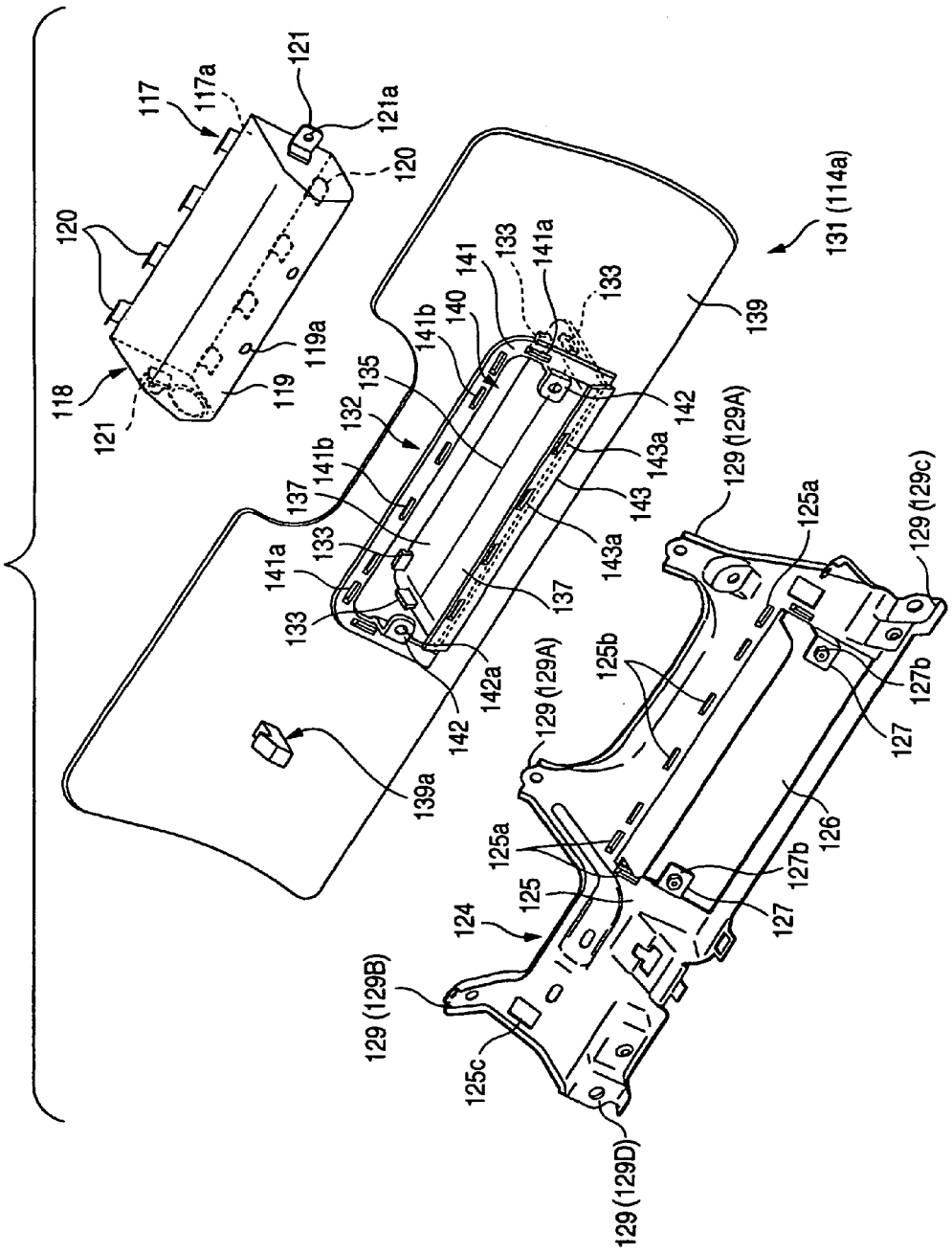
FIG. 31 is an exploded schematic perspective showing an airbag cover, a case and a knee panel to be employed in the knee protecting airbag device of the third embodiment and taken from the vehicular front side.

The knee panel 124 for mounting and fixing the case 117 on the side of the vehicular body 101 is made of a sheet metal and is constructed, as shown in FIGS. 28, 29 and 31, to extend upward and both leftward and rightward from the peripheral edge of the opening 117a of the case 117. The knee panel 124 is arranged at a position of the airbag cover 131 on the vehicular front side of a general portion 139.

Moreover, the knee panel 124 is arranged to support the vehicular front side of the airbag 152 expanded/inflated thereby to protect the knees K of the driver M more properly with the airbag 152 when the knees K of the driver M interfere with the airbag 152 having completed its inflation.

The knee panel 124 is constructed to include a body portion 125 arranged to enclose the opening 117a of the case 117, and a connecting portion 129 to be connected to the side of the vehicular body 101. The body portion 125 is provided with an insertion hole 126 capable of inserting the peripheral edge portion of the opening 117a in the peripheral wall part 118 of the case 117. At the peripheral edge portion of the insertion hole 126, on the other hand, there are formed the mount portions 127 which can mount the mount portion 121 arranged in the case 117. The mount portions 127 are so arranged at two transverse portions as to correspond to the mount portions 121 of the case 117. The mount portions are individually provided with mounting holes 127a, which correspond to the mounting holes 121a formed in the mount portions 121 and can insert the bolts 122. On the portion for the peripheral edge of each mounting hole 127a on the vehicular front side face of each mount portion 127, there is fixed a nut 127b, which can fasten the bolt 122. At the portion at the body portion 125 of the knee panel and on the peripheral edge of the insertion hole 126, there are formed the insertion holes 125b for inserting the retaining pawl portions 120 of the case 117, and retaining holes 125a for inserting and retaining the later-described retaining protrusions 133 formed on a door arranging cover portion 132. In predetermined portions of the knee panel body portion 125, there are formed retaining holes 125c, which can insert and retain a clip 139a arranged on the later-described general portion 139 of the airbag cover 131 (as referred to FIG. 31).

The connecting portions 129 (129A, 129B, 129C, 129D) are arranged at the peripheral edge of the body portion 125 and are formed, in the case of the embodiment, at five portions, i.e., two portions above the insertion hole 126, near the left lower corner, and near the upper and lower ends of the right side. On the side of the body 101 connecting the individual connecting portions, as shown in FIG. 32, there are arranged brackets, 104, 105, 106 and 107. The brackets 104 and 105 for connecting the connecting portions 129A and 129B arranged on the upper side are connected to an instrument panel reinforcement 102 on the side of the body 101. Moreover, the brackets 106 and 107 for connecting the connecting portions 129C and 129D arranged on the lower side are connected to the not-shown center brace, front body pillar and etc. on the side of the body 101.

Figure 30:
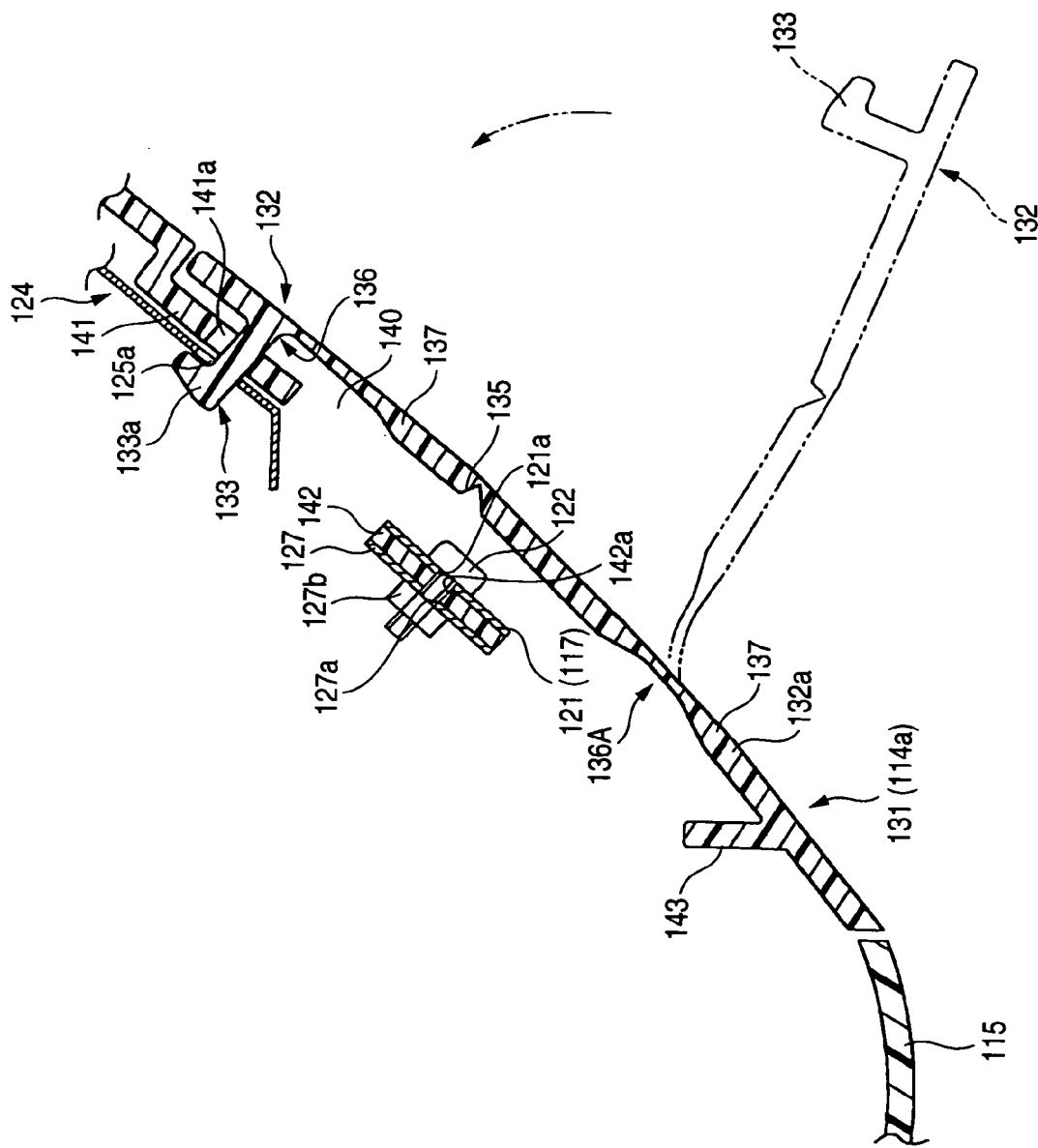
FIG. 30 is a schematic section of portion XXX-XXX of FIG. 29.

In the case of the embodiment, the airbag cover 131 is constructed of the lower panel 114b of the instrument panel 114 and is made of a synthetic resin such as a thermoplastic elastomer of an olefin group. The airbag cover 131 is so inclined as to position the lower side in front, as shown in FIGS. 27, 28 and 30, and can cover the case 117 on the vehicular rear side. The airbag cover 131 is constructed to include the door arranging cover portion 132 arranged near the opening 117a of the case 117, and the general portion 139 arranged around the door arranging cover portion 132. As shown in FIG. 31, the airbag cover 131 is attached to the knee panel 124 by making use of the clip 139a arranged on the general portion, and is fixed on the side of the vehicular body 101 when the later-described fastening members 142 are fastened together with the mount portions 121 of the case 117.

The door arranging cover portion 132 is formed into a generally rectangular plate shape, and has its lower edge 132a connected to the general portion 139 but the remaining edge portion separated from the general portion 139. The portion on the side of the lower edge 132a connected to the general portion 139 is so hinged that it can be opened/closed. This door arranging cover portion 132 is so housed in the general portion 139, when mounted on the vehicle, as to close the later-described opening 140 of the general portion 139. At the peripheral edge portion of the door arranging cover portion 132 excepting the lower edge 132a, there are arranged the retaining protrusions 133 which are protruded toward the vehicular front side and act as the retaining portions capable of retaining the door arranging cover portion 132 on the side of the general portion 139. In the case of the embodiment, the retaining protrusions 133 are formed at the four portions, i.e., at the two portions near the two left and side ends near the upper edge of the door arranging cover portion 132, and at the individual two portions near the upper ends of the two left and right edges.

Each retaining protrusion 133 can be inserted into both a retaining hole 141a formed in the edge portion 141 of the opening 140 in the general portion 139 and the retaining hole 125a arranged in the peripheral edge of the insertion hole 126 in the knee panel 124. When a bulging portion 133a on the leading end side of the retaining protrusion 133 is retained on the peripheral edge of the retaining hole 125a through the retaining hole 141a, the retaining protrusion 133 retains the peripheral edge of the door arranging cover portion 132 on the side of the general portion 139. Here, each retaining protrusion 133 is prevented from coming out of the retaining hole 125a, when the later-described portion 135 to be broken in the door arranging cover portion 132 is broken at the expanding/inflating time of the airbag 152. On the other hand, the door arranging cover portion 132 is so housed in the general portion 139 that the face of the peripheral edge on the vehicular front side is supported by the edge portion of the general portion 139 while having its peripheral edge being retained on the side of the general portion 139, so that the face on the vehicular rear side may be generally flush with the face of the general portion 139 on the vehicular rear side.

At the door arranging cover portion 132, on the other hand, there is arranged a door portion 137, which can be opened when the airbag 152 is expanded and inflated. The door portion 137 is formed into such a generally rectangular shape slightly larger than the opening 117a of the case 117 as to cover the opening 117a. In the embodiment, the door portion 137 is composed of two door portions, which are opened in the vertical direction. Moreover, the door portion 137 is constructed to arrange such hinged portions 136 at its upper and lower ends as provide the centers of turning motions when it is opened, and to arrange the thinned portion 135 to be broken, at such a portion around the door portion 137 as takes a generally H-shape, when viewed from the vehicular rear side. In the case of the embodiment, a hinge portion 136A arranged on the lower end side of the door portion 137 acts as the hinged portion when the door arranging cover portion 132 is opened.

The general portion 139 is provided with the opening 140 for housing the door arranging cover portion 132. This opening 140 is set to have vertical and transverse opening width sizes larger than the vertical and transverse width sizes of the case 117 so that it is given an opening area capable of inserting the case 117 into the case 117 and mounting the mount portions 121 of the case 117 on the mount portion 127 of the side of the body 101. In the case of the embodiment, the opening 140 is set to such a size as to expose the mount portions 121 of the case 117. Of the peripheral edge of the opening 140, the edge portion 141 excluding the lower edge side is formed into such a step shape as to protrude farther toward the vehicular front side than the general portion 139. At a predetermined position in the edge portion 141, there are arranged the retaining holes 141a for inserting the retaining protrusions 133 of the door arranging cover portion 132. In the edge portion 141, moreover, there are formed the insertion holes capable of inserting the retaining pawl portions 120 of the case 117. Here, the edge portion 141 can support the peripheral edge portion of the door arranging cover portion 132 on the face of the vehicular rear side when the door arranging cover portion 132 is housed in the opening 140 by retaining its retaining protrusions 133 on the peripheral edge of the retaining holes 141a.

At the peripheral edge of the opening 140, there are formed the mount portions 121 of the case 117 and the mounting members 142 to be fastened together with the mount portions 127 of the knee panel 124. In the case of the embodiment, the mounting members 142 are so arranged at the two portions along the transverse direction to extend from the edge portion 141. In each mounting member 142, there is formed a mounting hole 142a, which corresponds to each mounting hole 121a or 127a for inserting the bolt 122. On the lower edge side of the opening 140 and near the hinged portion 136A, moreover, there is formed the protruding wall part 143, which is so continuously formed along the transverse direction as to protrude upward. In this protruding wall part 143, there are formed the insertion holes 143a, which can insert the retaining pawl portions 120 of the case 117.

As shown in FIGS. 28 and 29, the inflator 145 is constructed into the cylinder type, which is arranged to have its axial direction along the transverse direction of the vehicle, and is provided with the generally columnar body 146 and a diffuser 147. On one end side of the body 146, there are arranged a plurality of gas discharge ports 146a. With the other end side of the body 146, moreover, there is connected a connector 149, which has a lead wire 150 for inputting an activation signal. The diffuser 147 is constructed to include a holding cylinder portion 147a made of a sheet metal into a generally cylindrical shape capable of covering the body 146, and a plurality of (e.g., two in the embodiment) bolts 147c protruding from the holding cylinder portion 147a. The holding cylinder portion 147a is constructed by opening a plurality of such gas outlet ports 147b in the face of the holding cylinder portion 147a in the vehicle-mounted state on the vehicular rear side that the inflating gas discharged from the gas discharge ports of the body can flow out therethrough.

When an airbag activation circuit mounted on the vehicle detects a front collision of the vehicle, it inputs the activation signal through the lead wire 150 to that inflator 145 and to the not-shown airbag device mounted on the steering wheel 108.

The airbag 152 is formed of woven fabric of polyester or polyamide yarns having a flexibility into a generally rectangular sheet shape having a transverse width size capable of protecting the two left and right knees KL and KR of the driver MD as the occupant at the expansion/inflation completion time, as indicated by double-dotted lines in FIGS. 27 and 32. At the portions on the lower end side of the airbag 152 at the expansion completion time, on the other hand, there are formed two insertion holes 152a and 152a and one insertion hole 152b. The insertion holes 152a and 152a insert the individual bolts 147c of the inflator 145, and the insertion hole 152b inserts the body 146 of the inflator 145. Moreover, the airbag 152 is mounted in the case 117 by protruding the body 146 of the inflator 145 from the insertion hole 152*b* and by clamping the peripheral edge of each insertion hole 152*a* between the holding cylinder portion 147*a* and the base wall part 119 of the case 117.

Here will be described the mounting operation of the knee protecting airbag device S3 of the embodiment on the vehicle. First of all, the bolts 147*c* are protruded from the insertion holes 152*a*, and the inflator 145 is housed in the airbag 152 such that the end portion of the body 146 is protruded from the insertion hole 152*b*, and the airbag 152 is folded up. Next, the airbag 152 is wrapped with the not-shown breakable wrapping film for preventing the folding collapse. At this time, the bolt 147*c* of the inflator 145 and the end portion of the body 146, which are protruded from the insertion holes 152*a* and 152*b*, are protruded from the wrapping film.

Next, the individual bolts 147*c* of the inflator 145 are protruded from the insertion holes 119*a* and fastened with nuts 148, and the end portion of the inflator body 146 is protruded from the insertion hole 118*e* so that the inflator 145 is housed together with the folded airbag 152 in the case 117 thereby to form an airbag assembly SA.

After this, the knee panel 124 is mounted and fixed on the side of the body 101 of the vehicle by making use of the individual connecting portions 129 and the brackets 104, 105, 106 and 107. Next, the instrument panel 114 (including the upper panel 114*a* and the lower panel 114*b* as the airbag cover 131) is mounted and fixed on the side of the vehicular body 101 by making use of the clip 139*a* and so on.

Then, the door arranging cover portion 132 of the airbag cover 131 fixed on the body 101 is opened to insert the airbag assembly SA having the base wall part 119 on the front side toward the vehicular front side into the opening 140 from the rear side of the opening 140. The individual retaining pawl portions 120 are inserted into the insertion holes 141*b* and 143*a* arranged in the peripheral edge of the opening 140 and into the insertion holes 125*b* arranged in the peripheral edge of the insertion hole 126 of the knee panel 124, thereby to retain the airbag assembly SA on the airbag cover 131. Next, the mount portion 121 exposed from the opening 140 is fixed on the mount portion 127 of the knee panel 124 through the mounting members 142 of the airbag cover 131 by inserting the bolts 122 toward the front side and fastening them with the nuts 127*b*, thereby to fix the airbag assembly SA on the side of the vehicular body 101. After this the retaining protrusions 133 are inserted through the retaining holes 141*a* arranged in the peripheral edge of the opening 140 of the door arranging cover portion 132, into the retaining holes 125*a* arranged in the knee panel 124 so that the door arranging cover portion 132 is retained on the general portion 139. Next, the connector 149 having the lead wire 150 is connected to the inflator body 146. Here, the connecting works of the connector 149 are performed through the clearance in which an under cover 115 (as referred to FIGS. 27 to 29) is arranged. After this, the airbag device S3 can be mounted by attaching the undercover 115.

If the activation signal is inputted to the inflator body 146 via the lead wire 150 after the airbag device S3 was mounted on the vehicle, the inflating gas is discharged from the gas discharge ports 146*a* of the inflator 145 so that it flows via the gas outlet ports 147*b* of the diffuser 147 into the airbag 152. Then, the airbag 152 is inflated to break the not-shown wrapping member, and presses the door portion 137 formed at the door arranging cover portion 132 of the airbag cover 131 and then the portions 135 to be broken. As a result, the door portion 137 is vertically opened on the hinged portions 136 and 136A so that the airbag 152 is expanded and inflated, as indicated by the double-dotted lines in FIGS. 27 and 32.

Moreover, the knee protecting airbag device S3 of the embodiment is constructed such that the airbag assembly SA is attached, when the device S3 is mounted on the vehicle, to the side of the vehicular body 101 by making use of the opening 140 which is formed by opening the door arranging cover portion 132 of the airbag cover 131 mounted and fixed in advance on the side of the body 101. In the knee protecting airbag device S3 of the embodiment, more specifically, the airbag assembly SA is inserted toward the vehicular front side from the opening 140 formed by opening the door arranging cover portion 132 of the airbag cover 131, and the bolts 122 as the mount member are fastened in the nuts 127*b* while viewing them from the opening 140. Then, the mount portions 121 of the airbag assembly SA can be mounted and fixed on the mount portions 127 of the knee panel 124 so that the airbag assembly SA can be attached on the side of the body 101 of the vehicle. At the time of mounting the airbag assembly SA on the side of the body 101, therefore, the bolts 122 can be fastened with the visual confirmation so that the mounting works of the mount portions 121 are improved, and the confirmation of the subsequent mounted state can be easily performed.

In the knee protecting airbag device S3 of the embodiment, therefore, the mount portions (i.e., the mount portions 121), at which the airbag assembly SA is mounted on the body 101, can be easily confirmed to improve the mounting workability on the body 101 of the vehicle.

Of course, in the knee protecting airbag device S3 of the embodiment, too, the door arranging cover portion 132 opened at the mounting time of the airbag assembly SA is closed after the mounting work, and is retained on the side of the general portion 139 by making use of the retaining protrusions 133 as the retaining portions. In the state where the airbag assembly SA is mounted on the vehicle, the mount portions 121 of the airbag assembly SA and the bolts 122 are covered on the side of the vehicular inside with the door arranging cover portion 132 so that it is not exposed to retain the design, as viewed from the vehicular inside.

In the knee protecting airbag device S3 of the embodiment, moreover, at the door arranging cover portion 132, the portions 135 to be broken are arranged around the door portion 137 and are broken by the push of the airbag 152 being inflated, when the airbag 152 is expanded and inflated, thereby to open the door portion 137. Specifically, the knee protecting airbag device S3 of the embodiment is constructed such that the retaining protrusions 133 at the door arranging cover portion 132 are so firmly retained that they may not be released from the peripheral edge of the retaining holes 125*a* when the airbag 152 is expanded and inflated. At the times other than the action time of the airbag 152, therefore, the retaining protrusions 133 can be prevented from coming out the retaining holes 125*a* and 141*a* to prevent the door arranging cover portion 132 from being opened with respect to the general portion 139.

Figure 34:
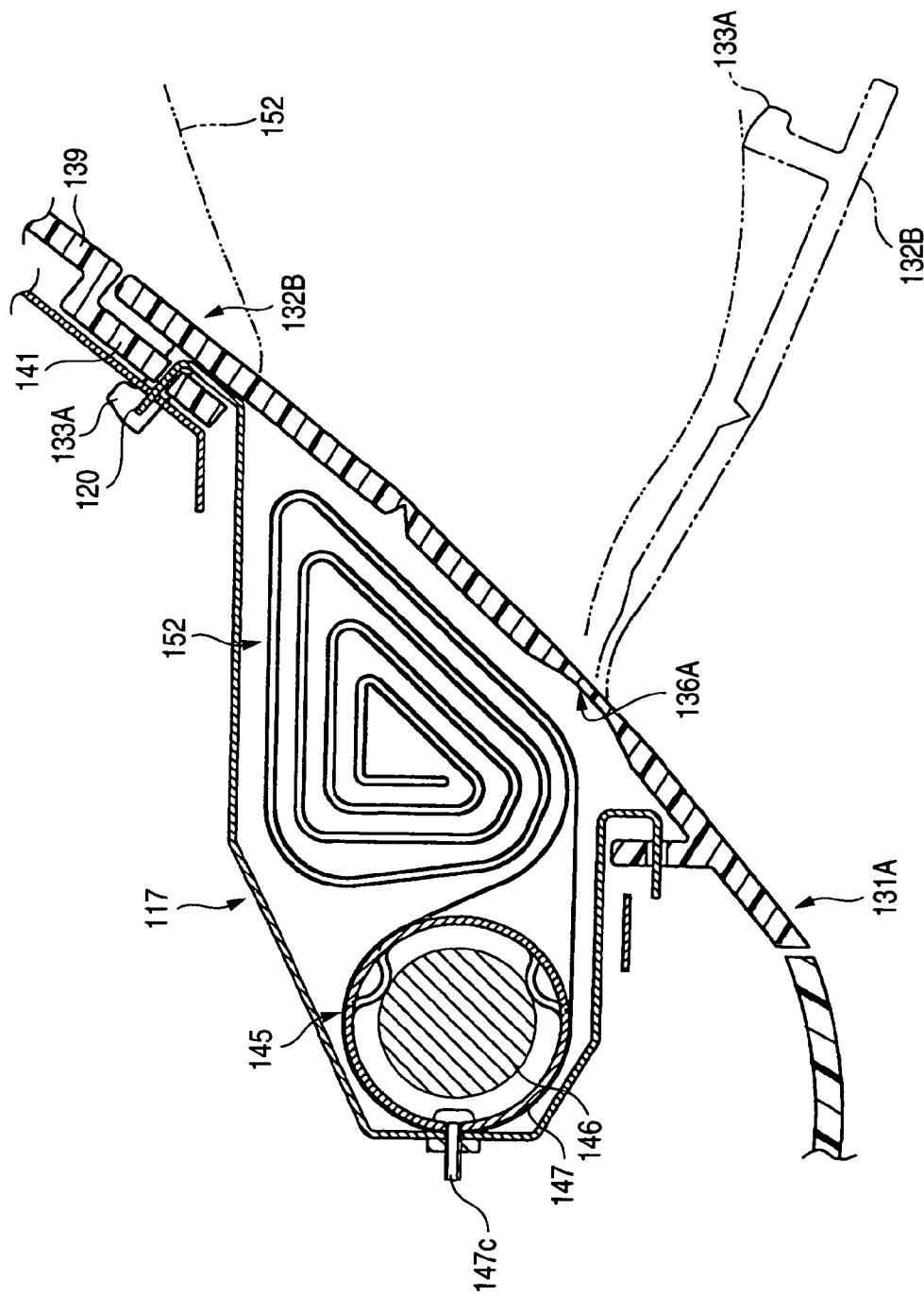
FIG. 34 is a schematic longitudinal section of a knee protecting airbag device in still another mode of the invention and taken in the vehicular longitudinal direction.

On the contrary, the knee protecting airbag device can naturally be modified, as shown in FIG. 34, such that a door arranging cover portion 132B can be pressed and opened at the time of expanding and inflating the airbag 152 by the airbag 152 being inflated, thereby to release the retention to the side of the general portion 139 by retaining protrusions 133A. In case the knee protecting airbag device is thus constructed, the door arranging cover portion 132B itself is opened when the airbag 152 is expanded and inflated, so that the portions and so on to be broken for opening the door portion need not be additionally arranged.

Figure 33:
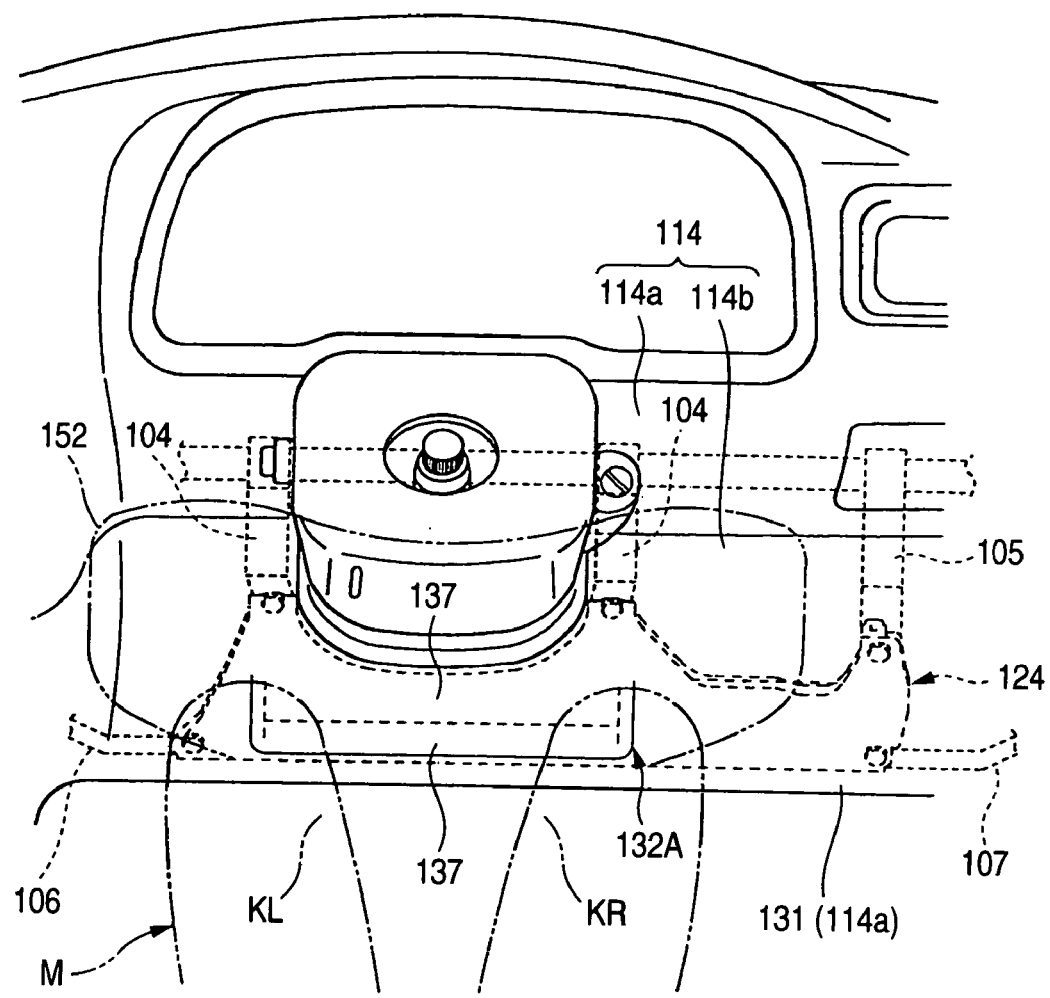
FIG. 33 is a schematic front elevation showing the used state of a knee protecting airbag device in another mode of the invention and taken from the vehicular rear side.

In the knee protecting airbag device S3 of the embodiment, the door arranging cover portion 132 is constructed such that it is opened downward by connecting the lower edge 132a to the general portion 139. Of course, the opening direction of the door arranging cover portion 132 should not be limited thereto but may be changed upward by connecting the upper edge side of a door arranging cover portion 132A to the general portion 139. The airbag cover 131 is arranged at such an inclination as to position the lower side in front so that the portions on the lower edge sides of the door arranging cover portions 132 and 132A are hardly visible from the seated driver M. If the door arranging cover portion 132A is given the aforementioned construction, therefore, the lower edge side portion of the boundary line, which is formed between the general portion and the door arranging portion is invisible to the driver thereby to improve the design viewed from the vehicular inside. In FIG. 33, the lower edge side of the door arranging cover portion 132A is expressed. When the airbag device is actually mounted on the vehicle, the portion of the lower edge side of the door arranging cover portion 132A is hardly seen from the driver M. Of course, the door arranging cover portion may be connected at its right edge side or its left edge side to the general portion 139. In case the door arranging cover portion 132B itself is opened when the airbag 152 is expanded and inflated, as described hereinbefore, it is preferred that the door arranging cover portion 132B is opened downward.

Moreover, the knee protecting airbag device S3 of the embodiment is constructed such that the airbag assembly SA is mounted and fixed on the side of the body 101 through the knee panel 124. However, the knee protecting airbag device, to which the invention can be applied, should not be limited thereto but may be modified such that the airbag device is not provided with the knee panel so that the mount portions of the airbag assembly can be mounted and fixed directly on the body side by making use of the bracket extending from the body side. In case the airbag device is thus constructed, the mounting members to be arranged on the airbag cover can be fastened together with the mount portions of the airbag assembly (or the case) and fixed on the body side.

In the knee protecting airbag device S3 of the embodiment, moreover, the bolts 122 inserted into the mount portions 121 are fastened in the nuts 127b fixed on the front side mount portions 127 so that the mount portions 121 on the side of the airbag assembly SA are mounted and fixed on the mount portions 127 of the side of the body 101. However, the mount member for mounting the mount portions should not be limited thereto but may be exemplified by rivets or the like.

In the knee protecting airbag device S3 of the embodiment, still moreover, the airbag cover 131 employed is made integral with the lower panel 114b of the instrument panel 114. However, the airbag cover to be applied to the knee protecting airbag device of the invention should not be limited to the aforementioned construction. The airbag cover may be made separate of the lower panel.

On the other hand, the embodiment has been described by adopting the knee protecting airbag device S3 which is arranged below the steering column 109 to protect the knees K of the driver M. However, the knee protecting airbag device of the invention can also be applied to the knee protecting airbag device, which is arranged in front of the passenger seat so as to protect the knees of the occupant seated on the passenger seat.

What is claimed is:

1. An airbag device arranged in front of a seat in a vehicle for knee protection comprising:
    a case installed in the vehicle so as to have an opening that faces a rear of the vehicle;
    an airbag accommodated in the case, wherein the airbag is provided with an inlet opening from which a gas is introduced, and the airbag is extendable toward a rear side of the vehicle, when the gas flows in the airbag;
    an inflator for filling said airbag with gas;
    an airbag cover made of a resin to cover a rear side of said case, wherein an airbag assembly is constituted by said case, said bag and said inflator, and said airbag assembly has a mount portion to be attached to a body of the vehicle with a mount member that is fastened to said body and said airbag cover includes:
    a door arranging cover portion having a door portion capable of covering said opening on the rear side of said case and from which said airbag is protruded when said airbag is expanded; and
    a general portion having an opening for housing said door arranging cover portion, wherein the general portion is arranged around said door arranging cover portion such that said door arranging cover portion is enabled to open and close said opening of said general portion, wherein a part of said door arranging cover portion is joined with said general portion to form a hinge between said door arranging cover portion and said general portion;
    wherein a retaining portion is capable of retaining a peripheral portion of said opening of said general portion and a peripheral portion of said door arranging cover portion,
    wherein an open area formed by opening said door arranging cover portion on said general portion is such that said airbag assembly is insertable through said opening from the rear side of the vehicle and is mountable to said mount member, and
    said mount portion of said airbag assembly is so arranged that said mount member is fastened on said body while visible from said opening.

2. A knee protecting airbag device according to claim 1, wherein the door portion of said door arranging cover portion is pressed, when said airbag is expanded and inflated, by said airbag being inflated, to release the retention of said retaining portion.

3. A knee protecting airbag device according to claim 1, wherein said door arranging cover portion includes portions to be broken, around said door portion, and
    wherein said door portion is pressed and opened with said airbag inflated, by breaking said portions to be broken.

* * * * *